US008473615B1

(12) United States Patent
Rowland et al.

(10) Patent No.: US 8,473,615 B1
(45) Date of Patent: Jun. 25, 2013

(54) SYSTEM AND METHOD FOR CUSTOMER PROVISIONING IN A UTILITY COMPUTING PLATFORM

(75) Inventors: Randy Rowland, Flower Mound, TX (US); Stephen R. Johnson, Jr., Flower Mound, TX (US); Jason A. Lochhead, Frisco, TX (US); Manikandan Subramanian, Flower Mound, TX (US); Emmanuel Kothapally, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 162 days.

(21) Appl. No.: 12/468,525

(22) Filed: May 19, 2009

Related U.S. Application Data

(60) Provisional application No. 61/054,576, filed on May 20, 2008.

(51) Int. Cl.
*G06F 15/173* (2006.01)
*G06F 15/177* (2006.01)

(52) U.S. Cl.
USPC ........... 709/226; 709/221; 709/222; 709/223; 709/225

(58) Field of Classification Search
USPC ........................................................ 709/226
See application file for complete search history.

(56) References Cited

U.S. PATENT DOCUMENTS

| | | | |
|---|---|---|---|
| 5,951,644 A | 9/1999 | Creemer | |
| 5,999,162 A | 12/1999 | Takahashi et al. | |
| 6,181,613 B1 | 1/2001 | Yoshida | |
| 6,516,350 B1 | 2/2003 | Lumelsky et al. | |
| 6,785,592 B1 | 8/2004 | Smith et al. | |
| 6,792,399 B1 | 9/2004 | Phillips et al. | |
| 7,130,807 B1 | 10/2006 | Mikurak | |
| 7,263,583 B2 | 8/2007 | Hood et al. | |
| 7,730,183 B2 * | 6/2010 | Brown et al. | 709/226 |
| 7,743,001 B1 | 6/2010 | Vermeulen et al. | |
| 7,894,918 B2 | 2/2011 | Kanodia et al. | |
| 2001/0014868 A1 | 8/2001 | Herz et al. | |
| 2002/0052941 A1 * | 5/2002 | Patterson | 709/223 |
| 2002/0075244 A1 | 6/2002 | Tani et al. | |
| 2003/0055677 A1 | 3/2003 | Brown et al. | |
| 2004/0031030 A1 * | 2/2004 | Kidder et al. | 717/172 |
| 2004/0034580 A1 | 2/2004 | Okamura | |
| 2004/0186905 A1 | 9/2004 | Young et al. | |
| 2005/0005158 A1 | 1/2005 | Alaluf | |
| 2005/0044301 A1 * | 2/2005 | Vasilevsky et al. | 711/1 |
| 2005/0120160 A1 * | 6/2005 | Plouffe et al. | 711/1 |
| 2005/0234935 A1 | 10/2005 | Barsness et al. | |
| 2005/0240558 A1 * | 10/2005 | Gil et al. | 707/1 |
| 2005/0240668 A1 | 10/2005 | Rolia et al. | |
| 2006/0095601 A1 | 5/2006 | Wang et al. | |
| 2006/0112075 A1 | 5/2006 | Hellerstein et al. | |
| 2006/0155708 A1 * | 7/2006 | Brown et al. | 707/10 |

(Continued)

*Primary Examiner* — Richard G Keehn

(57) ABSTRACT

A utility computing platform includes a virtualization control system coupled to physical server, disk drive and networking resources and configured to partition the physical resources into virtual resources including virtual processor, memory and storage resources. The utility computing platform comprises a customer console application coupled to the virtualization control system, and accessible via an Internet connection to a customer computing system operating a web browser interface. The customer console application enables the customer, through the web browser interface, to create and manage one or more virtual servers within a customer environment by associating an amount of virtual processor, memory and storage resources with the one or more virtual servers.

49 Claims, 69 Drawing Sheets

U.S. PATENT DOCUMENTS

| | | |
|---|---|---|
| 2006/0248023 A1 | 11/2006 | Caprini et al. |
| 2007/0094367 A1* | 4/2007 | Esfahany et al. ............. 709/223 |
| 2007/0266136 A1* | 11/2007 | Esfahany et al. ............. 709/223 |
| 2008/0127186 A1 | 5/2008 | Kanodia et al. |
| 2008/0270692 A1* | 10/2008 | Cochran et al. ............... 711/114 |
| 2008/0301674 A1* | 12/2008 | Faus ................................... 718/1 |
| 2008/0313357 A1 | 12/2008 | Wang et al. |
| 2009/0037682 A1* | 2/2009 | Armstrong et al. ........... 711/164 |
| 2009/0070781 A1* | 3/2009 | Fitzgerald et al. ............ 719/316 |
| 2009/0217267 A1* | 8/2009 | Gebhart et al. ................ 718/100 |
| 2009/0240910 A1* | 9/2009 | Inomata et al. ................ 711/171 |
| 2009/0248847 A1 | 10/2009 | Sutoh et al. |
| 2009/0271472 A1* | 10/2009 | Scheifler et al. .............. 709/202 |
| 2009/0327596 A1 | 12/2009 | Christenson et al. |
| 2010/0175070 A1 | 7/2010 | Baba |
| 2010/0198972 A1 | 8/2010 | Umbehocker |

\* cited by examiner

Infinicenter Environment: Messaging Platform - Microsoft Internet Explorer provided by Terremark Colo Environment ☐ Save   🌐 Upgrade   ↻ Refresh   | ☆ Favorites Name: Messaging Platform
Virtual Center: Miami Colo Infinistructure
Cluster: MIA9001VCL2201
Resource Pool: 35513_MIA_1
# of Virtual Machines: 0

Resources:

| CPU | Memory | Storage |
|---|---|---|
| Purchased: 1000 MHz | Purchased: 2048 MB | Purchased: 130 GB |
| Allocated: 0 VPUs | Allocated: 0 MB | Allocated: 0 GB |
| Used: 0 MHz | Used: 0 MB | Used: 0 GB |

☑ Active — 206

Networks: — 208

[Add] [Remove]

| Name | VLAN Id |
|---|---|
| | |

[Details] [Quotes] [Transaction History] [History]

Done | Local Intranet | 🔍 100%

□ Infinicenter Environment: Messaging Platform - Microsoft Internet Explorer provided by Terremark □ ▫ ✕

Colo Environment

□ Save  ● Upgrade  ⇆ Refresh  |  ☆ Favorites

Name: [Messaging Platform]
Virtual Center: Miami Colo Infinistructure
Cluster: MIA9000IVCL2201
Resource Pool: 35513_MIA_1 ⎫
# of Virtual Machines: 0       ⎬— 206
                               ⎭         ☑ Active Resources:

| CPU | Memory | Storage |
|---|---|---|
| Purchased: 1000 MHz | Purchased: 2048 MB | Purchased: 130 GB |
| Allocated: 0 VPUs | Allocated: 0 MB | Allocated: 0 GB |
| Used: 0 MHz | Used: 0 MB | Used: 0 GB |

Networks:                                                      ⎱— 208

[Add] [Remove]

| Name | VLAN Id |
|---|---|
| DMZ_410 | 410 |

⎱— 218

[Details] [Quotes] [Transaction History] [History]

Done                          🖳 Local Intranet    |  ⊕ 100%  ▷

| Colo Upgrade Environment: Messaging Platform- Microsoft Internet Explorer provided by Terremark | □ □ ☒ |
|---|---|

Upgrade Environment

| 💾 Save | |

Organization: SampleCompany, LLC
Environment: Messaging Platform
Available New Quotes

| Quote | Contract | Location | Term (Mos) | Proc. (MHz) | Memory (MB) | Storage (GB) |
|---|---|---|---|---|---|---|
| 53711 | XXX-YYY-ZZZ | Miami | 12 | 10000 | 20480 | 0 |
| 53712 | XXX-YY-ZZZ | Miami | 12 | 10000 | 20480 | 0 |
| 53714 | BBB-UU-ZZZZ | Miami | 12 | 1000 | 0 | 0 |

Resources

|  | Current | Upgraded |
|---|---|---|
| Processor: | 1000 MHz | 2000 MHz |
| Memory: | 2048 MB | 2048 MB |
| Storage: | 130 GB | 130 GB |

Environment Options

Activation Date: 5/13/2008

⦿ Yes > Quotes: -SELECT-  ⌄
○ No

Co-terminus: -SELECT- ⌄

| Done | | 🖳 Local Intranet | ⊕ 100 % |

Colo Environment

Infini http://dev-intweb/Everest/Apps/Infinicenter/Environments/Detail.aspx?e=1Environment&id=14-Microsoft Internet Explorer provide Save  Upgrade  Refresh  | ☆ Favorites Name: Messaging Platform  ☑ Active
Virtual Center: Miami Colo Infinistructure
Cluster: MIA9000IVCL2201
Resource Pool: 35513_MIA_1 — 206
# of Virtual Machines: 0

Resources:

| CPU | Memory | Storage |
|---|---|---|
| Purchased: 2000 MHz | Purchased: 2048 MB | Purchased: 130 GB |
| Allocated: 0 VPUs | Allocated: 0 MB | Allocated: 0 GB |
| Used: 0 MHz | Used: 0 MB | Used: 0 GB |

— 208

Networks:

Add  Remove

| Name | VLAN Id |
|---|---|
| DMZ_410 | 410 |
| INT_411 | 411 |

— 210

Details | Quotes | Transaction History | History

204 infinicenter
digitalOps

— 360

Welcome to the Infinicenter Console

Sign In

User Name (Email):

Password:

☐ Remember me

Forgot password ?

Sign In

*Fig. 12*

Create Server

◉ Template  ◉ Configuration  ○ Network Settings  ○ Row/Group Location  ○ Review and Save Windows 2003 Enterprose R2 (32-bit)
This template consists of a base Windows 2003 build. The Windows binaries are located in c:\i386 if needed for additional software components.

*Indicates required information

*Server Name: [Cyclotron]

*Admin Password: [●●●●●●●]

*Confirm Password: [●●●●●●●]

Processors: [1 ▷]  $0/mo.

Memory: [====|====] [1000] MB

[✗ Cancel]  [⇩ Back]  [Next ⇧]

*Fig. 20F*

Create Server

① Template ② Configuration ③ Network Settings ④ Row/Group Location ⑤ Review and Save Server Name: Cyclotron
Operating System: Microsoft Windows Server 2003, Enterprise Edition (32-bit)
Processors: 1
Licensing Cost: $0/mo.
System Disk: 20 GB
Memory: 1000 MB
IP Address: 10.122.181.11
Subnet Mask: 255.255.255.0
Default Gateway: 10.122.181.1
Primary DNS Server:
Secondary DNS Server:

☐ Power the server on when created
☐ AGREEMENT: I understand that I will be charged for all licensing and resource usage fees when I click the "Deploy" button below.

✕ Cancel    ⇐ Back    ▭ Deploy

Infinicenter

My Account        Environments   My Account   Sign Out digitalOps

Billing | Transaction History | Settings | Users

Date From: [05/01/2008] 📅   To: [05/06/2008] 📅   🔍 View History

Transaction History (05/01/2008 to 05/06/2008)

| Date | Transaction | Environment | Name/ID | Description | User |
|---|---|---|---|---|---|
| 05/06/2008 | Create Server • Windows Server 2003 Std., 64Bit-UD (Per CPU) | PLM Infinicenter Beta | BizTalk | 1 processor | Danny Jones |
| 05/06/2008 | Create Server • Windows Server 2003 Std., 64Bit-UD (Per CPU) | PLM Infinicenter Beta | Web | 1 processor | Danny Jones |
| 05/06/2008 | Delete Server • Windows Server 2003 Std., 64Bit-UD (Per CPU) | PLM Infinicenter Beta | x64Test | 1 processor | Jason Lochhead |
| 05/05/2008 | Create Server • Windows Server 2003 Std., 64Bit-UD (Per CPU) | PLM Infinicenter Beta | x64Test | 1 processor | Jason Lochhead |
| 05/05/2008 | Create Server • Windows Server 2003 Std., 64Bit-UD (Per CPU) | PLM Infinicenter Beta | JL01 | 1 processor | Jason Lochhead |
| 05/05/2008 | Delete Server • Windows Server 2003 Std., 64Bit-UD (Per CPU) | PLM Infinicenter Beta | centos1 | 1 processor | Jason Lochhead |
| 05/05/2008 | Delete Server • Windows Server 2003 Std., 64Bit-UD (Per CPU) | PLM Infinicenter Beta | CentOSx64 | 1 processor | Jason Lochhead |
| 05/05/2008 | Delete Server • Windows Server 2003 Std., 64Bit-UD (Per CPU) | PLM Infinicenter Beta | W2K8x86 | 1 processor | Jason Lochhead |
| 05/05/2008 | Delete Server • Windows Server 2003 Std., 64Bit-UD (Per CPU) | PLM Infinicenter Beta | testServer | 4 processors | Jason Lochhead |
| 05/02/2008 | Processor Increase • Windows Server 2003 Std., 64Bit-UD (Per CPU) | PLM Infinicenter Beta | testServer | From 2 to 4 | Jonathan Avedikian |
| 05/02/2008 | Create Server • Windows Server 2003 Std., 64Bit-UD (Per CPU) | PLM Infinicenter Beta | testServer | 2 processors | Jonathan Avedikian |
| 05/02/2008 | Delete Server • Windows Server 2003 Std., 64Bit-UD (Per CPU) | PLM Infinicenter Beta | TestRH | 4 processors | Jonathan Avedikian |
| 05/02/2008 | Processor Increase • Windows Server 2003 Std., 64Bit-UD (Per CPU) | PLM Infinicenter Beta | TestRH | From 2 to 4 | Jonathan Avedikian |
| 05/02/2008 | Create Server • Windows Server 2003 Std., 64Bit-UD (Per CPU) | PLM Infinicenter Beta | TestRH | 2 processors | Jonathan Avedikian |
| 05/01/2008 | Delete Server • Windows Server 2003 Std., 64Bit-UD (Per CPU) | PLM Infinicenter Beta | Kevin | 2 processors | Jonathan Avedikian |
| 05/01/2008 | Delete Server • Windows Server 2003 Std., 64Bit-UD (Per CPU) | PLM Infinicenter Beta | jaosrvl | 4 processors | Jonathan Avedikian |
| 05/01/2008 | Delete Server • Windows Server 2003 Std., 64Bit-UD (Per CPU) | PLM Infinicenter Beta | testsrv01 | 4 processors | Jonathan Avedikian |

*Fig. 27*

| Infinicenter | | | Environments My Account Sign Out |
|---|---|---|---|
| My Account | | | digitalOps |
| Billing  Transaction History  Settings  Users | | | |

[Invite User...] ⟵ 646

640

Users

| Name | User Name (Email) | Role | Last Login | Status |
|---|---|---|---|---|
| Avedikian, Jonathan | jonathan.avedikian@datareturn.com | Administrator | 05/02/2008 04:46:14 | Active |
| Geary, Graham | graham.geary@datareturn.com | Administrator | 05/05/2008 12:11:17 | Active |
| Grodin, Howard | hgrodin@terremark.com | Administrator | 05/06/2008 10:36:04 | Active |
| Johnson, Stephen | Stephen.Johnson@datareturn.com | Administrator | 05/06/2008 10:39:49 | Active |
| Jones, Danny | Danny.Jones@terremark.com | Administrator | 05/06/2008 06:18:54 | Active |
| Kothapally, Emmanuel | ekothapally@hotmail.com | Administrator | 04/30/2008 06:01:24 | Active |
| Lochhead, Jason | Jason.Lochhead@datareturn.com | Administrator | 05/06/2008 09:02:57 | Active |
| Lovelace, Richard | rlovelace@terremark.com | Administrator | 05/06/2008 10:38:55 | Active |
| Rowland, Randy | Randy.Rowland@datareturn.com | Administrator | 05/06/2008 09:39:59 | Active |
| Savoy, Tony | Tony.Savoy@datareturn.com | Administrator | 04/25/2008 12:11:40 | Active |
| Stuhl, Katya | katya.stuhl@datareturn.com | Administrator | 05/06/2008 10:35:01 | Active |
| Subramanian, Mani | Mani.Subramanian@datareturn.com | Administrator | 05/05/2008 12:27:53 | Active |
| Thurman, Wade | Wade.Thurman@datareturn.com | Administrator | 05/04/2008 05:41:50 | Active |

[Deactivate]  [ ] Reset Account

| Name: | Organization | Memory (MB) | Proc. (MHz) | Storage (GB) | Active |
|---|---|---|---|---|---|
| Company 1 | Organization 1 | 20480 | 10000 | 250 | ☑ |
| Company 2 | Organization 2 | 20480 | 10000 | 250 | ☑ |
| Company 3 | Organization 3 | 20480 | 10000 | 250 | ☑ |
| Company 4 | Organization 4 | 20480 | 10000 | 250 | ☑ |
| Company 5 | Organization 5 | 20480 | 10000 | 250 | ☑ |
| Company 6 | Organization 6 | 20480 | 10000 | 250 | ☑ |
| Company 7 | Organization 7 | 20480 | 10000 | 250 | ☑ |
| Company 8 | Organization 8 | 20480 | 10000 | 250 | |
| Company 9 | Organization 9 | 20480 | 10000 | 250 | |

SYSTEM AND METHOD FOR CUSTOMER PROVISIONING IN A UTILITY COMPUTING PLATFORM

CROSS REFERENCE TO RELATED APPLICATIONS

This patent application claim priority to U.S. Provisional Application Ser. No. 61/054,576, filed on May 20, 2008. The entirety of this prior application is hereby incorporated herein by reference.

BACKGROUND

The technology described in this patent application is generally directed to computer-implemented systems and processes for provisioning and managing one or more customer virtual data centers within a utility computing platform. A utility computing platform may include one or more physical data centers each comprising processor, storage and network infrastructure that may be shared by a plurality of customers. Such utility computing platforms may include a variety of managed hosting or co-location computing platforms that are presently known in the art. These platforms may provide virtual resource capabilities for the plurality of customers by employing a virtualization control system that abstracts and granularizes the processor, storage and network hardware into virtual resources that may be allocated by a system administrator in order to provide each customer with a virtual data center.

FIG. 1, for example, is a system diagram 10 of a known managed hosting computer platform including a virtualization control system 20. The platform 12 includes storage infrastructure 14, server infrastructure 16 and network infrastructure 18. This infrastructure is controlled and managed by the virtualization control system 20, which may be, for example, the Virtual Center Management Server from VMWare, or any other type of system for virtualizing the storage, server and network infrastructure resources. The virtualization control system 20 is configured and managed by a system administrator 30, which is typically associated with the owner/operator of the managed hosting computer platform 12.

One common use of such a managed hosting computer platform is for hosting customer web sites. Web browsers 28 access a customer's hosted web site via the Internet 24, which connects to the managed hosting platform 10 via one or more connections 22 to the network infrastructure 18. Customer systems 26 may also access and control the application environment of their virtual resources through an Internet connection, and may also have access to a system viewing component of the system 12 that enables the customer to view the configuration of their virtual resources hosted by the managed hosting platform 12. If the customer is interested in creating, modifying or upgrading their virtual resources at the managed hosting platform, then the customer typically contacts the system administrator 30, by phone, email or other form of communication, and makes a request to the system administrator 30. The system administrator 30 then interacts with the virtualization control system 20 in order to configure or reconfigure the customer's virtual resources to match their request, typically by adding one or more virtual servers to the resource pool dedicated to a particular customer. This process can take several days, or longer, however, depending on the workload of the system administrator and the efficiency with which the managed hosting platform 12 is operated in terms of hardware setup and provisioning.

SUMMARY

The technology described herein provides many advantages over the known managed hosting virtual computing platforms such as described above. In particular, disclosed herein is a system and method for customer provisioning in a utility computing platform. Using the software and hardware described in this patent application, customers can acquire a dedicated virtual resource pool of processing, memory, storage and networking, from which the customer can deploy virtual servers on demand and in a dynamic real-time manner that is not possible in the known managed hosting environments. Customers may perform self-configuring, control and management of their virtual resources through an Internet web portal application that allows the customer to dynamically provision servers from a pre-allocated pool of dedicated computing resources. Using this technology, servers can be configured and provisioned in a matter of minutes, or less, grouped and organized according to role or other basis, and dynamically extended according to utilization. In addition, a complete reporting and analysis interface is provided through the web portal application that enables customers to review, analyze and diagnose any problems in their virtual data center applications.

An exemplary utility computing platform described herein includes a virtualization control system coupled to physical server, disk drive and networking resources and configured to partition the physical resources into virtual resources including virtual processor, memory and storage resources. The utility computing platform comprises a customer console application coupled to the virtualization control system, and accessible via an Internet connection to a customer computing system operating a web browser interface. The customer console application enables the customer, through the web browser interface, to create and manage one or more virtual servers within a customer environment by associating an amount of virtual processor, memory and storage resources with the one or more virtual servers.

BRIEF DESCRIPTION OF THE DRAWINGS

FIGS. 5A-5E depict graphical user interface screens of an exemplary administration console for creating a customer environment;

FIGS. 6A-6D depict graphical user interface screens of an exemplary administration console for adding a network connection to a customer environment;

FIGS. 7A-7C depict graphical user interface screens of an exemplary administration console for upgrading a customer environment;

FIG. 12 depicts a graphical user interface screen of an exemplary customer provisioning console for logging into the customer provisioned utility computing platform;

FIGS. 20A-20J depict graphical user interface screens of the exemplary customer provisioning console for creating a new server within a customer environment;

FIG. 27 depicts a graphical user interface screen of the exemplary customer provisioning console for viewing customer transaction history;

FIG. 29 depicts a graphical user interface screen of the exemplary customer provisioning console for viewing authorized customer users of the customer provisioned utility computing platform;

FIGS. 32A-32B depict graphical user interface screens of an exemplary administration console for provisioning a computing cluster;

FIG. 33 depicts a graphical user interface screen of an exemplary administration console for managing resource templates;

FIGS. 34A-34D depict graphical user interface screens of an exemplary administration console for performing various system administration tasks.

DETAILED DESCRIPTION

Figure 1:
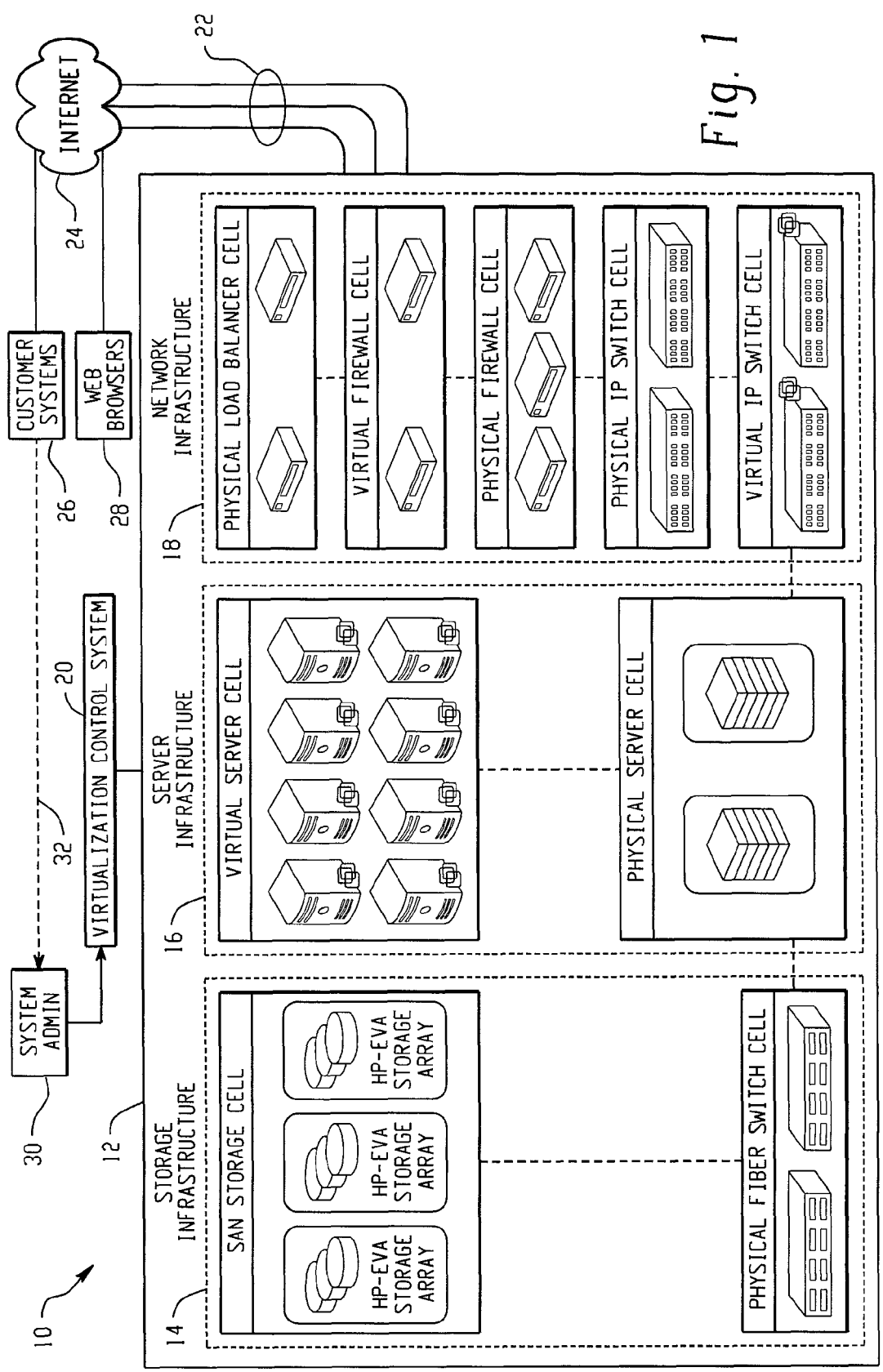
FIG. 1 is a system diagram of a known managed hosting computer platform including a virtualization control system.
Figure 2:
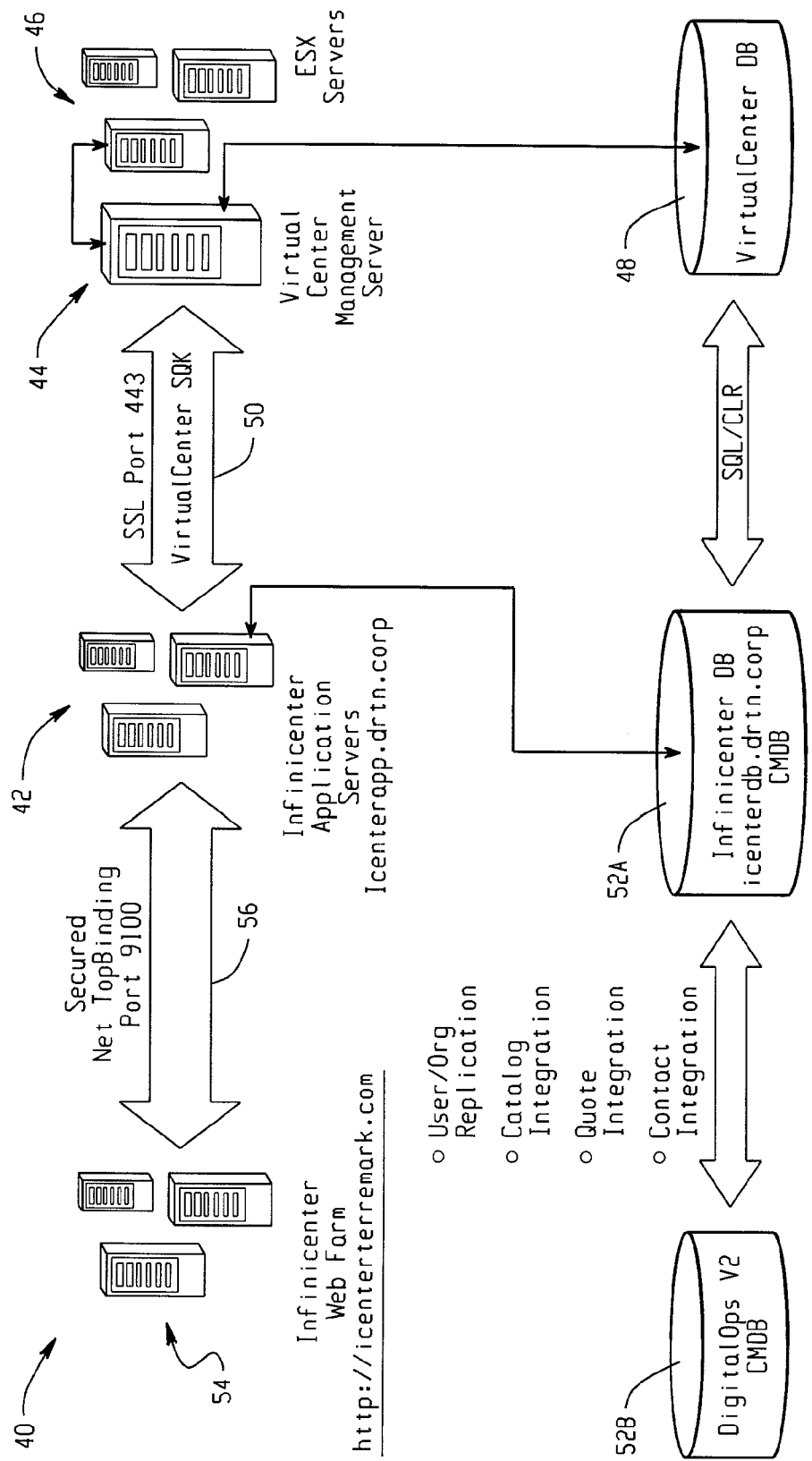
FIG. 2 is a system diagram of an exemplary customer provisioned utility computing platform.

FIG. 2 is a system diagram 40 of an exemplary customer provisioned utility computing platform. The system 40 includes a Web Farm 54, Application Servers 42, configuration management databases 52A, 52B and a virtualization control system 44 coupled to a plurality of virtual server resources 46 and also coupled to a virtualization control system database 48.

Operationally, customers of the system access the customer provisioning utility computing platform 40 using a web browser that communicates via the Internet to a web server in the Web Farm 54, which in turn is coupled to one of the application servers 42 via a secure connection 56. The application servers 42, in combination with the web servers 54, enable the software applications (as further detailed in the remaining drawing figures) to create, manage and provision their own virtual data center resources, including the creation and provisioning of virtual server resources 54. The application servers 42 are, in turn, coupled to and communicate with the virtualization control system 44 via a secure SSL port 50.

Customer resource and configuration data, resource catalog information, quotation information, and other data necessary to enable the customers to self-provision their virtual data center resources are stored in the configuration management database 52, which in turn is coupled to the virtualization control system database 48.

Figure 3:
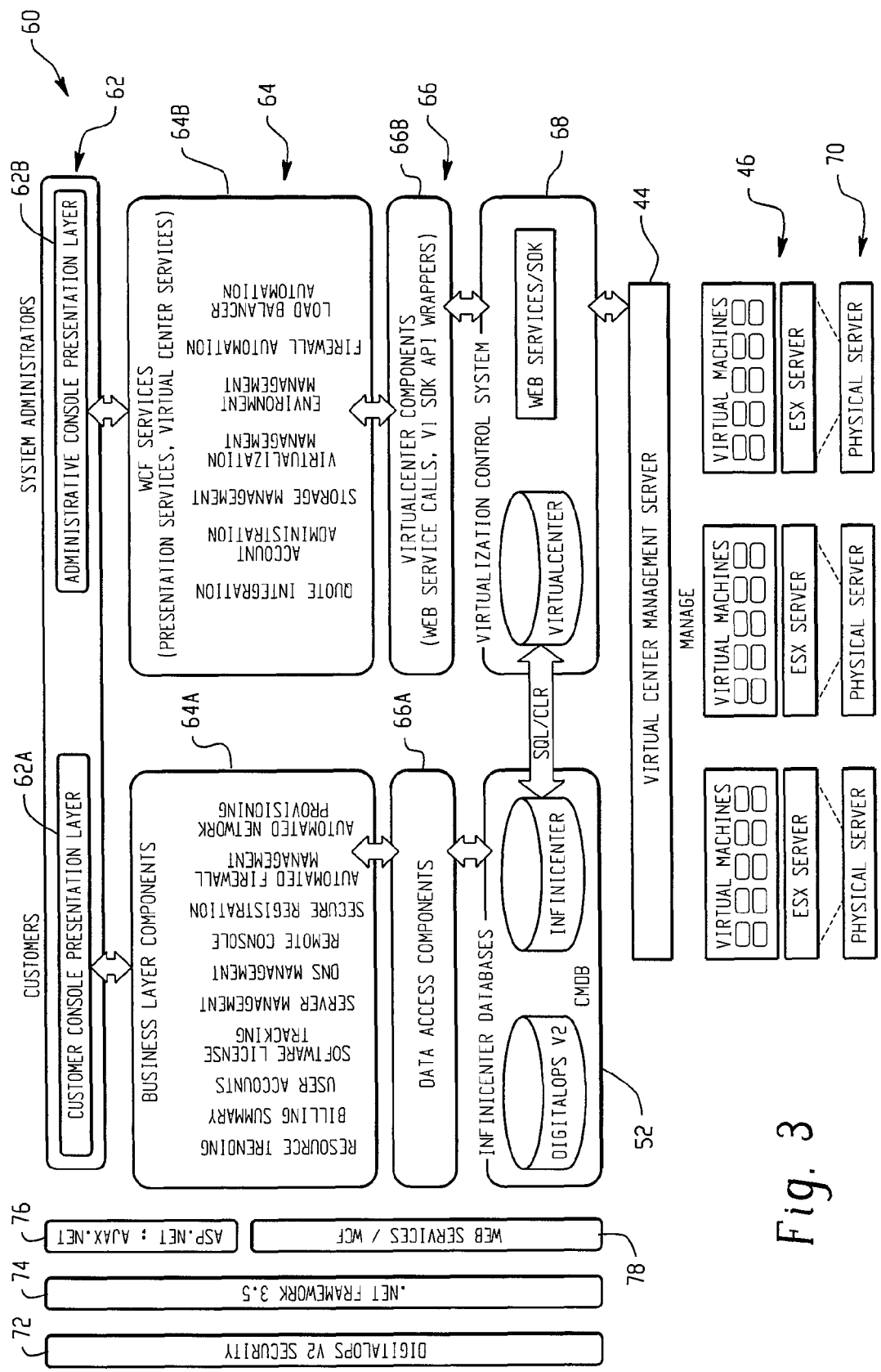
FIG. 3 is software architecture diagram of the exemplary customer provisioned utility computing platform shown in FIG. 2.

FIG. 3 is software architecture diagram 60 of the exemplary customer provisioned utility computing platform shown in FIG. 2. The software system includes a presentation layer comprising a customer provisioning console 62A and an administration console 62B, a functional application layer 64 comprising business layer components 64A associated with the customer provisioning console 62A and virtual center services components 64B associated with the administration console 62B. Also shown in FIG. 3 is a data access layer 66 coupling the functional application layer components 64 to database servers 52 and to the virtualization control system 68. The data access layer 66 includes data access components 66A, which enable the business layer components 64A to communicate with the configuration management database 52, and virtual center components 66B, which enable the virtual center services components 64B to communicate with the virtualization control system 68. The virtual center components 66B include web service calls, virtual center SDK/API interfaces and API wrappers that are associated with the particular virtualization control system 68, and which enable the business layer components 64A and the virtual center services components 64B to interface with and control the virtualization control system 68.

The presentation, functional application and data access layers 62, 64 and 66 are preferably programmed using a variety of known programming tools, such as ASP.net/Ajax-.net 76, Web Services/WCF 78, and .Net Framework 3.5 74. Other programming tools may be used, as necessary, to enable the functionality and graphical user interface of the software technology described herein.

The business layer components 64A shown in FIG. 3, and described in more detail functionally and graphically below, enable the customers to create, provision and analyze their own virtual data center resources through the data access layers 66 and database integration with the virtualization control system 68. These components 64A provide resource trending, billing summary, user accounts, software license tracking, server management, DNS management, remote console, secure registration, automated firewall management and automated network provisioning functions through the customer console presentation layer 62, which is accessible to the customer via a standard web browser application.

The virtual center services components 64B shown in FIG. 3, and described in more detail functionally and graphically below, enable a system administrator to quote, create and manage customer environments, and to assist the customer, where necessary, in provisioning and managing its virtual data center resources. These components 64B provide quote integration, account administration, storage management, virtualization management, environment management, firewall automation and load balancer automation.

Figure 3A:
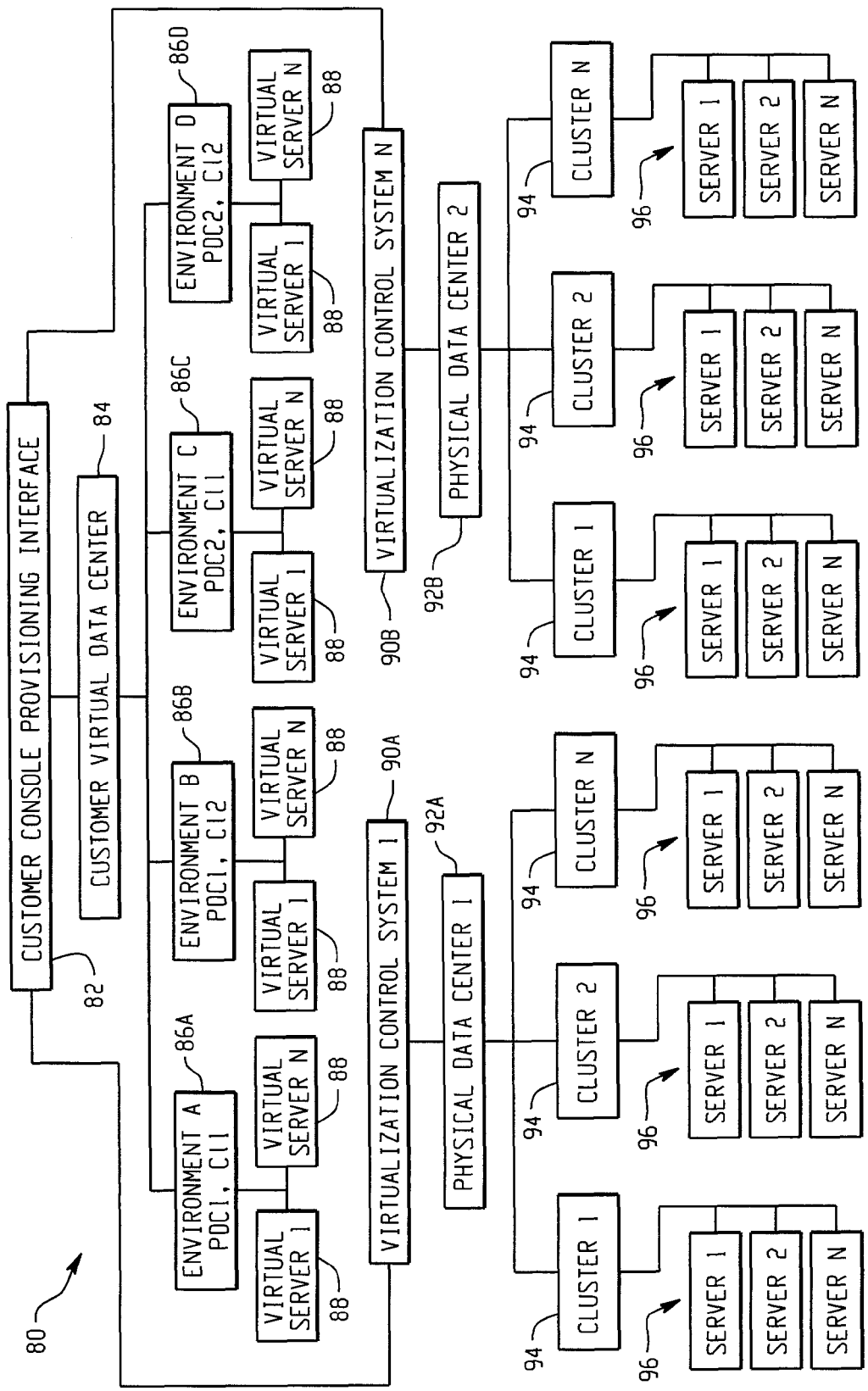
FIG. 3A is an exemplary extended system architecture diagram showing a customer virtual data center partitioned into multiple customer environments through the use of a customer provisioning interface module.

FIG. 3A is an exemplary extended system architecture diagram 80 showing a customer virtual data center partitioned into multiple customer environments 86A-86D through the use of a customer provisioning interface module 82. Using this interface module 82, a customer can manage their own virtual data center 84 comprising one or more customer environments 86A-86D. Each customer environment may comprise one or more virtual servers 88 located within a cluster of virtual servers of a single physical data center. The environments may be located at different physical data centers. FIG. 3A shows the customer console provisioning interface 82 coupled to two virtualization control systems 90A and 90B, each of which manages a separate physical data center 92A, 92B. These physical data centers 92A, 92B may be geographically co-located or they may be widely dispersed. Moreover, although FIG. 3A shows just two such connections to virtualization control systems, there is no limit on the number of such systems that the customer console provisioning interface 82 may be connected to. Each of the physical data centers 92A, 92B includes a plurality of computing clusters 94. A computing cluster includes a plurality of physical servers 96.

The virtualization control systems 90A, 90B abstract the server (and storage and network) hardware 96 so as to provide a more granular virtual server (and virtual storage and network) resource allocation that can be accessed by the customer. By coupling the customer console provisioning interface 82 to a plurality of virtualization control systems 90A, 90B, the customer can create, provision and manage its own virtual resources across numerous virtual environments 86A-86D which physically span multiple physical data centers. For example, customer Environment A 86A includes several virtual servers 88 that are physically located at cluster 1 (94) of physical data center 1 (92A), which hardware is in turn virtualized by virtualization control system 90A. Customer Environment C, however, includes virtual servers 88 that are physically located at cluster 1 (94) of physical data center 2 (92B), which is in turn virtualized by virtualization control system 90B. The difference in physical location is irrelevant to the customer, however, because the customer console provisioning interface 82 is able to provide the customer with an abstracted view of its virtual data center assets that span multiple virtualization control systems and multiple geographic locations.

Figure 4A:
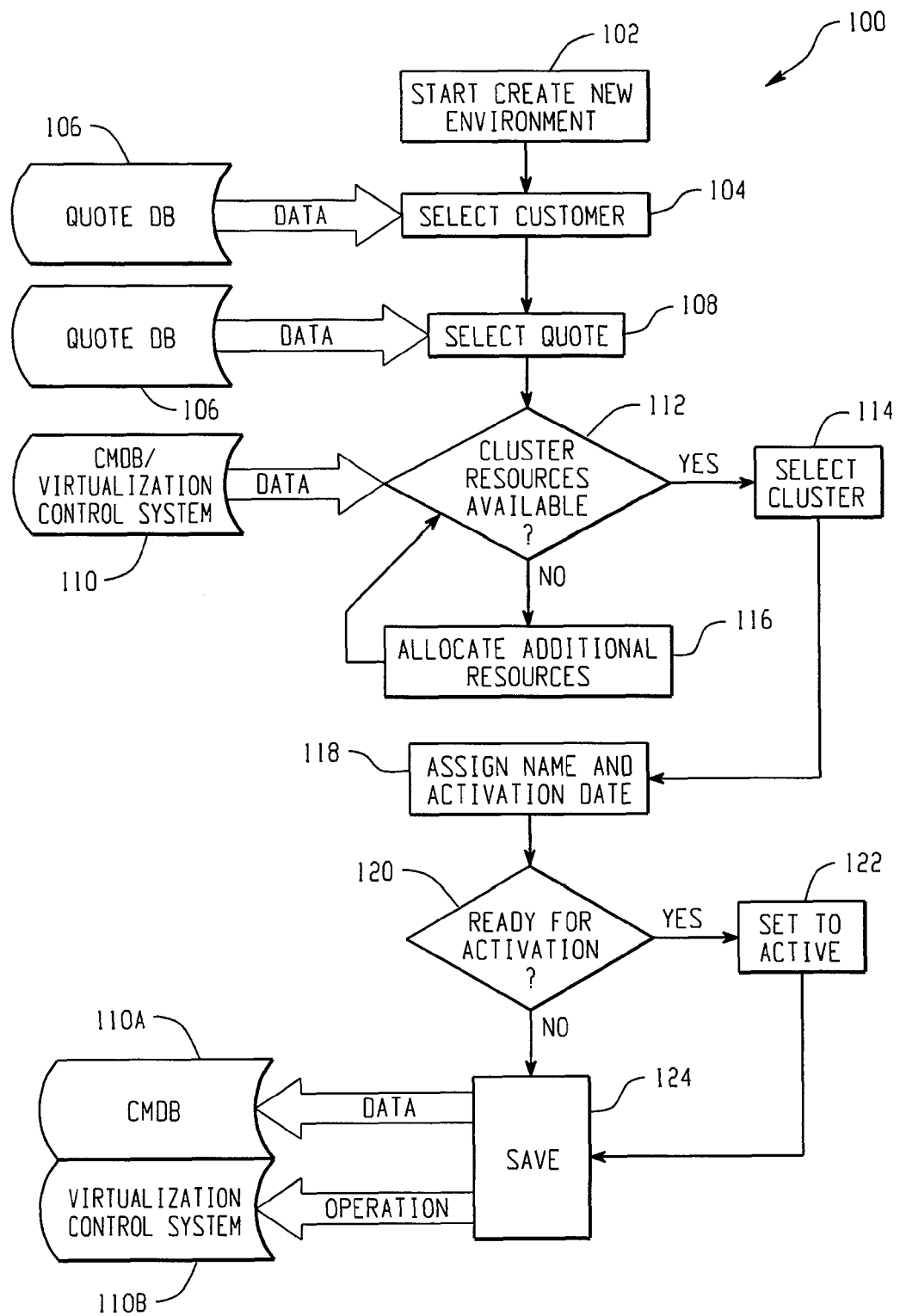
FIG. 4A is an exemplary flow diagram depicting a method for adding a new customer environment to a customer provisioned utility computing platform.

FIG. 4A is an exemplary flow diagram 100 depicting a method for adding a new customer environment to a customer provisioned utility computing platform. The method begins at step 102 where a system administrator, preferably, begins the process of creating a new customer environment. Although certain functionality is described herein as being performed by a system administrator, it is possible that these same functions may be accessible to and executed by a customer through the customer console provisioning interface described in more detail below. At step 104 the system administrator selects a customer, and quotation information for that customer is retrieved from a quotation database 106, which may be separate from or integrated into the configuration management database 110A. A quote is selected at step 108. At step 112, the system administrator determines whether adequate computing cluster resources are available to create the new customer environment. In this step, information from the configuration management database and/or the virtualization control system 110 may be accessed. If sufficient computing cluster resources are available, then at step 114 a cluster is selected for the new customer environment. If sufficient resources are not available, however, then at step 116 additional resources are allocated to the virtualization control system 110B. This step 116 may include physically installing additional server or other computing resources and making these additional computing resources accessible to the virtualization control system 110B. Control then passes to step 118, where a name is assigned to the new customer environment and an activation date is associated with the new environment. At step 120 the system determines whether the new environment is ready for activation. If so, then the environment is set to active at step 122 and saved to the system at step 124. Saving the new environment to the system causes data to be written into the configuration management database 110A, and also causes commands to flow through the SDK/API data interface layer 66B to the virtualization control system 110B in order to setup the logical configuration of the new environment within the allocated cluster of computing resources managed by the virtualization control system 110B. (FIGS. 5A-5E, discussed below, depict graphical user interface screens of an exemplary administration console for creating a customer environment.)

Figure 4B:
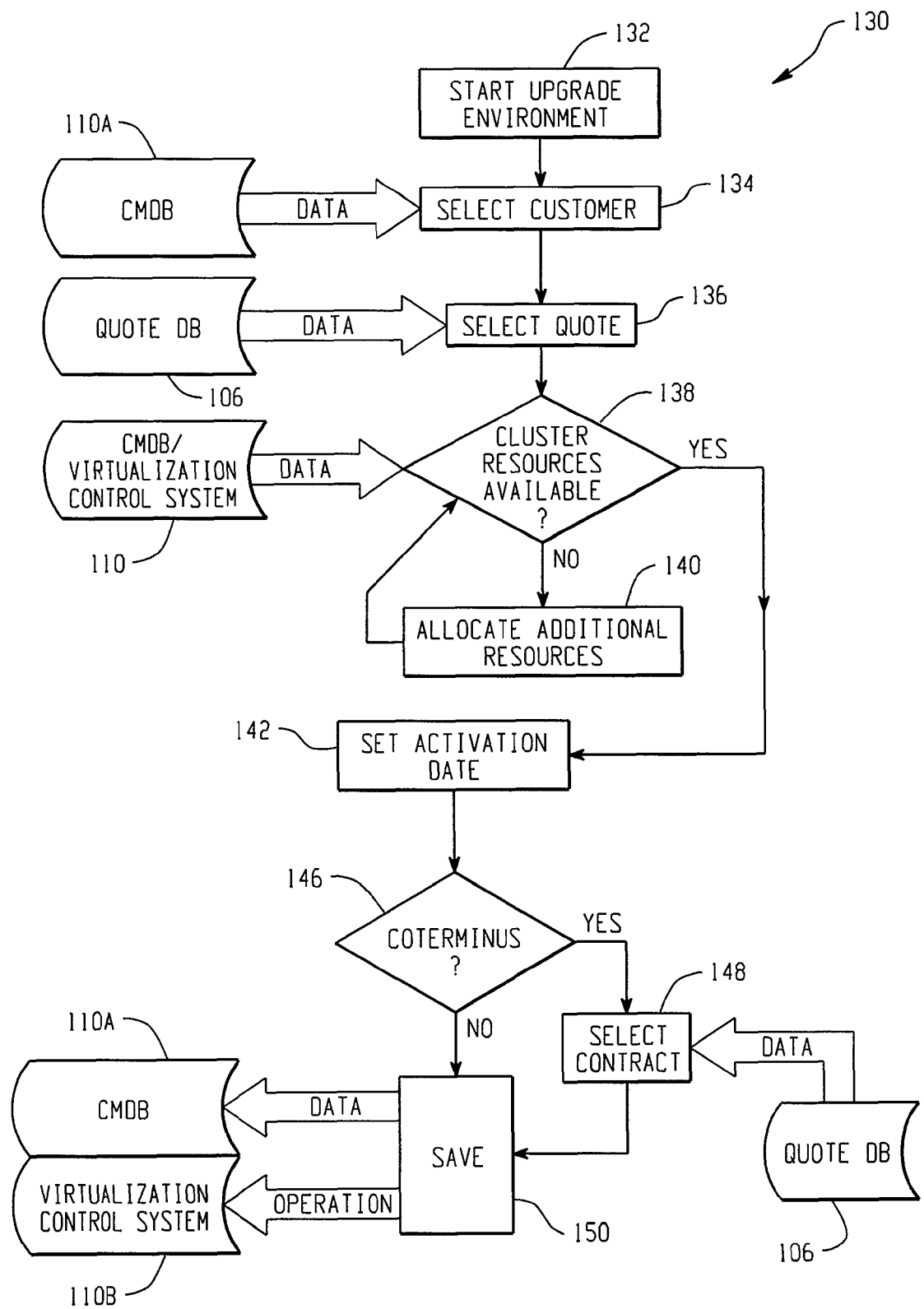
FIG. 4B is an exemplary flow diagram depicting a method for upgrading an existing customer environment in a customer provisioned utility computing platform.

FIG. 4B is an exemplary flow diagram 130 depicting a method for upgrading an existing customer environment in a customer provisioned utility computing platform. The method begins at step 132 where a system administrator, preferably, begins the process of upgrading the customer environment. Although certain functionality is described herein as being performed by a system administrator, it is possible that these same functions may be accessible to and executed by a customer through the customer console provisioning interface described in more detail below. At step 134 the system administrator selects a customer and at step 136 quotation information for that customer is retrieved from a quotation database 106, which may be separate from or integrated into the configuration management database 110A. At step 138, the system administrator determines whether adequate computing cluster resources are available to upgrade the customer environment. In this step, information from the configuration management database and/or the virtualization control system 110 may be accessed. If sufficient computing cluster resources are available, then at step 142 an activation date is set for the upgrade environment. If sufficient resources are not available, however, then at step 140 additional resources are allocated to the virtualization control system 110B. This step 140 may include physically installing additional server or other computing resources and making these additional computing resources accessible to the virtualization control system 110B. At step 146, it is determined whether the upgrade quote is coterminous with another customer quotation/contract, and if so then the quotation information is obtained from the quote database 106 at step 148. The upgraded environment is then saved to the system at step 150. Saving the upgraded environment to the system causes data to be written into the configuration management database 110A, and also causes commands to flow through the SDK/API data interface layer 66B to the virtualization control system 110B in order to setup the logical configuration of the upgraded environment within the allocated cluster of computing resources managed by the virtualization control system 110B. (FIGS. 7A-7C, discussed below, depict graphical user interface screens of an exemplary administration console for upgrading a customer environment.)

FIGS. 5A-5E depict graphical user interface screens of an exemplary administration console 190 for creating a customer environment. As detailed in FIG. 3, this administration console may be used for quote integration, account administration, storage management, virtualization management, customer environment management, firewall automation and load balancer automation, as well as other system-level functions. The administration console may include these WCF services and communicates directly with the one or more virtualization control systems 68 using virtual interface components 66.

Figure 5A:
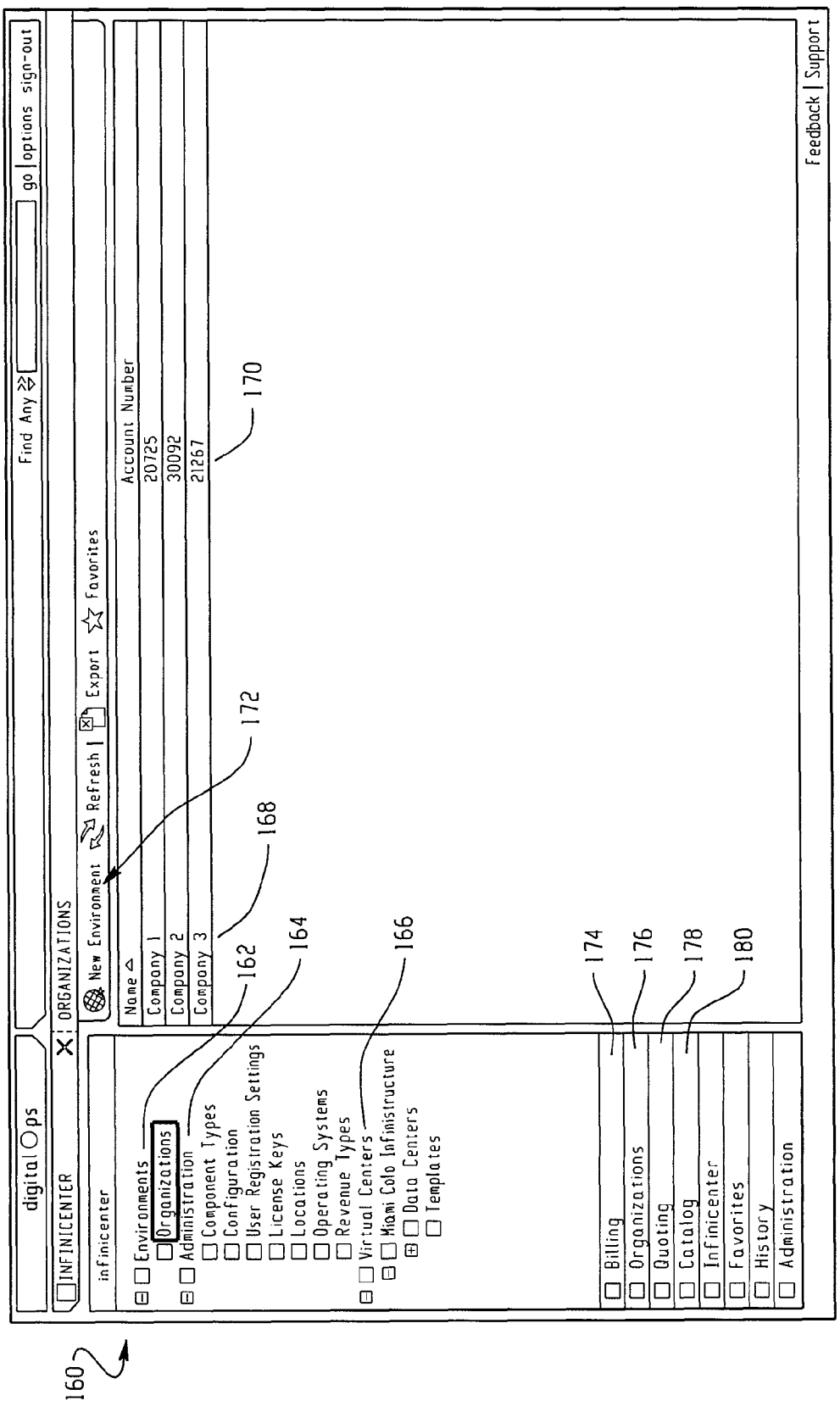

FIG. 5A depicts an opening screen for the exemplary administration console 190. This interface includes an environment selector (by organization) 162, an administration function selector 164, and a virtual center selector 166. The administration function selector 162 is utilized to select various administration functions, including component types, configuration, user registration settings, license keys, locations, operations systems and revenue types. Other functions of the administration console 190 are accessible through billing selector 174, organization selector 176, quoting selector 178 and catalog selector 180. Each of these selectors engages additional interface screens for the administrator to manage billing, organizations, quotes for virtual services and catalogs of available products. The main display area of the opening screen shows that the organization selector 162 has been activated, thereby listing the organizations (i.e., customers) by name that are presently associated with the system. This display lists the customers 168 and customer account numbers 170 in a table format. Also available from this screen is a "New Environment" selector 172, which is used by the administrator to associate a new virtual environment with a particular customer.

Figure 5B:
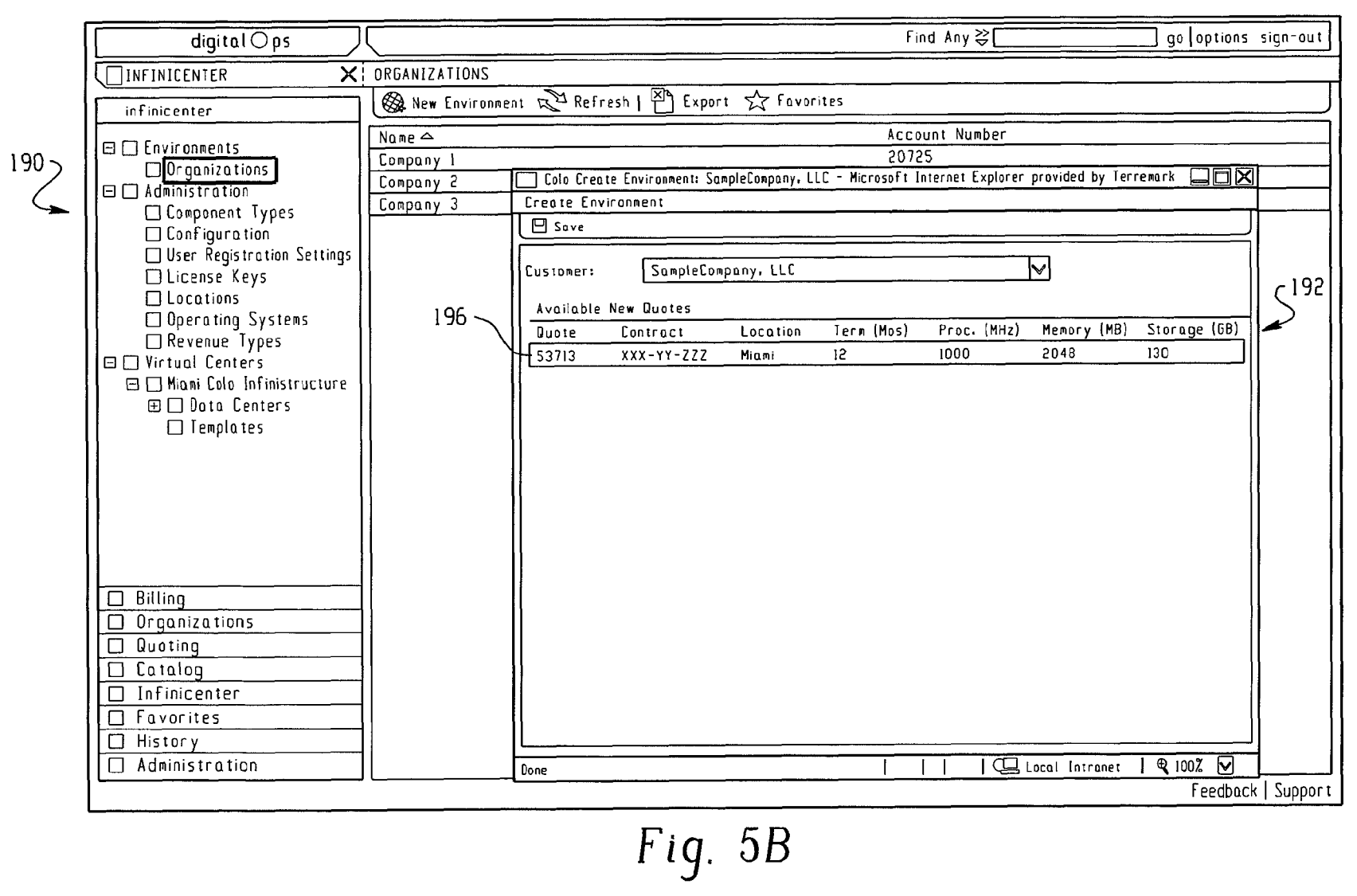
Figure 5C:
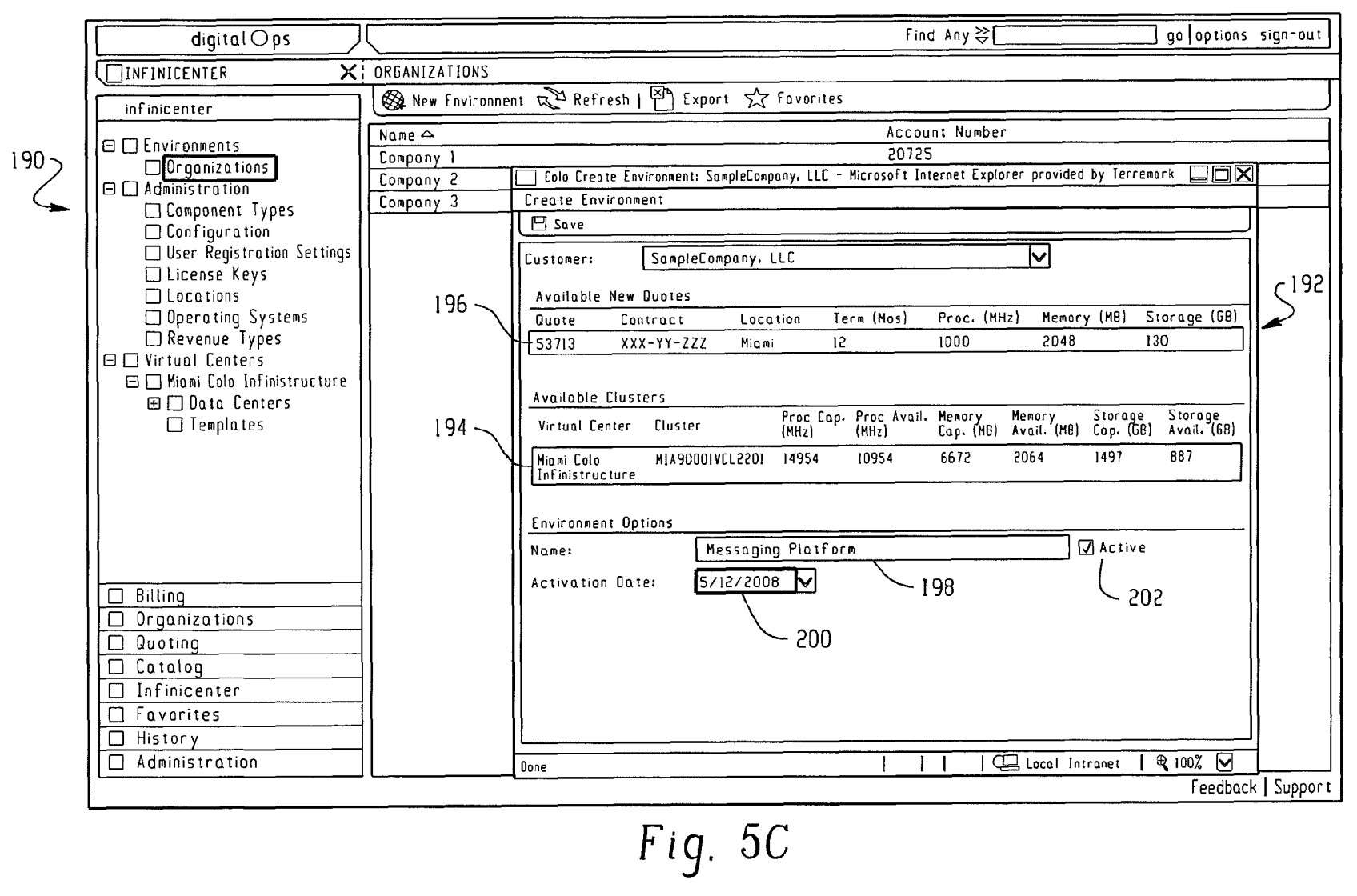

FIG. 5B shows an interface screen 192 displaying a list of available quotes 196 for a selected customer. In this example there is only one quote 196 associated with the selected customer. The available quote identifies the amount of processing (1000 MHz), memory (2048 MB) and storage (130 GB) associated with the customer quotation (i.e., request for virtual resources), a term, location, contract number and quotation number. FIG. 5C shows an interface screen 192 in which the quote for the new environment has been selected 196, and the system administrator has provided a name 198 for the new environment, provided an activation date 200, and set the new environment to active 202.

Figure 5D:
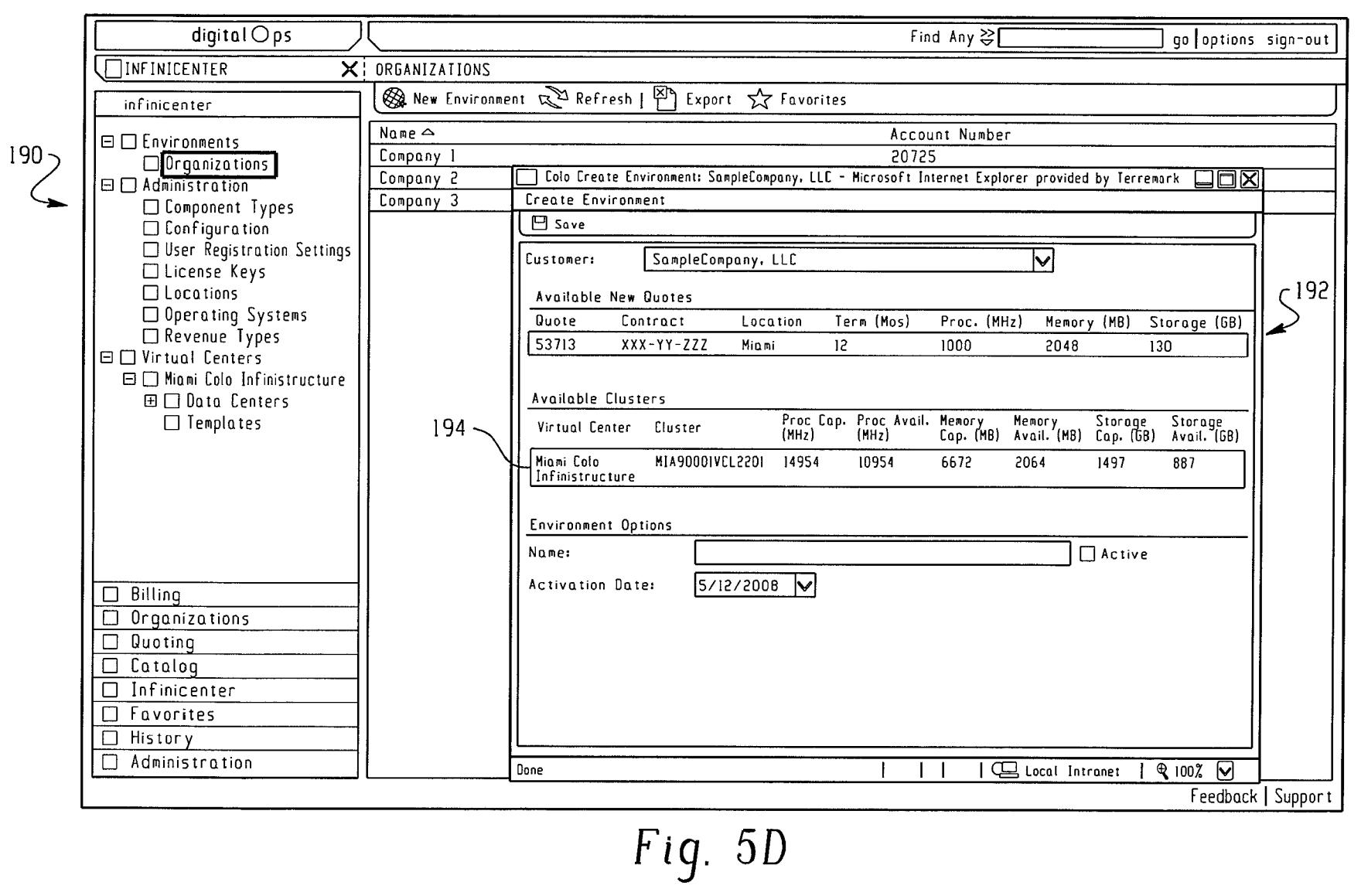

FIG. 5D depicts a graphical user interface screen 192 for selecting a particular virtual center 194 within which the new customer environment is to be created. This screen is activated in response to selection of the "New Environment" selector 172 in the main screen 190. Here, in screen 192, the customer is listed, along with available new quotes 196 for the particular customer. Available physical clusters 194 are listed in the bottom portion of the screen 192 by virtual center. In this example figure, only one virtual center is available for physical provisioning, but it is envisioned that the system disclosed herein could be used with multiple geographically dispersed virtual centers, in which case more than one virtual center would be present in the screen 192, depending upon the availability of physical clusters of computing resources in those dispersed virtual centers. Each virtual center is preferably controlled by a separate virtualization control system, to which the present system may provide access.

Figure 5E:
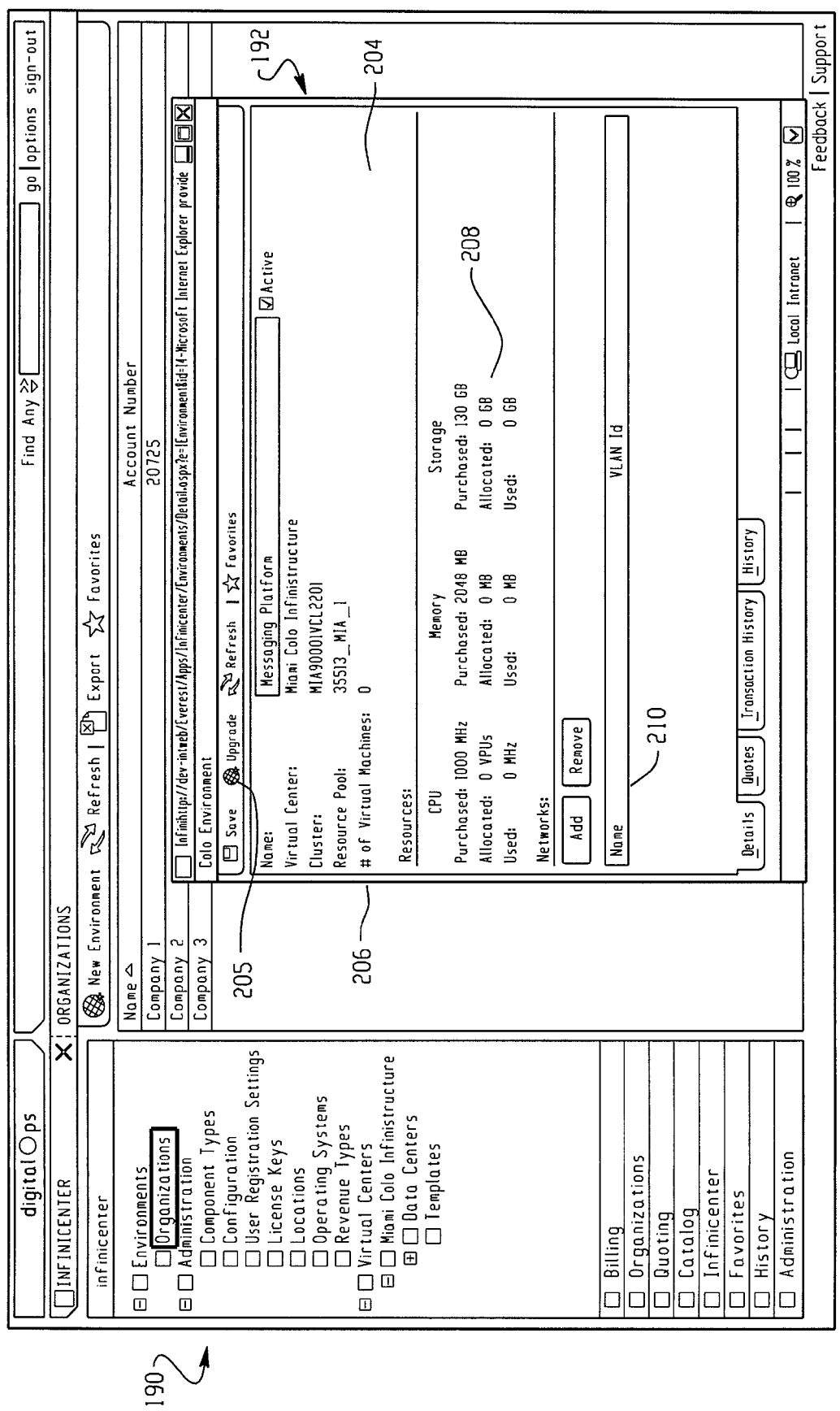

Finally, FIG. 5E is an interface screen 204 depicting the details of the created environment. The top portion of this interface screen indicates the name of the environment and indicates whether it is active or not, lists the virtual center where the environment is physically located, lists the cluster of the virtual center associated with the environment, and identifies a resource pool and a number of virtual machines. In this example, no virtual machines have been associated with this new environment yet. The middle portion of the interface screen provides details regarding the purchased virtual resources 208 associated with the new environment and also lists the amount of such resources that have been allocated and used. The bottom portion of the screen enables the system administrator to associate a particular network connection with the new environment. Additional information regarding the environment, such as related quotes, transaction history and history information is accessible via the tabs located at the very bottom of the interface screen 204. One additional feature shown in FIG. 5E is the "Upgrade" selector 205, which is used to upgrade or otherwise modify an existing customer environment. This "Upgrade" process is described in more detail in FIGS. 4B, and 7A-7C, and accompanying descriptions set forth herein.

Figure 6A:
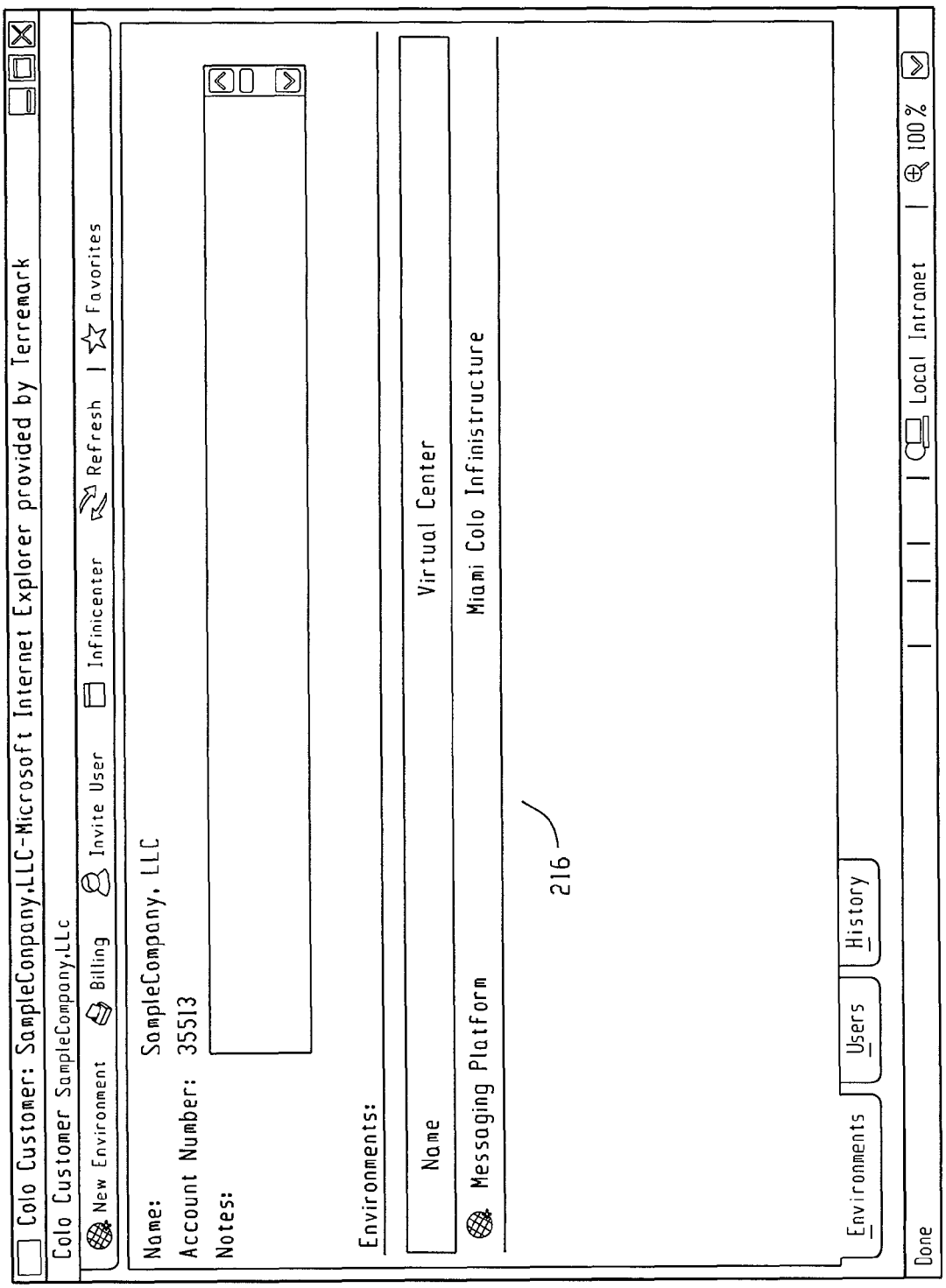
Figure 6C:
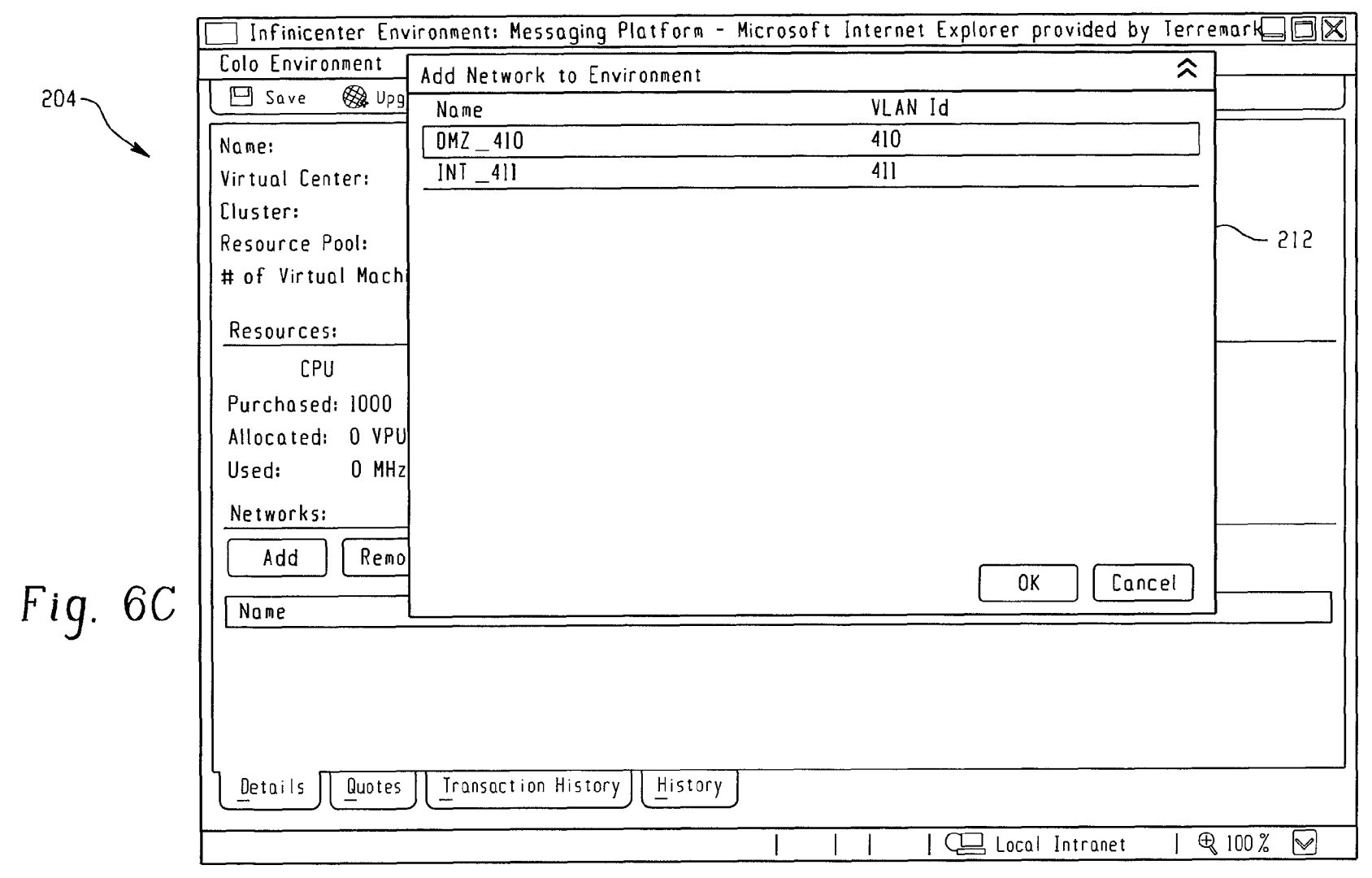

FIGS. 6A-6D depict graphical user interface screens of an exemplary administration console for adding a network connection to a customer environment. In FIG. 6A, a particular customer is selected, and the environments 216 associated with that customer are listed for selection. FIG. 6B depicts the interface screen 204 before the system administrator has completed the steps needed to associate a particular network connection with a selected customer environment. In FIG. 6C, the system administrator is able to add a network 212 to a newly-created customer environment. Once an environment is selected, FIG. 6D depicts the interface screen showing the details of the selected environment, as discussed above, and also showing that a particular network 218 has now been associated with the selected customer environment.

Figure 7B:
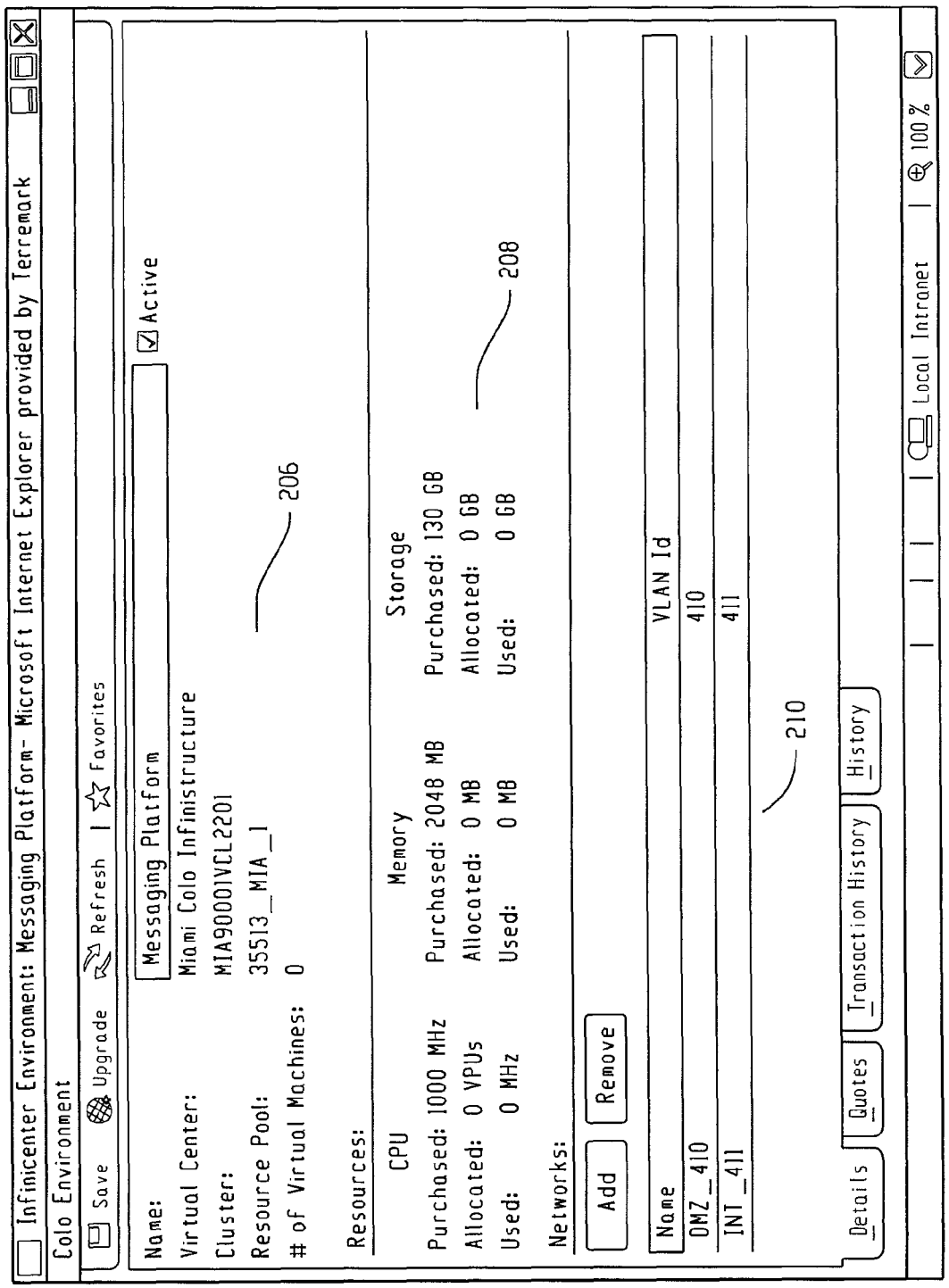

FIGS. 7A-7C depict graphical user interface screens of an exemplary administration console for upgrading a customer environment. FIG. 7A depicts an interface screen 220 providing details of a selected customer environment to be upgraded. In addition to the customer and environment name, listed at the top of the interface screen, this screen 220 includes a listing of available new quotations 222, current and upgraded resources associated with the environment 224, and options 226 such as activation date for the upgrade, and a selector to indicate whether this new upgrade quotation is co-terminus with an existing previously configured quotation. If the upgrade quotation is co-terminus, then a selector is provided for selecting the previous quotation with which to associate this new upgrade quotation for termination purposes. In FIG. 7A, an upgrade quotation listed in area 222 has been selected, which indicates that the customer has requested a 1000 MHz processor upgrade to be associated with this particular environment. By selecting this quotation in interface screen 220, the system upgrades the environment profile data associated with this customer environment such that the new processor configuration has been increased to 2000 MHz from the previously-configured amount of 1000 MHz. FIG. 7B depicts an interface screen 204 of the customer environment prior to being upgraded. Note here that the amount of CPU resource purchased and associated with this particular environment is 1000 MHz. FIG. 7C depicts the same interface screen 204 of the customer environment, but after the upgrade process has been completed through the interface screen 220. Here, the new upgrade processor amount of 2000 MHz is depicted.

Figure 8A:
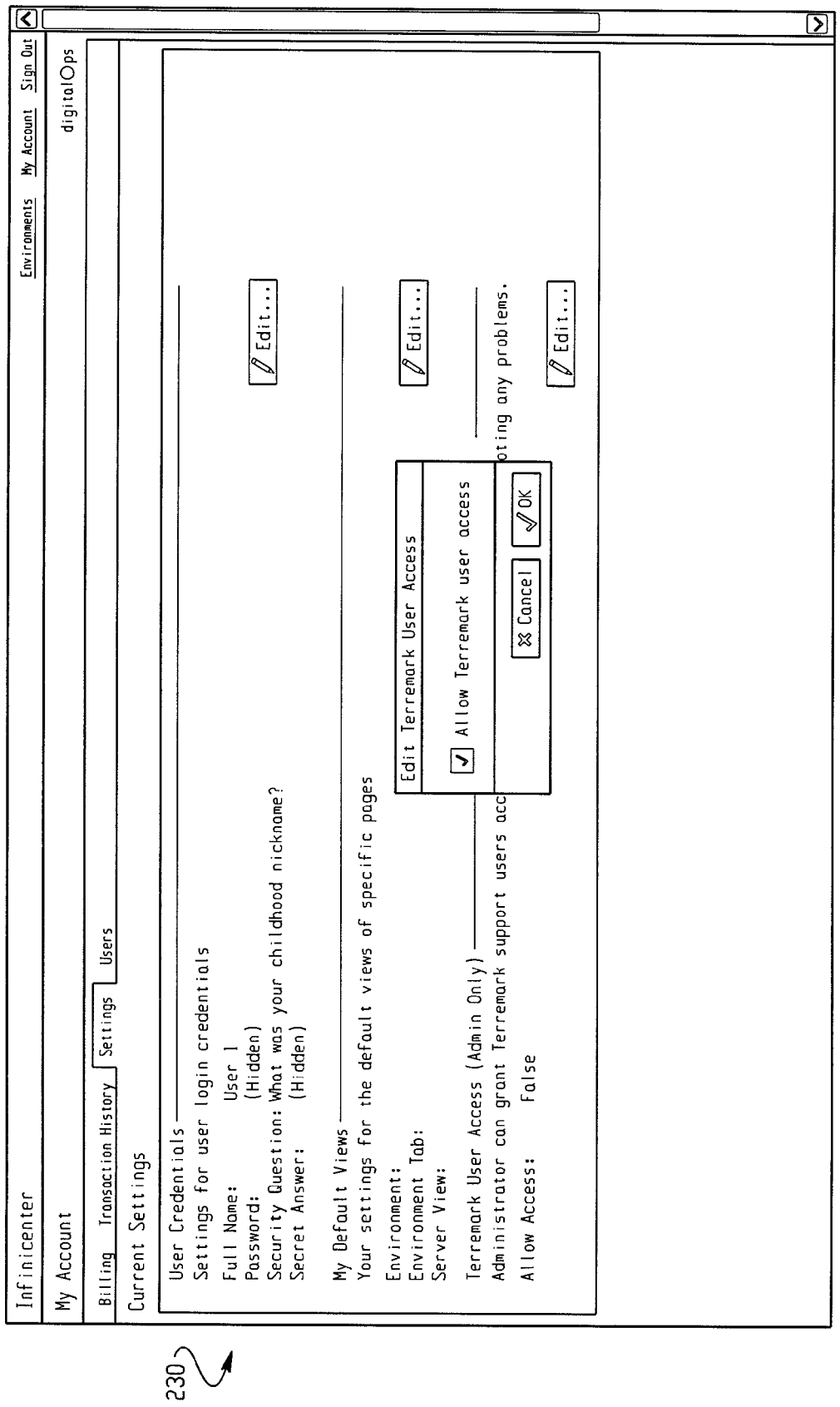
FIGS. 8A-8B depict graphical user interface screens of an exemplary customer provisioning console for enabling a customer administrator to grant access to the customer's environments by a system administrator of the customer provisioned utility computing platform.
Figure 8B:
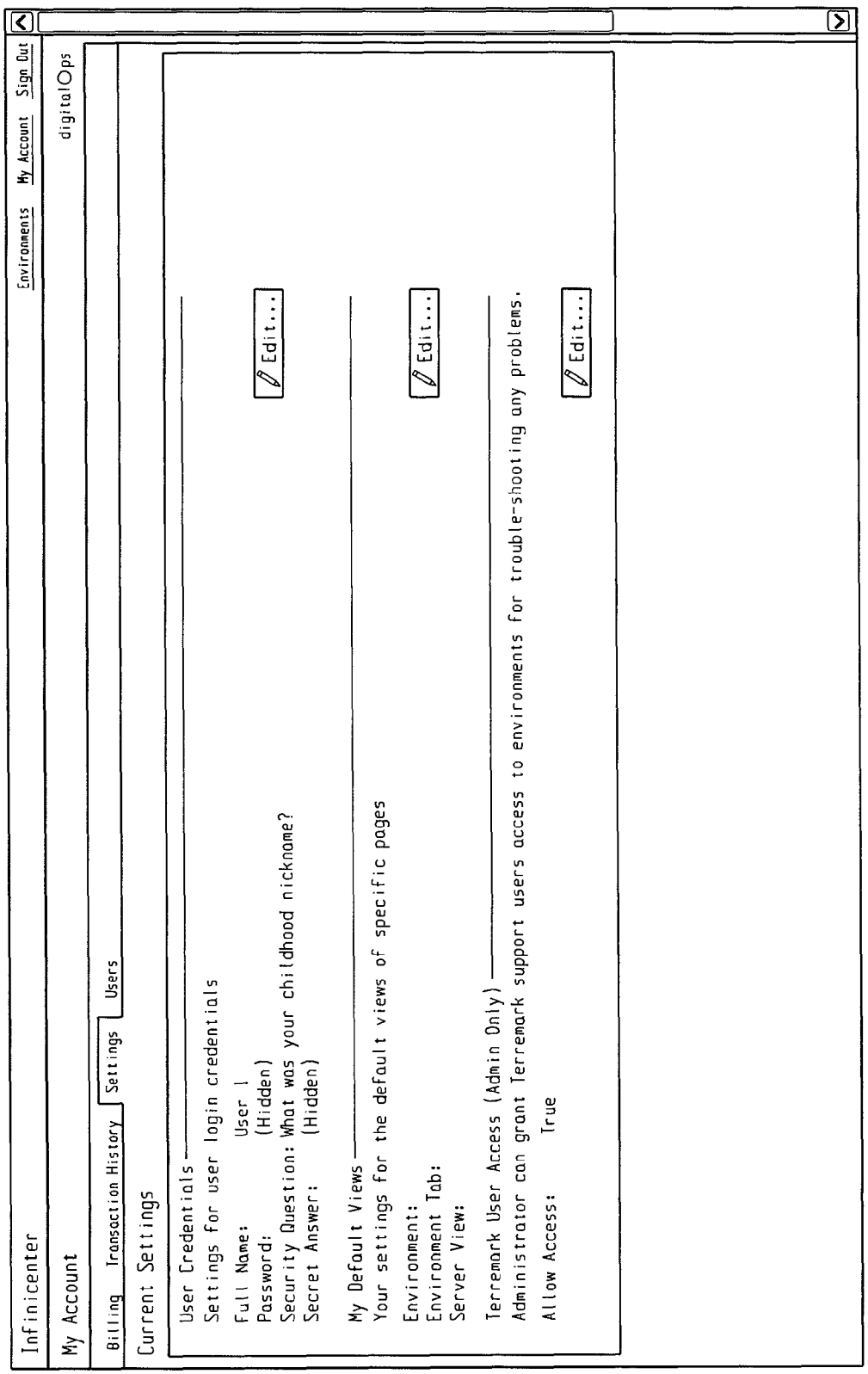

FIGS. 8A-8B depict graphical user interface screens 230 of an exemplary customer provisioning console for enabling a customer administrator to grant access to the customer's environments by a system administrator of the customer provisioned utility computing platform. The customer provisioning console is described in more detail below in connection with FIGS. 11-29.

Figure 9:
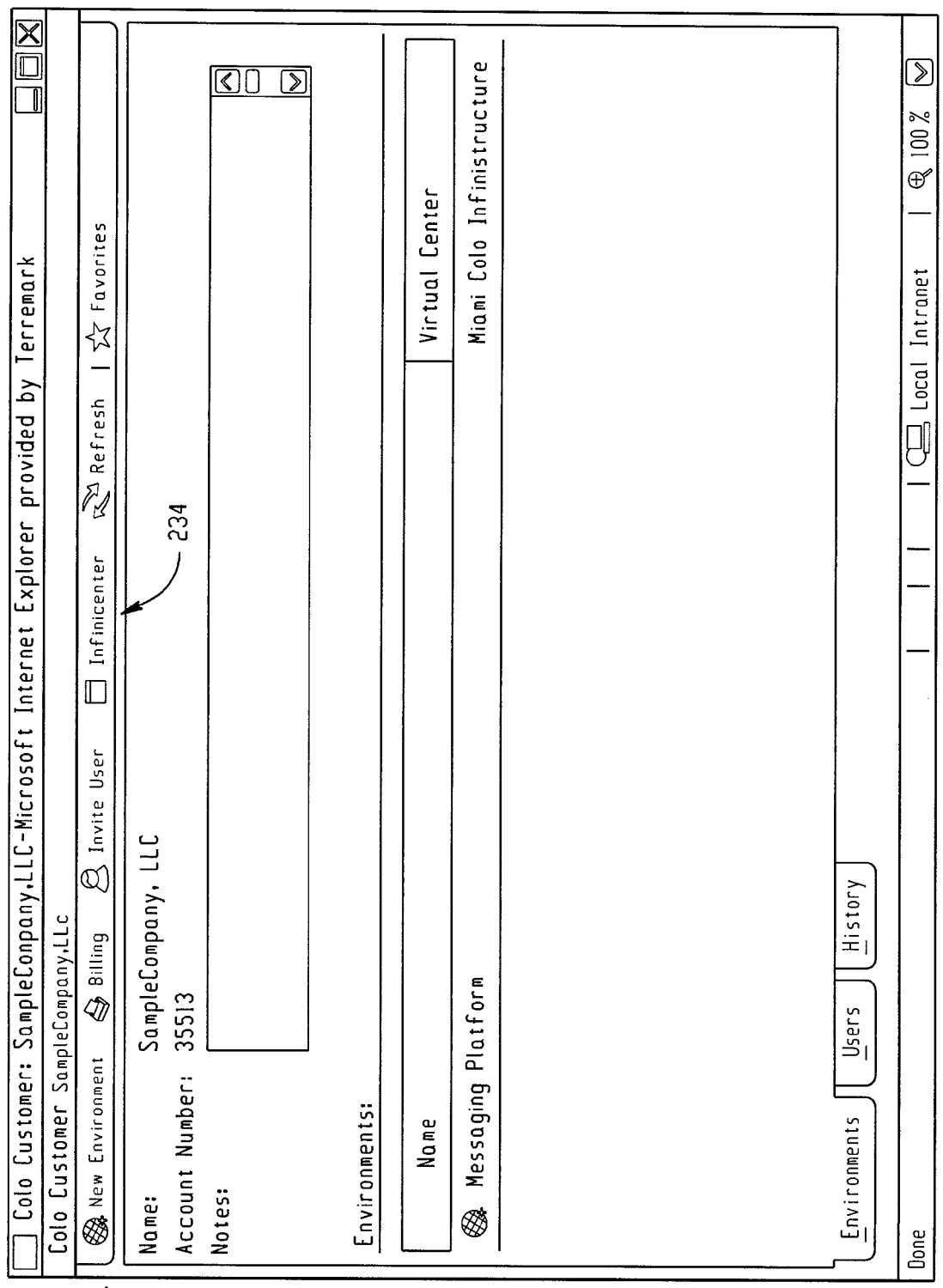
FIG. 9 depicts a graphical use interface screen of an exemplary administration console providing a system administrator access to customer environments through a customer provisioning console.

FIG. 9 depicts a graphical use interface screen 214 of an exemplary administration console providing a system administrator access to customer environments through a customer provisioning console. Here, assuming that the customer administrator has granted access rights to the system administrator (as shown in FIGS. 8A-8B), when the system administrator selects a particular customer environment through the administration console, as shown in FIG. 9, a new selector 234 is presented that enables the system administrator to access the customer's virtual environment through the customer provisioning console described in more detail below in connection with FIGS. 11-29.

Figure 10:
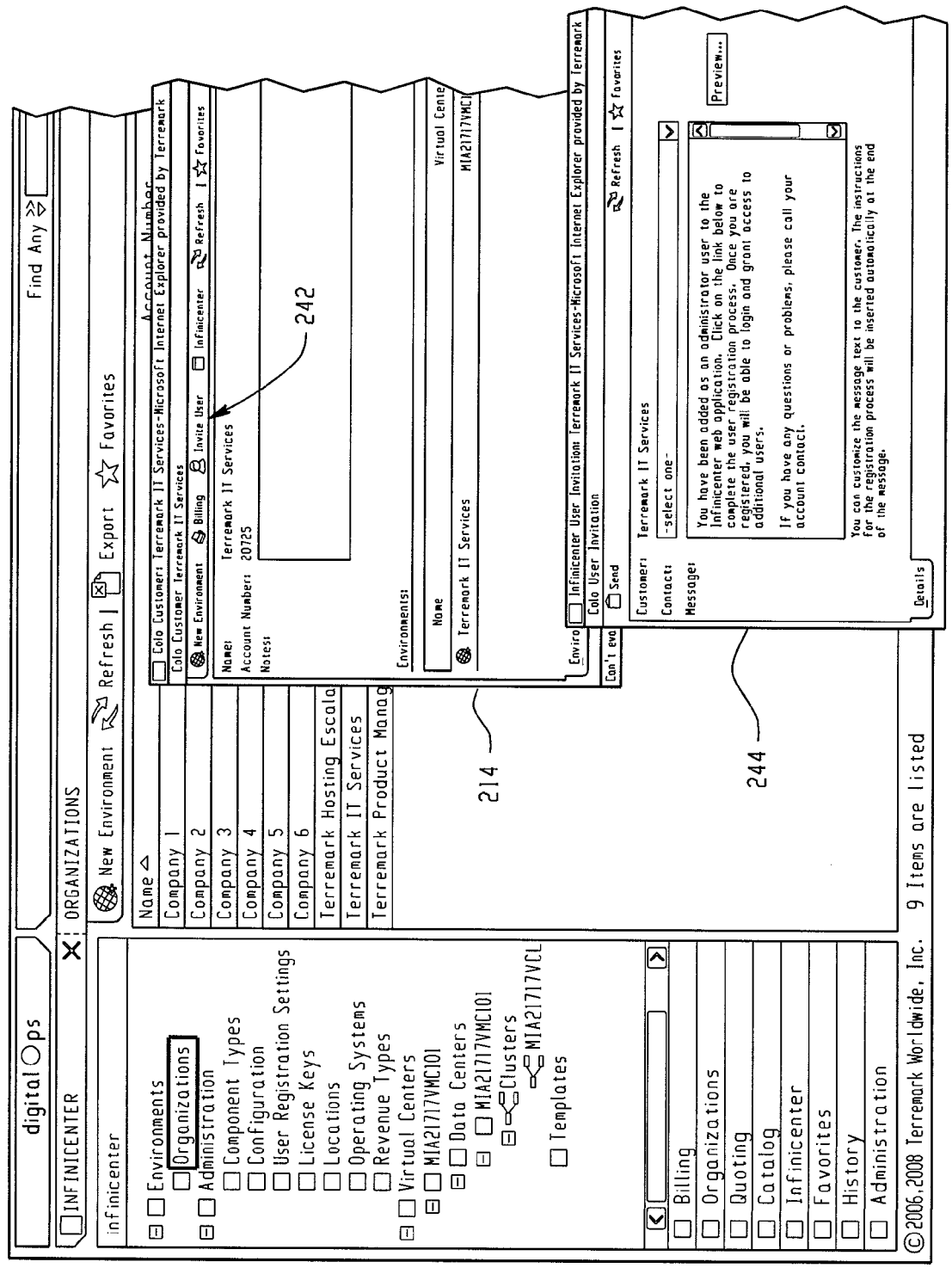
FIG. 10 depicts a graphical user interface screen of an exemplary administration console for inviting a customer contact to become a customer virtual system administrator.

FIG. 10 depicts a graphical user interface screen 240 of an exemplary administration console for inviting a customer contact to become a customer virtual system administrator. Here, the system administrator has selected a particular customer environment as shown in 214. From this screen 214, the system administrator selects the "Invite User" selector 242 in order to send an electronic message 244 to a particular customer contact that enables that contact person to complete a registration process in order to be able to access and configure a particular customer environment.

FIGS. 11-29 describe in further detail the operations of the customer provisioning console.

Figure 11A:
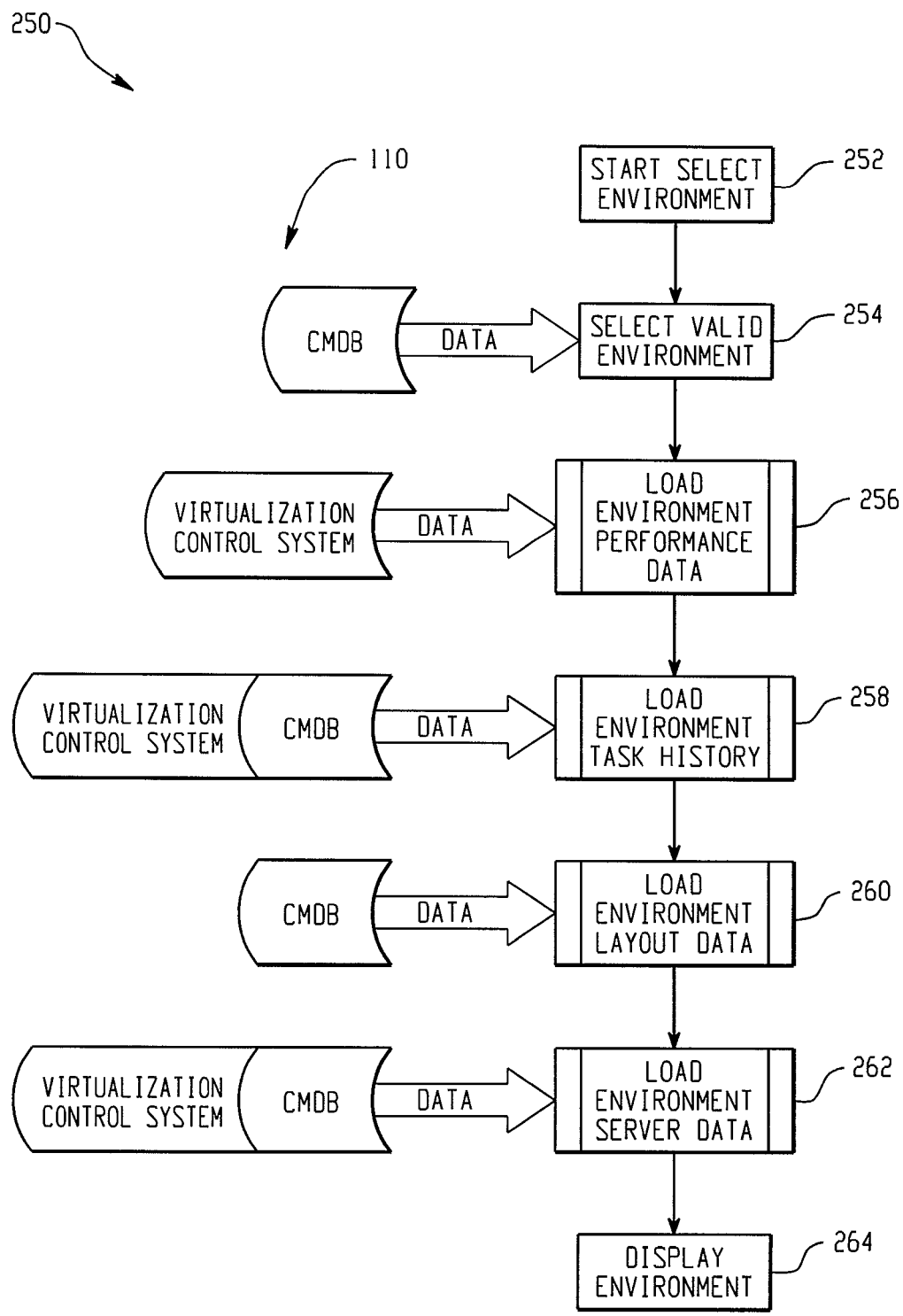
FIG. 11A is an exemplary flow diagram depicting a method for selecting a customer environment in a customer provisioned utility computing platform.

FIG. 11A is an exemplary flow diagram 250 depicting a method for selecting a customer environment in a customer provisioned utility computing platform. The method begins at 252. At step 254 the customer selects a valid environment from the available customer environments stored in the CMDB 110. Having selected a valid environment, performance data regarding the virtual resources associated with the selected environment is then obtained from the virtualization control system at step 256. At step 258 task history information is retrieved from the CMDB/Virtualization Control system. This task history information may include data regarding the creation, modification, upgrading and configuration of the virtual resources associated with the selected environment. Following this step, graphical layout information regarding the selected environment is obtained from the CMDB, which may include information regarding the look-and-feel of the graphical user interface displaying the information previously obtained regarding the selected environment, such as the positioning of virtual servers in a user-defined organization or rows and groups of virtual servers. This user-defined organization, which is described in more detail below, enables the customer to organize their virtual server resources associated with the selected environment in any manner the user desires. Finally, at step 262 the specific details of the virtual server resources associated with the selected environment is obtained from the CMDB/Virtualization control system 110, and at step 264, all of the previously obtained information from steps 254-262 is then used to display the selected environment to the customer. (FIG. 13, discussed below, depicts a graphical user interface screen of an exemplary customer provisioning console for selecting an environment.)

Figure 11B:
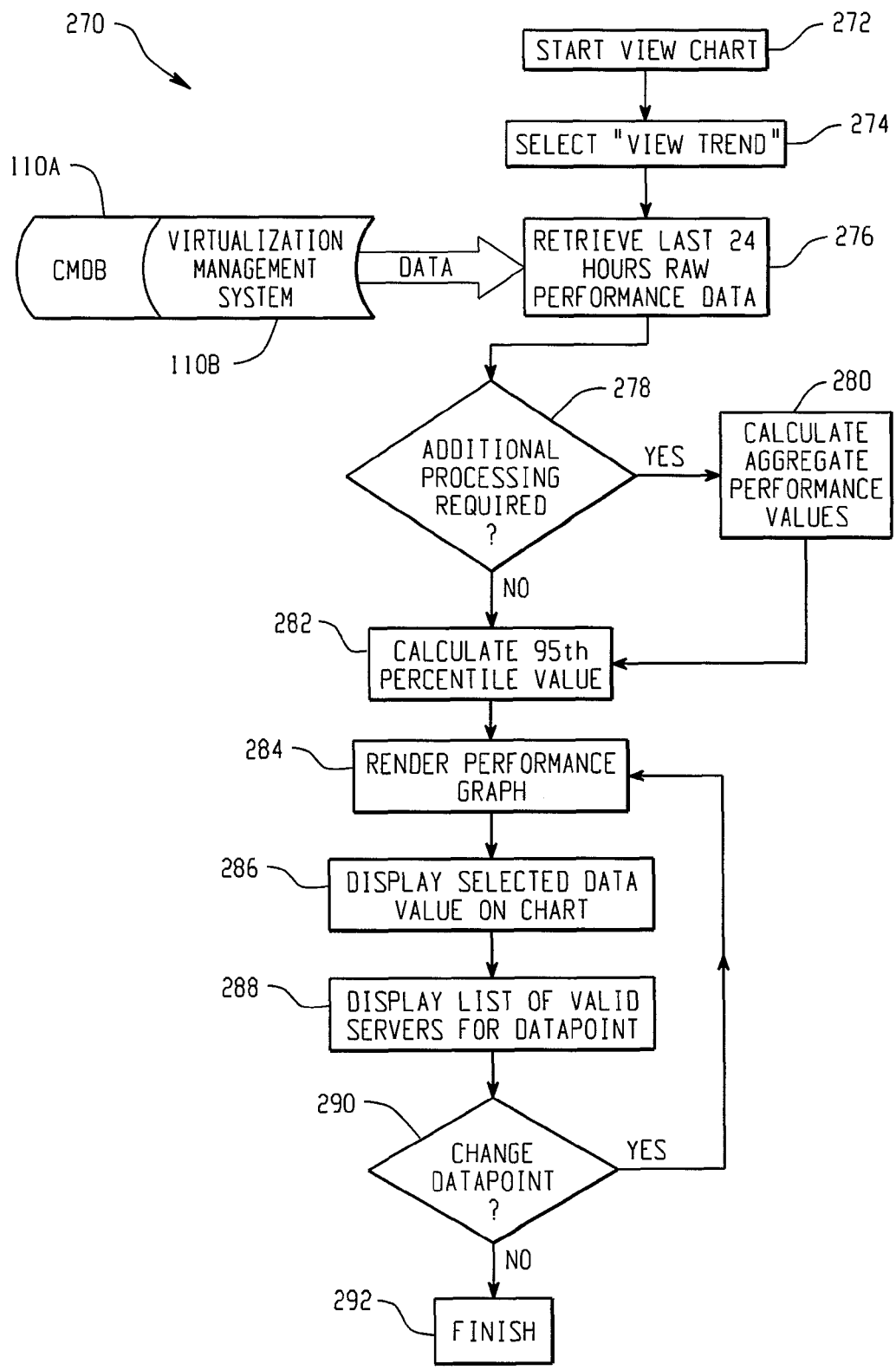
FIG. 11B is an exemplary flow diagram depicting a method for viewing and analyzing customer processor and memory resources associated with one or more customer environments.

FIG. 11B is an exemplary flow diagram 270 depicting a method for viewing and analyzing customer processor and/or memory resources associated with one or more customer environments. The method begins at 272, where the customer selects a chart to view, such as a processor chart or a memory chart. At step 274 the customer selects to "view trend" information regarding the processor or memory resource. Following this, performance data regarding the selected virtual resource (processor or memory) is retrieved from the CMDB/Virtualization control system 110A/110B at step 276. Step 278 determines whether additional processing is required of the obtained performance data, depending on the type of data and the type of calculations that the system needs to perform. If additional processing is required, then control passes to step 280, where, for example, aggregate performance values may be calculated from the performance data obtained from the system. Following this step, control passes to step 282, wherein the system calculates the 95$^{th}$ percentile value of the obtained performance data.

In this step 282, the system samples the performance data, sorts it from high to low, and then identifies the top five percent of data samples, which are discarded. The remaining highest value sample is identified as the 95$^{th}$ percentile value for the obtained performance data. In making this percentile calculation, data spikes that occur for a very short duration in time, representing high resource utilization but for very short time durations, are essentially ignored as the system attempts to locate high resource utilization that also lasts for a significant duration in time. This high utilization/long duration activity is much more relevant to the customer analyzing the performance of their virtual resources than brief spikes in usage.

Figure 14:
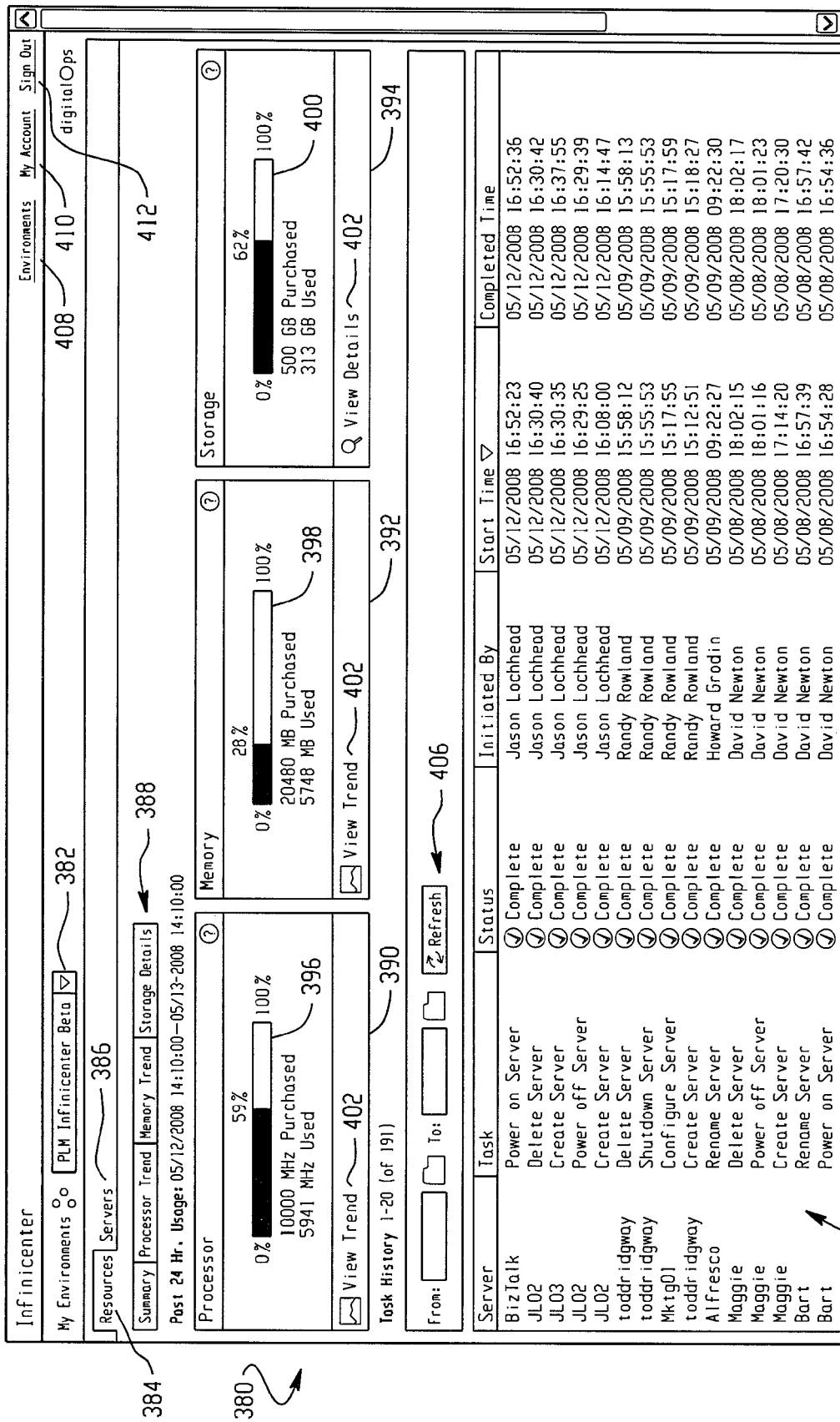
FIG. 14 depicts a graphical user interface screen of an exemplary customer provisioning console for viewing the virtual resources associated with a selected customer environment.
Figure 15:
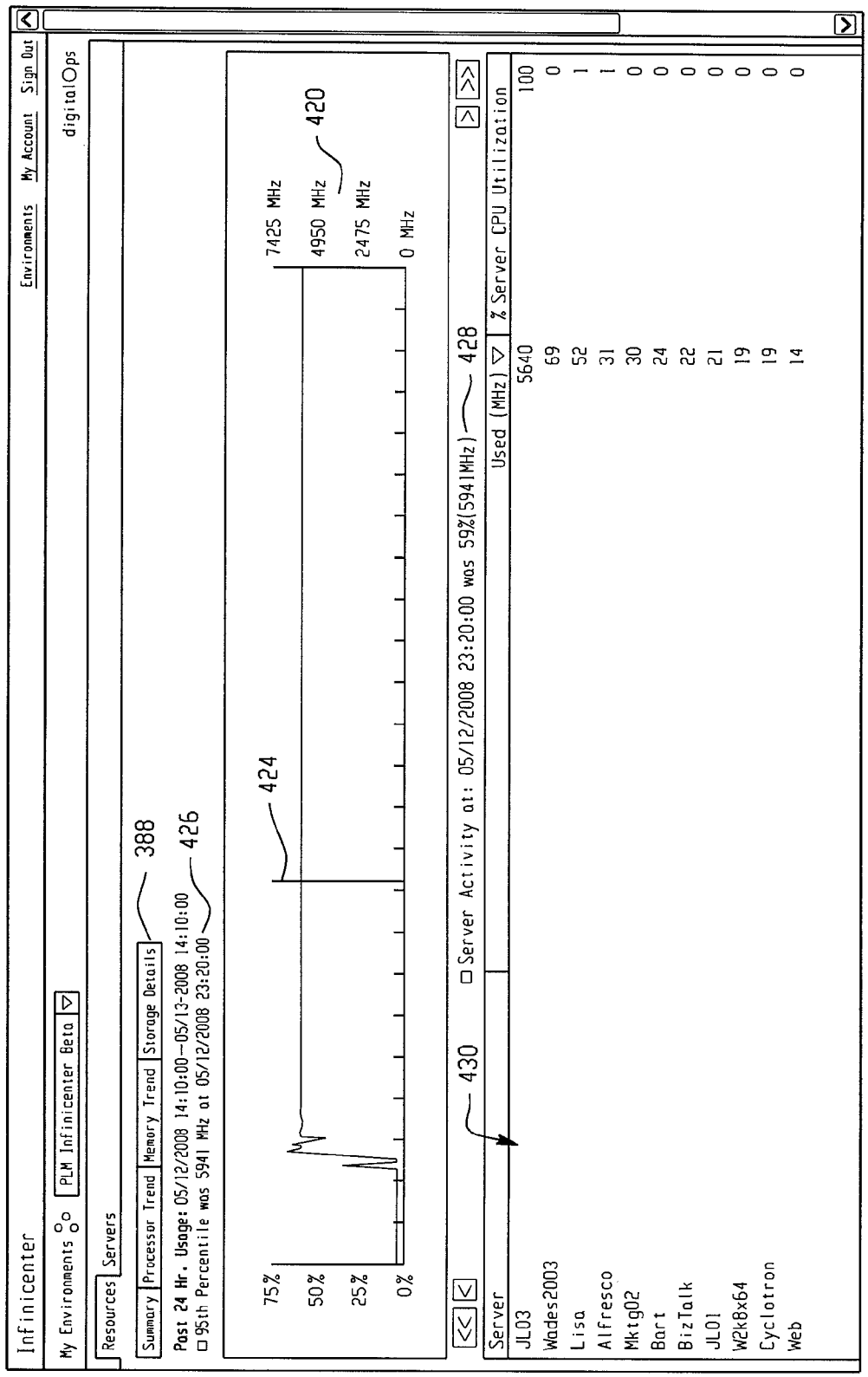
FIG. 15 depicts a graphical user interface screen of an exemplary customer provisioning console for viewing processor trend data associated with a selected customer environment.
Figure 16:
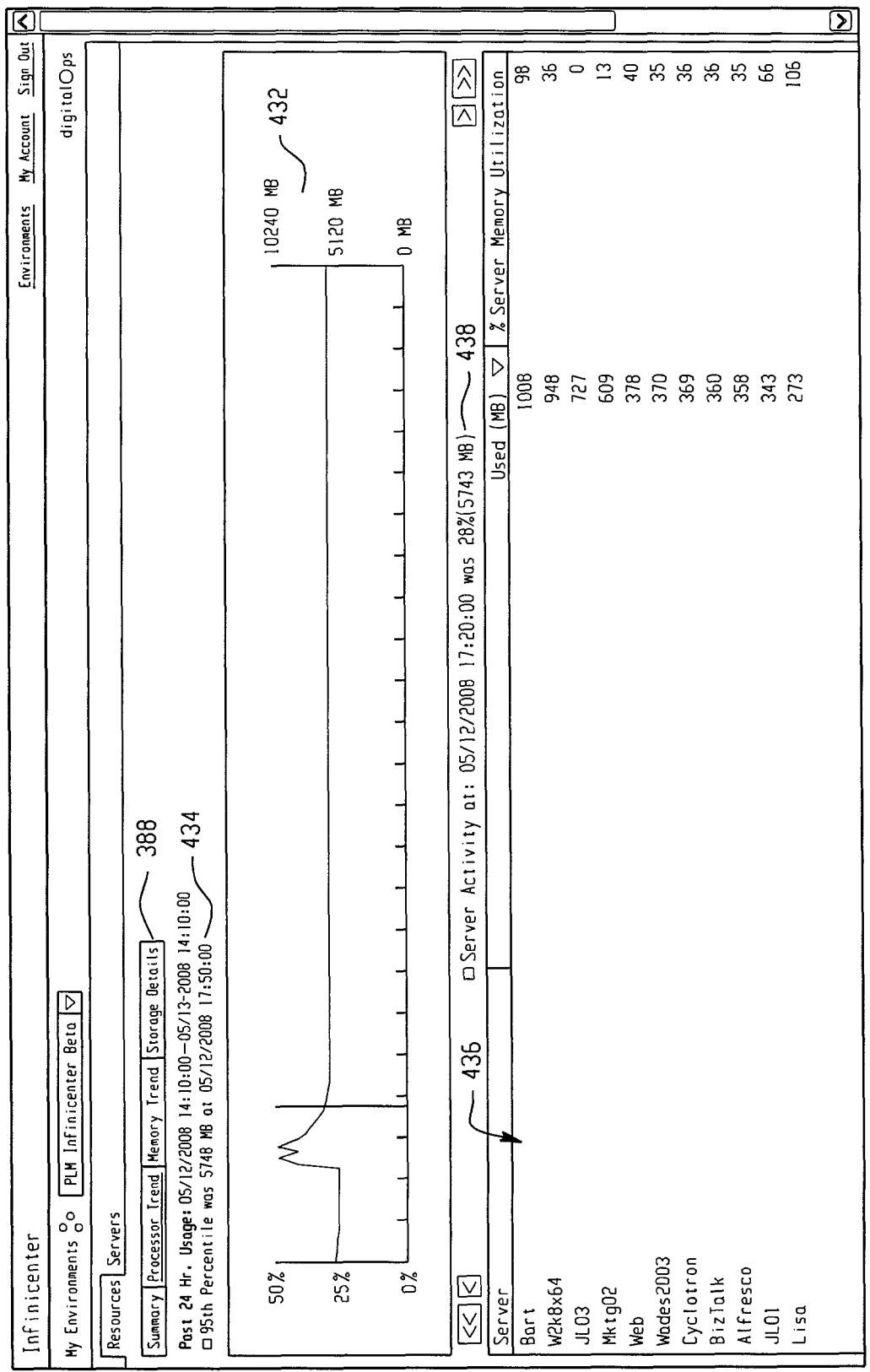
FIG. 16 depicts a graphical user interface screen of an exemplary customer provisioning console for viewing memory trend data associated with a selected customer environment.

Having made the 95$^{th}$ percentile calculation, control then passes to step 284, where the system renders a performance graph of the obtained performance data. The customer is then able to highlight/select and display selected performance data values on the rendered chart (step 286) and/or display a list of valid virtual servers associated with a selected data point (step 288). The customer may also select a particular virtual server associated with a particular selected performance data point in order to obtain additional information from the virtualization control system regarding the performance and operation of the selected virtual server in order to further analyze and diagnose any performance problems. At step 290 the customer is able to change the selected data point to another point on the displayed graph and control passes back to step 284. The method ends at 292. (FIG. 14 depicts a graphical user interface screen of an exemplary customer provisioning console for viewing the virtual resources associated with a selected customer environment; FIGS. 15 and 16 depict graphical user interface screens for rendering, viewing, manipulating and analyzing virtual resource trend data associated with virtual processor (FIG. 15) and memory (FIG. 16) resources associated with a customer's selected environment).

Figure 11C:
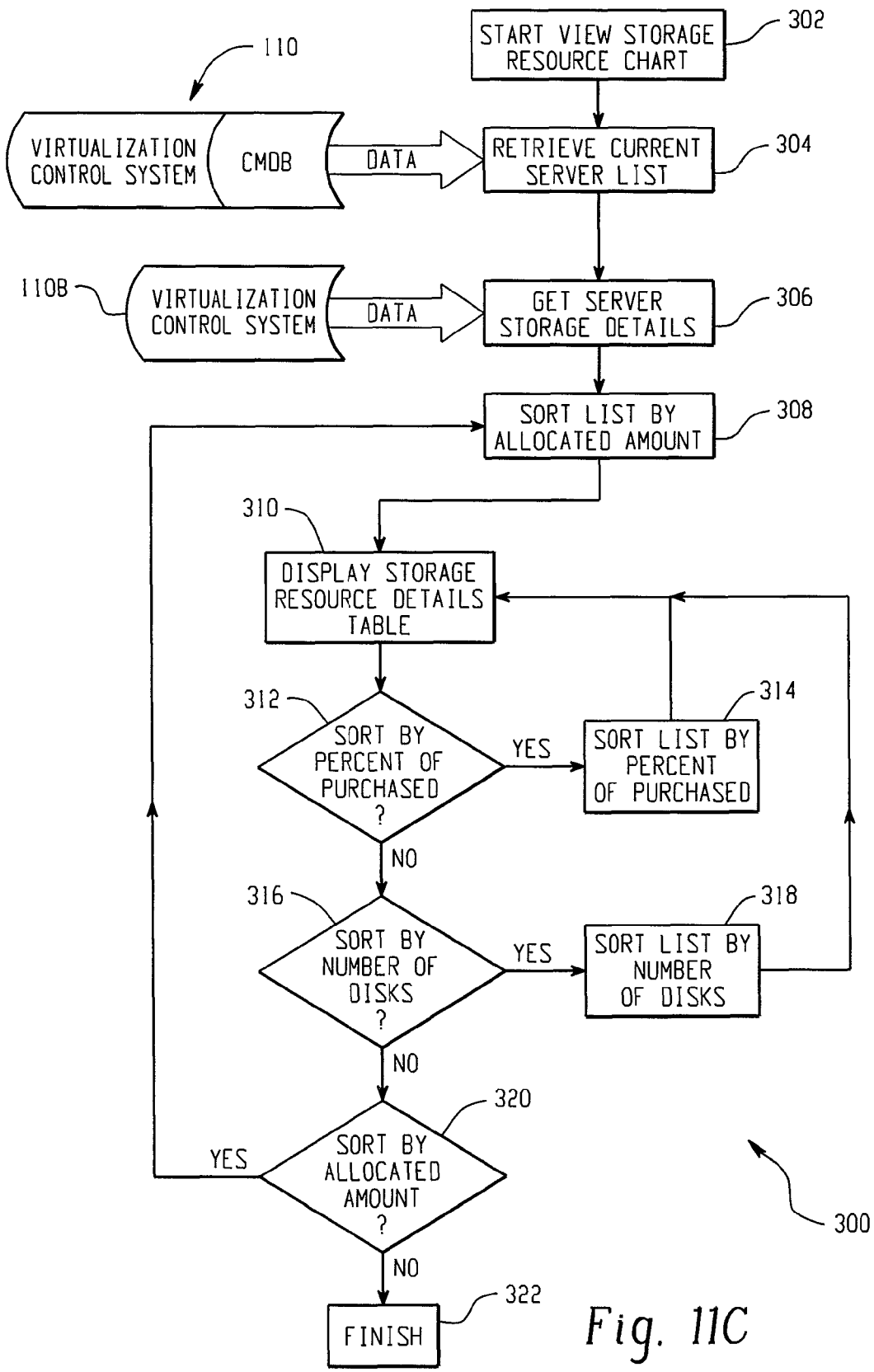
FIG. 11C is an exemplary flow diagram depicting a method for viewing and analyzing customer storage resources associated with one or more customer environments.
Figure 17:
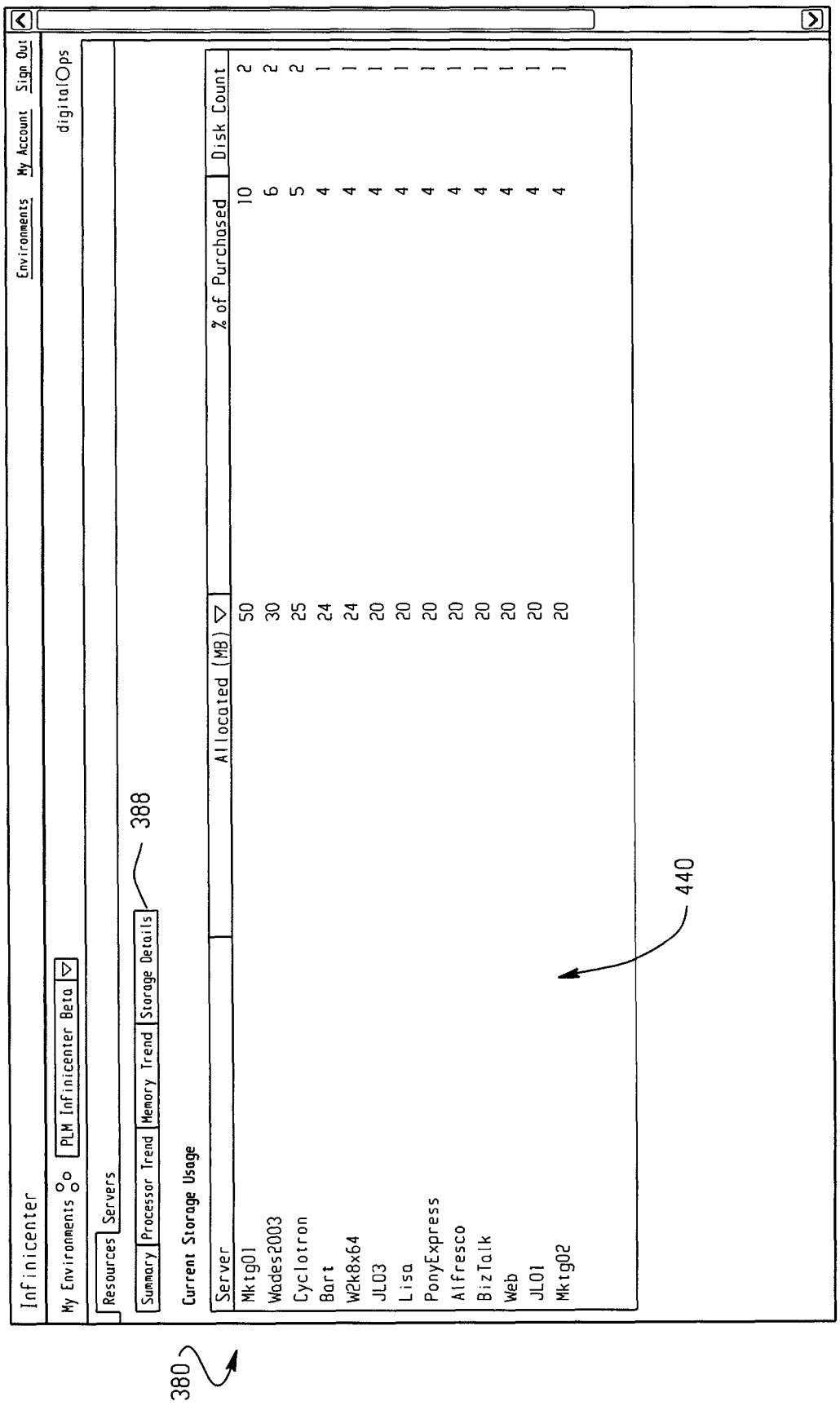
FIG. 17 depicts a graphical user interface screen of an exemplary customer provisioning console for viewing storage detail data associated with a selected customer environment.

FIG. 11C is an exemplary flow diagram 300 depicting a method for viewing and analyzing customer storage resources associated with one or more customer environments. The method begins at 302. At step 304 the system retrieves a current virtual server list from the CMDB/Virtualization control system 110. Storage details associated with the obtained list of virtual server resources is then obtained from the virtualization control system 110B at step 306. A list of storage resources is then sorted at step 308 by the amount of storage allocated to each resource. A table showing the sorted list of virtual storage resources is then displayed at 310. The customer, viewing the table of virtual storage resources, is then able to re-sort the list of storage resources by percentage of purchased virtual storage resources at step 312, which causes a resorting of the virtual storage resources at step 314, or the customer can re-sort the list of storage resources by the number of disks, which causes a resorting of the virtual storage resources at step 318. If neither of the re-sorting operations is executed at steps 312 or 316, then the obtained data on the virtual storage resources may be sorted by allocated amount at step 320. The method ends at 322. (FIG. 17 depicts a graphical user interface screen of an exemplary customer provisioning console for viewing storage detail data associated with a selected customer environment.)

Figure 11D:
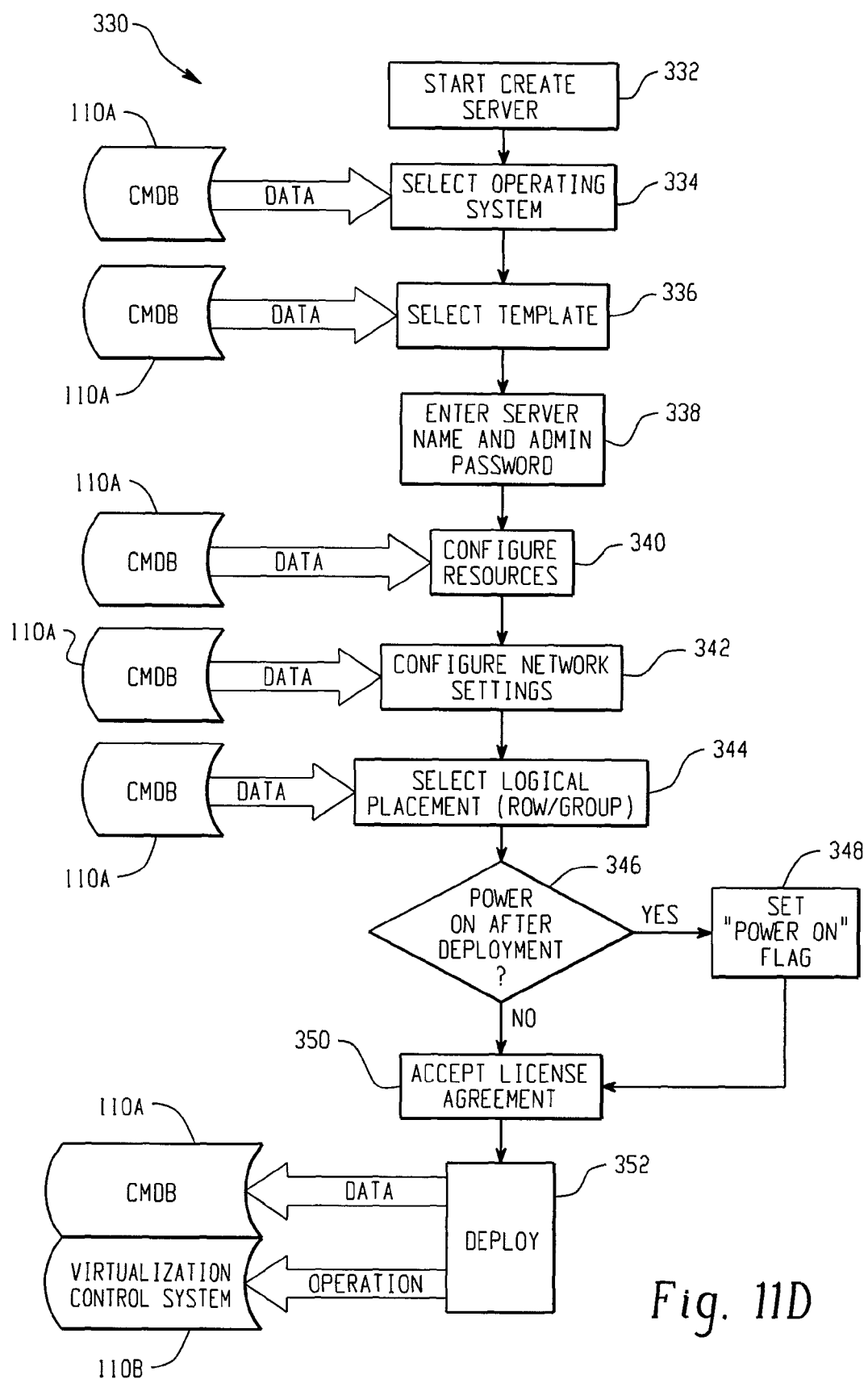
FIG. 11D is an exemplary flow diagram depicting a method for creating a virtual server within a customer environment of a customer provisioned utility computing platform.

FIG. 11D is an exemplary flow diagram 330 depicting a method for creating a virtual server within a customer environment of a customer provisioned utility computing platform. The method begins at 322 where the customer selects the create server function from within a selected customer environment. At step 334 the customer selects an operating system to be associated with the virtual server resource. In doing so, information regarding the available operating systems, such as various Windows, Unix, Linux, or other forms of server operating systems, is obtained from the CMDB 110A. Having selected an operating system for the virtual server, the customer then selects from an available template for the selected operating system, the template information also coming from the CMDB 110A. An operating system template, broadly speaking, is a pre-configured collection of software components or modules that are associated with a particular operating system. For example, an operating system template may include various ancillary administration applications associated with the selected operating system, database applications, or other types of system or user applications that are to be installed and used with the virtual server resource being created by the customer.

At step 338, the customer enters a virtual server name and provides an administration password to be used in configuring and managing the virtual server. At step 340, the customer configures the processing, memory, and storage resources to be associated with the virtual server being created. Instead of provisioning a virtual server having a fixed set of virtual resources, however, the methodology described herein enables the customer to associate a specific user-defined amount of processor, memory and storage resources to each virtual server, up to and including the total amount of resources that have been associated with the selected customer environment within which the virtual server is to exist. If additional resources are required for a particular server beyond the allocated amount, then the customer can upgrade the selected environment to include additional resources and return to the customer console application in order to upgrade the resources associated with a particular virtual server. In addition, although a predetermined amount of virtual resources are configured and associated with each virtual server, the system described herein may allow dynamic upgrading to a particular virtual server based on a particular contract arrangement with the customer, or based on a particular agreed-upon time interval for accessing the additional resources. Following this step, the network settings for the virtual server are configured at step 342, and at step 344 the customer selects a logical placement for the virtual server within the graphical user interface environment displayed through the customer console that depicts the overall virtual server implementation of the selected customer environment. This is typically accomplished by selecting a particular row and group for placement of the virtual server being created.

Figure 18A:
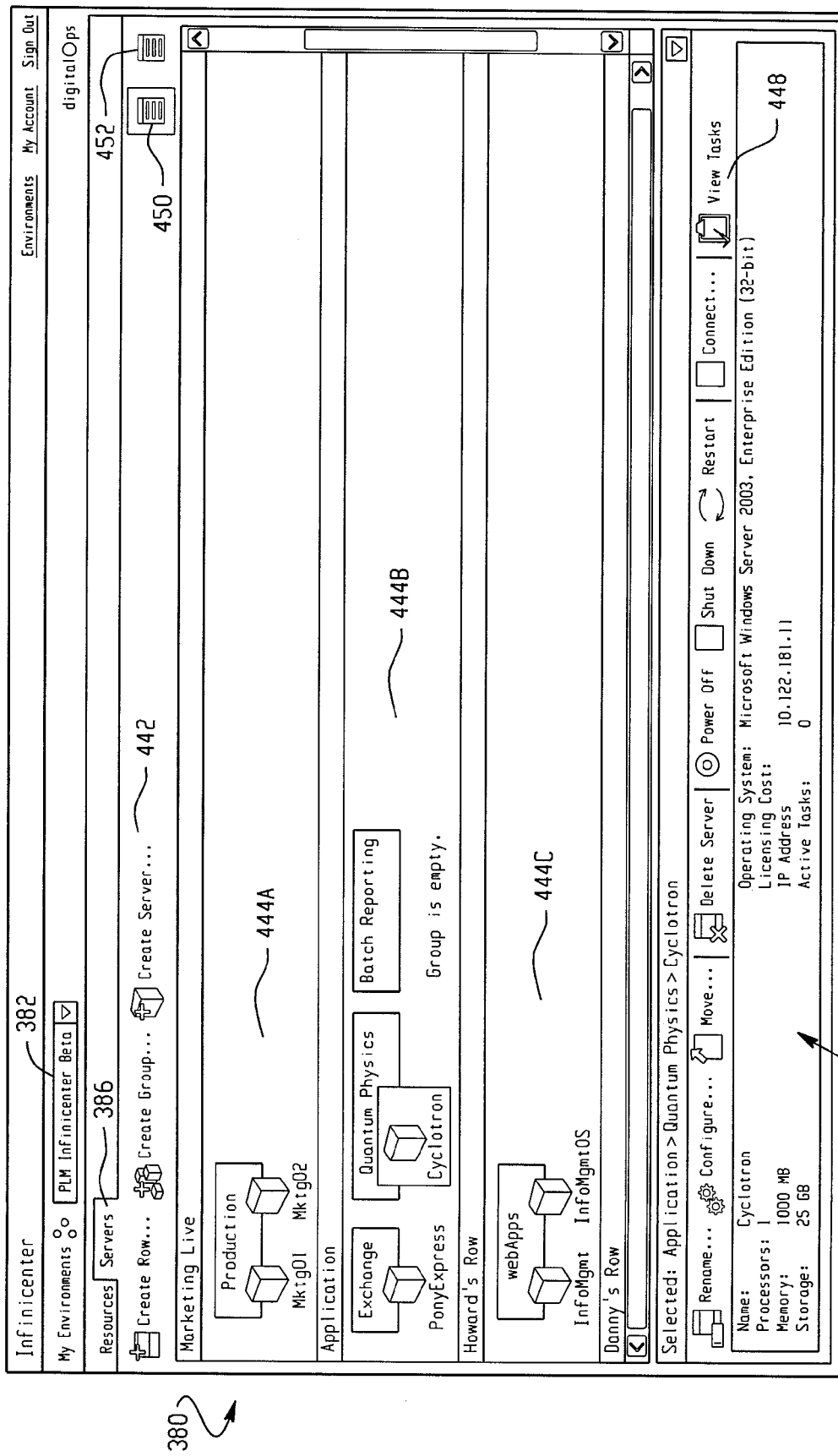
FIGS. 18A-18B depict graphical user interface screens of the exemplary customer provisioning console for viewing virtual servers within a customer environment.
Figure 18B:
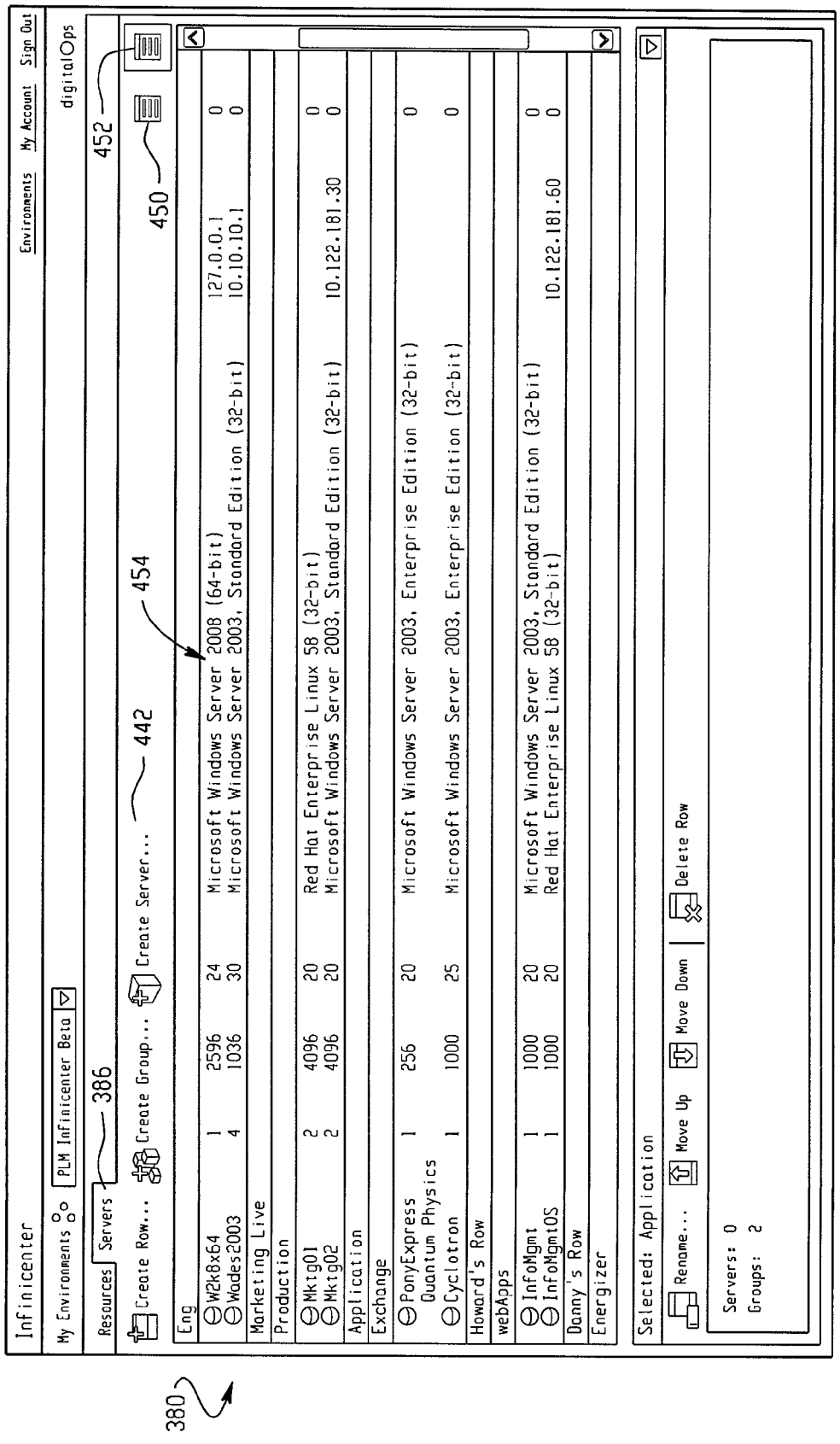

Having provisioned the resources of the virtual server and determined its graphical location within the selected customer environment, the customer then determines whether to power on the virtual server after deployment to the customer environment. If so, then a "power on" flag is set at step 348. Control passes to step 350, where the customer must accept the licensing terms for the created virtual server as configured using the selected operating system template. The virtual server is then deployed at step 352, and the configuration, provisioning and location data is then written to the CMDB and the Virtualization control system 110A, 110B. (FIGS. 18A-18B depict graphical user interface screens of the exemplary customer provisioning console for viewing virtual servers within a customer environment. FIGS. 20A-20J depict graphical user interface screens of the exemplary customer provisioning console for creating a new server within a customer environment).

FIG. 12 depicts a graphical user interface screen 360 of an exemplary customer provisioning console for logging into the customer provisioned utility computing platform. This interface screen 360, as well as the remaining interface screens described herein with respect to the customer provisioning console, are preferably accessed and rendered in a standard web browser application capable of accessing the system via a standard Internet connection.

Figure 13:
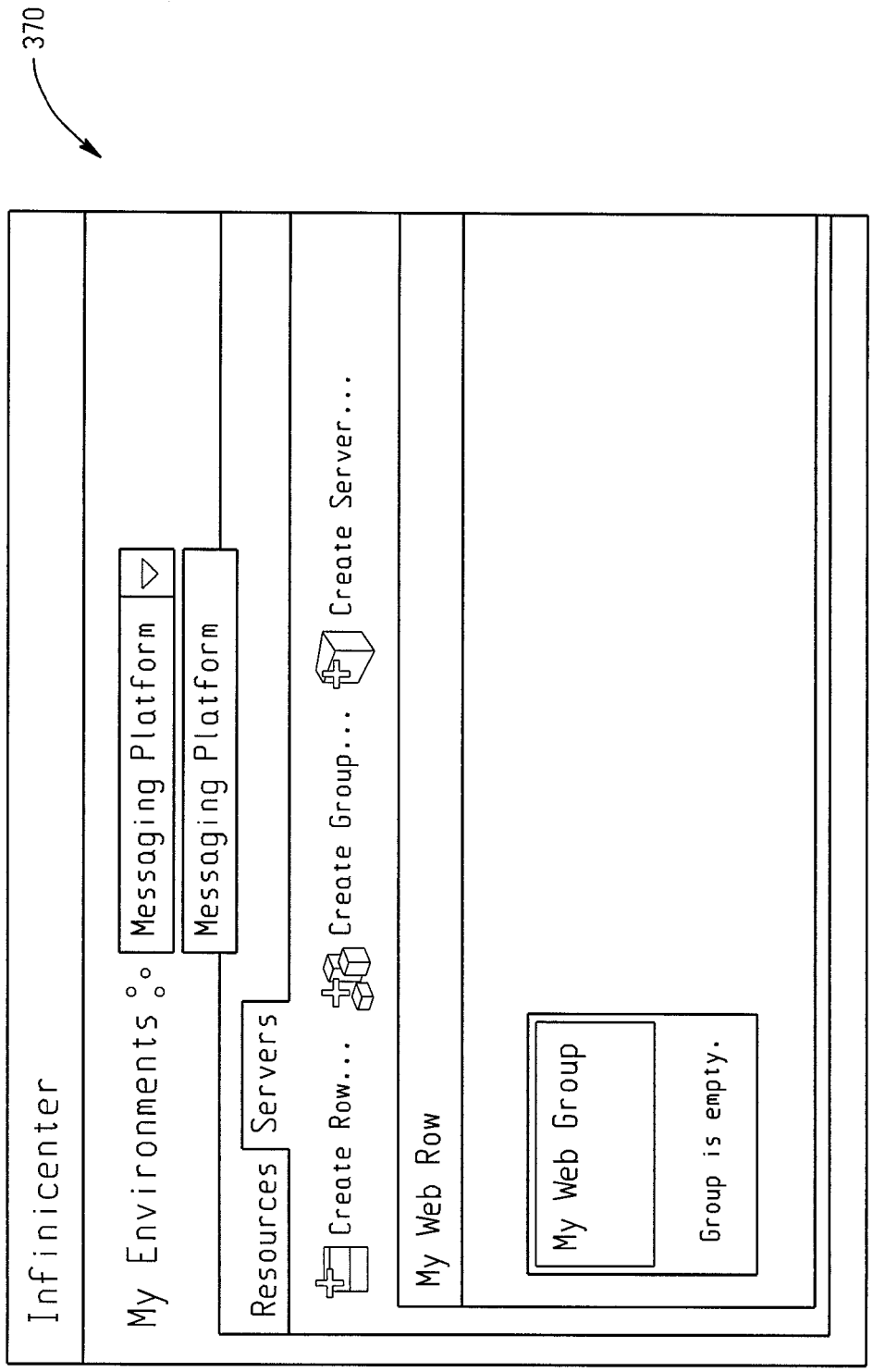
FIG. 13 depicts a graphical user interface screen of an exemplary customer provisioning console for selecting an environment.

FIG. 13 depicts a graphical user interface screen 370 of an exemplary customer provisioning console for selecting an environment. This figure depicts only the top left portion of the complete customer provisioning console (see, FIG. 14), in order to highlight the environment selector drop-down box. Here, when a user logs into the system the customer environments associated with that user are presented to the user in the "My Environments" drop down selector box. Although only one environment is shown in FIG. 13, named "Messaging Platform," there may be multiple environments associated with each customer and therefore multiple environments will be individually selectable from this initial screen of the customer provisioning console.

FIG. 14 depicts a graphical user interface screen 380 of an exemplary customer provisioning console for viewing the virtual resources associated with a selected customer environment. This screen is the primary interface that the customer administrator will utilize to review, analyze, and configure a selected environment. The very top portion of the interface screen lists the customer administrator, and provides a selector to change back to view customer environments 408, a selector to view account information for the customer 410, and a selector to sign out of the customer provisioning console 412. Just below this is the "My Environments" drop down selector 382, which the customer administrator uses to select a particular customer environment for analysis, review and configuration.

The customer provisioning console screen 380 shown in FIG. 14 is partitioned into two main functional areas called "Resources" and "Servers." These two main functional areas are selected using the "Resources" and "Servers" tabs 384, 386. In FIG. 14, the "Resources" tab has been selected. (The "Servers" tab screen is shown and discussed in connection with FIGS. 18A-18B) When the "Resources" tab 384 is selected, the graphical user interface of the customer provisioning console provides overall virtual resource data regarding the selected customer environment. The resource data is viewable by "Summary," "Processor Trend," "Memory Trend," and "Storage Details," using the secondary tabs 388. Also depicted here is a graphical and numerical representation of the resource utilization for the selected customer environment, displayed by Processor, Memory and Storage virtual resources. For example, the Processor Utilization Graph 396 indicates that for this particular environment, 10000 MHz has been purchased but only 5941 MHz is being utilized. Graphically, this is shown by the percentage utilization graph 396. The color of the percentage utilization graph can be configured so that as the resource utilization approaches the amount purchased, the color of the graph may change from green, to yellow and then to red as the buffer between the amount purchased and the amount utilized for any particular resource diminishes. Other graphical and/or audiovisual mechanisms may also be utilized herein to quickly signal to the customer administrator that a particular environment is approaching maximum utilization. This may then prompt the customer administrator to communicate with the system administrator in order to purchase and have allocated additional virtual resources for the particular customer environment.

Similar to the Processor virtual resources 396, for the Memory and Storage virtual resources 398, 400 allocated to this particular environment, the customer provisioning console interface 380 provides graphical and numerical depictions of the purchased resource and the percentage of that resource that is presently being utilized by the environment. For each of the Processor and Memory resources, trend data can be visualized by selecting the "View Trend" selector 402.

(FIGS. 15 and 16 depict this trend data interface) For the Storage resource, additional detailed information regarding the virtual storage resources associated with the selected environment can be viewed by selecting the "View Details" selector 402. (FIG. 17 depicts the storage detail data view).

Also shown in the customer provisioning console interface 380 shown in FIG. 14 is a Task History panel 404 and a task history time selector 406. Using this part of the interface 380, the customer is able to view the configuration and management tasks that have been executed by the system in relation to the selected customer environment. For example, as shown in FIG. 14, the acts of powering on a virtual server, deleting a virtual server, creating a virtual server, renaming a virtual server and configuring a virtual server are all tasks that are listed in the task history panel 404. Along with the type of task, the interface lists the friendly name of the virtual server to which the task is associated, the person initiating the task as the customer, and the start and completion times of the particular task.

FIG. 15 depicts a graphical user interface screen 380 of an exemplary customer provisioning console for viewing processor trend data associated with a selected customer environment. This screen is accessed from either the secondary tabs 388, by selecting the "Processor Trend" tab, or by selecting the "View Trend" selector 402 located just beneath the processor utilization graph 396 (shown in FIG. 14). The processor trend data includes a graphical representation 420 of the processor utilization for the selected environment over a particular 24 hour usage period. This graph depicts processor utilization as a function of percentage and as a function of allocated MHz. The $95^{th}$ percentile data point 426 is listed just above the graph 420. A data selector bar 424 by default is set at the $95^{th}$ percentile point by the system, although this data selector bar 424 can be moved throughout the graph 420 using a pointing device by selecting a point of interest on the graph. As the data selector bar is moved by the customer, the server activity is listed 428 just below the graph 420. Also depicted in this interface screen 380 immediately below the graph is a listing 430 of the virtual servers associated with this particular environment. This listing sorts the virtual servers by percentage CPU utilization so that the customer can quickly identify the virtual server or servers that are contributing to the particular data point selected on the graph 420. In addition, the customer can select one or more of the virtual servers listed in the server listing 430 and obtain more detailed information about the performance and utilization of the selected server.

FIG. 16 depicts a graphical user interface screen 380 of an exemplary customer provisioning console for viewing memory trend data associated with a selected customer environment. This screen is accessed from either the secondary tabs 388, by selecting the "Memory Trend" tab, or by selecting the "View Trend" selector 402 located just beneath the memory utilization graph 398 (shown in FIG. 14). The memory trend data includes a graphical representation 432 of the memory utilization for the selected environment over a particular 24 hour usage period. This graph 432 depicts memory utilization as a function of percentage and as a function of allocated MB. The 95th percentile data point 434 is listed just above the graph 432. A data selector bar by default is set at the 95th percentile point by the system, although this data selector bar can be moved throughout the graph 432 using a pointing device to select and drag the data selector bar to a point of interest. As the data selector bar is moved by the customer, the server activity is listed 436 just below the graph 432. Also depicted in this interface screen 380 immediately below the graph is a listing 436 of the virtual servers associated with this particular environment. This listing sorts the virtual servers by percentage memory utilization so that the customer can quickly identify the virtual server or servers that are contributing to the particular data point selected on the graph 432. In addition, the customer can select one or more of the virtual servers listed in the server listing 436 and obtain more detailed information about the performance and utilization of the selected server.

FIG. 17 depicts a graphical user interface screen 380 of an exemplary customer provisioning console for viewing storage detail data associated with a selected customer environment. This screen is accessed from either the secondary tabs 388, by selecting the "Storage Details" tab, or by selecting the "View Details" selector 402 located just beneath the storage utilization graph 400 (shown in FIG. 14). This interface screen includes a listing 440 of the virtual servers associated with this particular environment and sorts the virtual servers by percentage storage utilization and disk count.

FIGS. 18A-18B depict graphical user interface screens 380 of the exemplary customer provisioning console for viewing virtual servers within a customer environment. FIG. 18A depicts the main "Servers" screen, which is displayed when the customer selects the "Servers" tab 386 at the top portion of the interface. Selecting this tab causes the customer provisioning console application to display more detailed information regarding the virtual servers that have been provisioned for the selected customer environment. The "Servers" main screen includes an action bar selector 442, row and group placement areas 444A, 444B, 444C, and a selected virtual server display area 446. Also shown in FIG. 18A is a pair of icons 450, 452 that enable the customer to toggle the Server interface between an Icon display mode (450) as shown in FIG. 18A and a List display mode (452) as shown in FIG. 18B.

The action bar selector 442 includes a plurality of Server actions, including "Create Row," "Create Group" and "Create Server." The "Create Row" action is used to add a new row to the row and group placement areas depicted below the action bar selector 442. The concept of "rows" and "groups" provides a very flexible way for each customer to custom design the organization and display of their virtual server resources through the Servers main screen. Using the row and group concept, customers can design rows of virtual servers, as shown in 444A, 444B and 444C, and then within each row of servers the customer can group virtual servers together, thus providing an additional level of organization to the structure of the customer's virtual assets. For example, the row and group 444C in FIG. 18A describes a row called "Howard's Row" with a single group labeled "webApps." Within the "webApps" group there are two virtual servers, one labeled "InfoMgmt" and the other labeled "InfoMgmtOS." Customers are able to use the concept of rows and groups to organize their virtual assets in any manner they desire. For example, customers may select to organize their virtual servers by responsibility, having a separate row for each customer administrator that is responsible for configuring and managing virtual server assets. Alternatively, the customer may decide to organize the virtual servers by function, for example by having a row of SQL servers, for example, or a row of web servers. There is no restrictions placed on the customer's ability to organize its virtual assets using this row and group paradigm.

The selected virtual server display area 446 provides additional details regarding the current configuration of the selected virtual server and also provides an action bar 448 for executing various console functions associated with the selected virtual server. These functions include renaming the virtual server, configuring the virtual server, moving the virtual server to a different row/group, deleting the virtual server, powering on/off the virtual server, shutting down the virtual server, restarting the virtual server, opening a connection to the virtual server and viewing a list of tasks associated with the selected virtual server.

FIG. 18B is the list view version of the Server main interface screen. When the icon 452 is selected, the interface toggles from the Icon view shown in FIG. 18A to the list view shown in FIG. 18B. The list view is similar to the icon view in that the virtual servers are displayed by rows and groups within a row, although in a list fashion that enables additional information associated with each virtual server to be displayed in the main display area 454 of the interface screen.

Figure 19A:
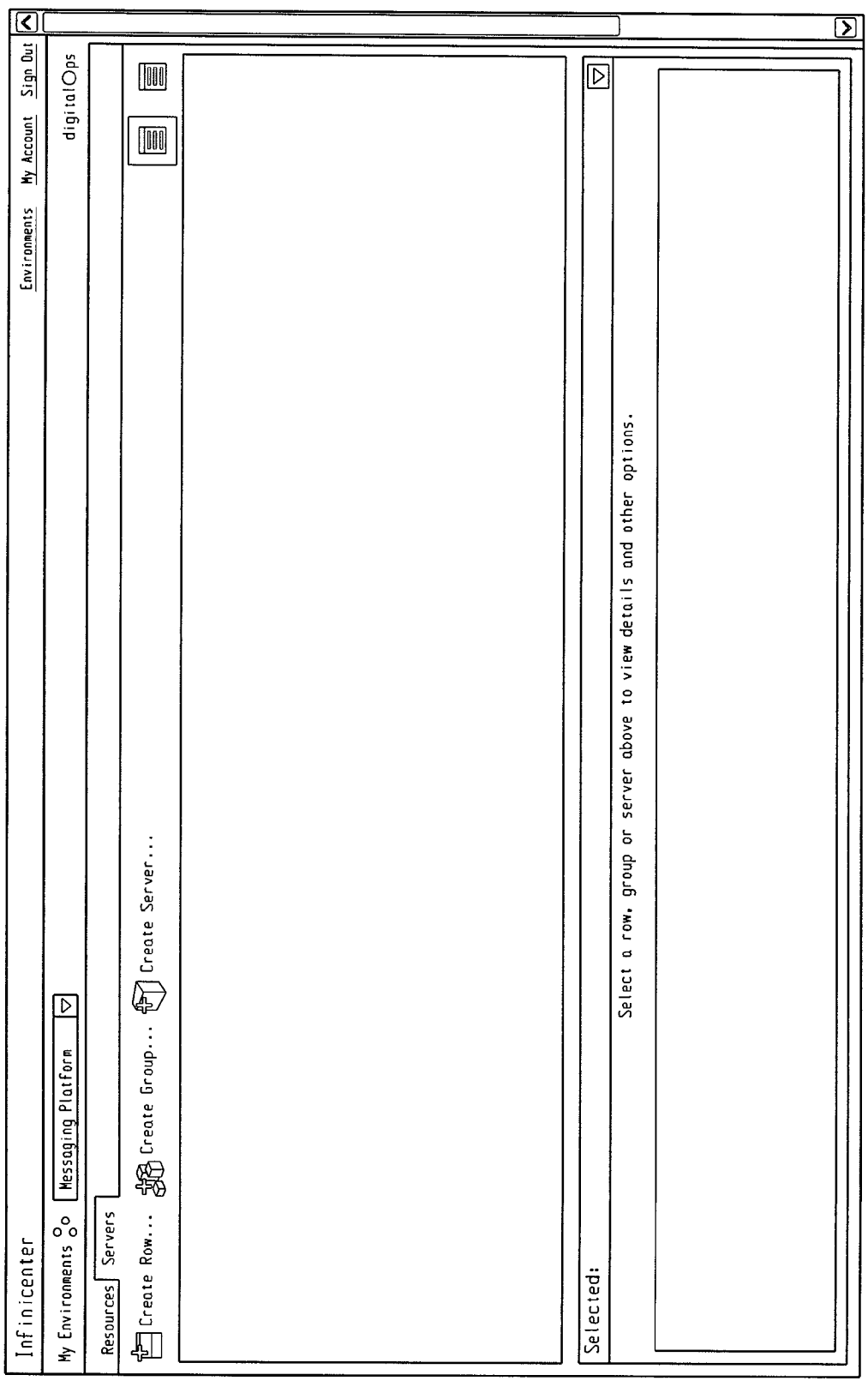
FIGS. 19A-19E depict graphical user interface screens of the exemplary customer provisioning console for creating rows and groups of virtual servers.
Figure 19B:
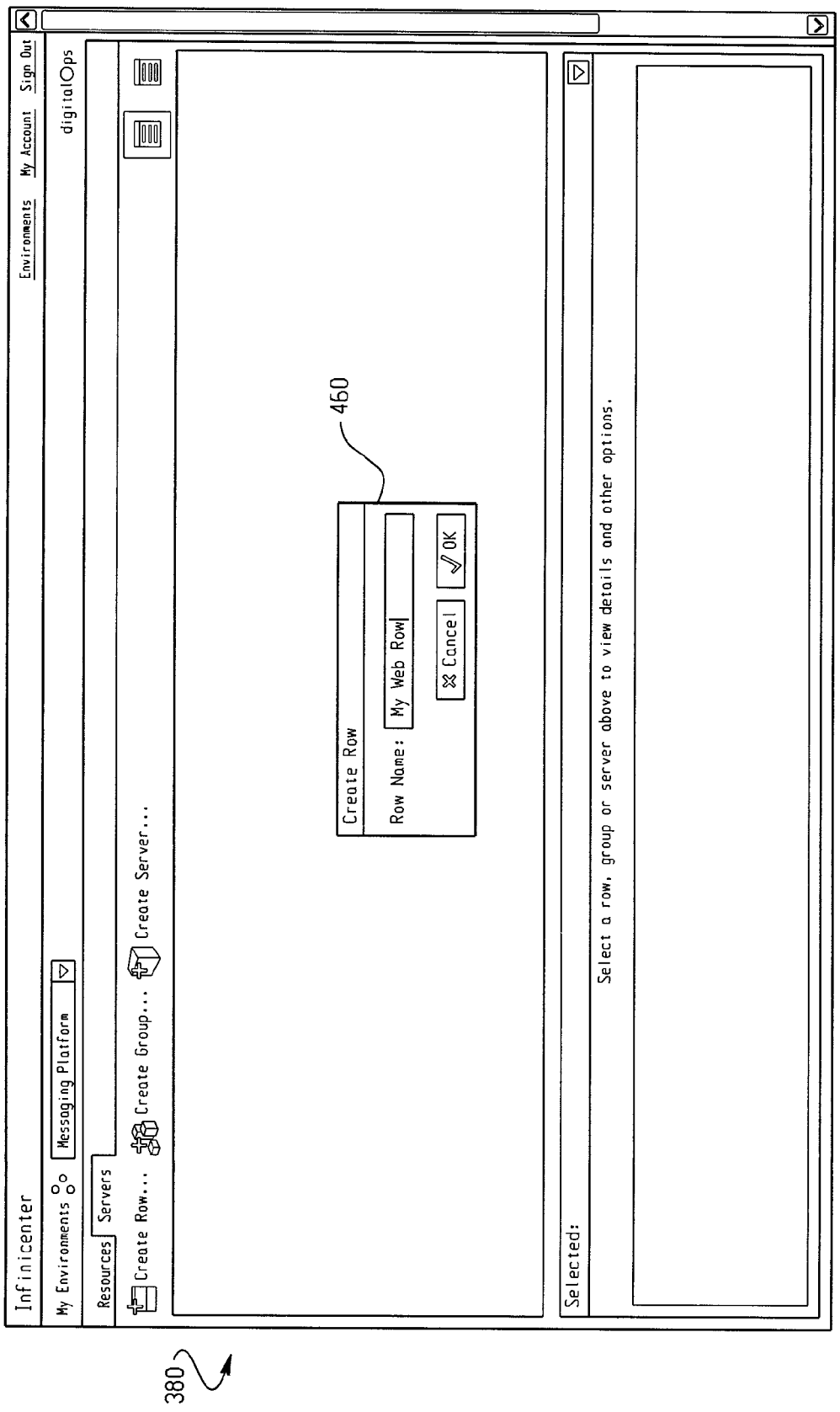
Figure 19C:
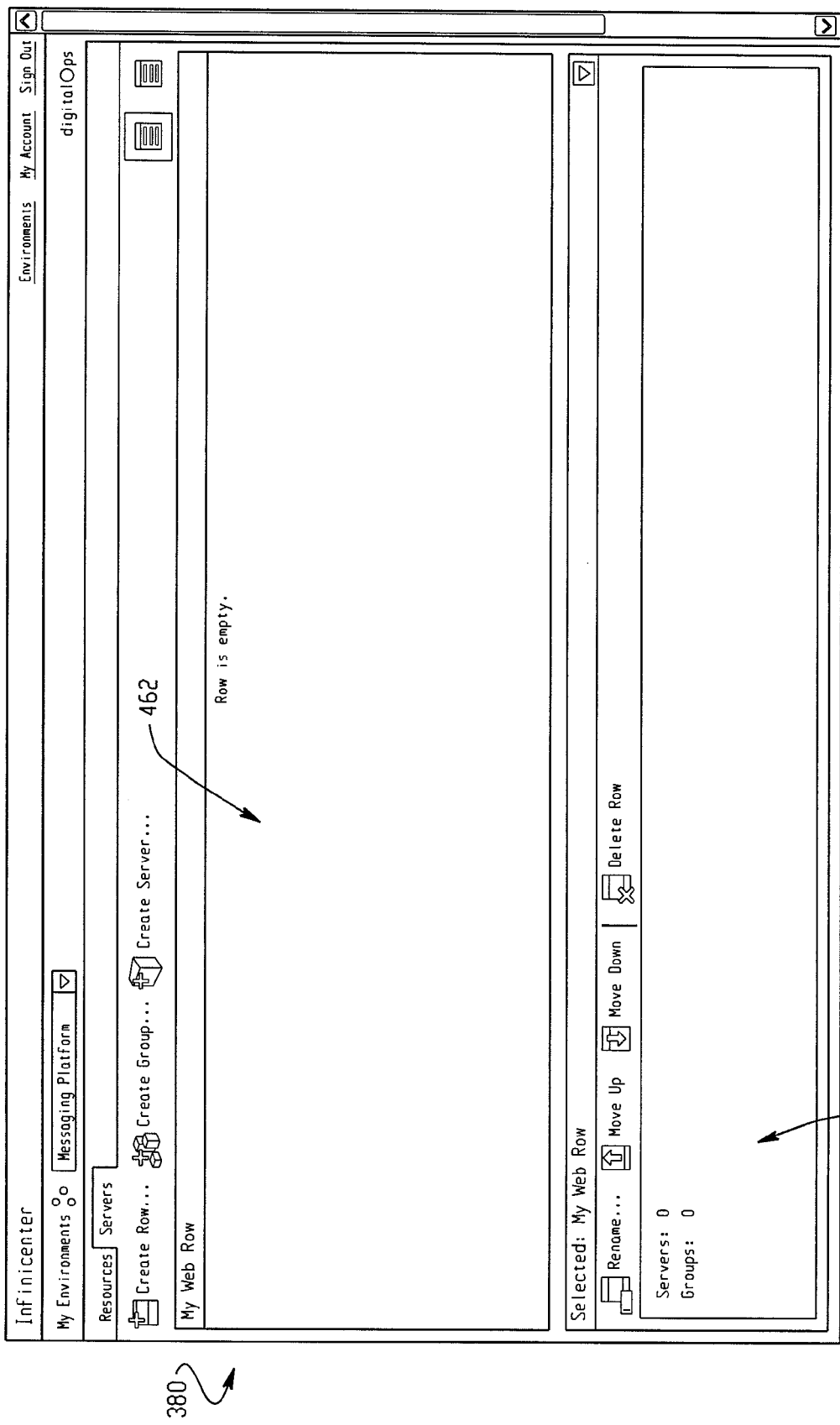
Figure 19D:
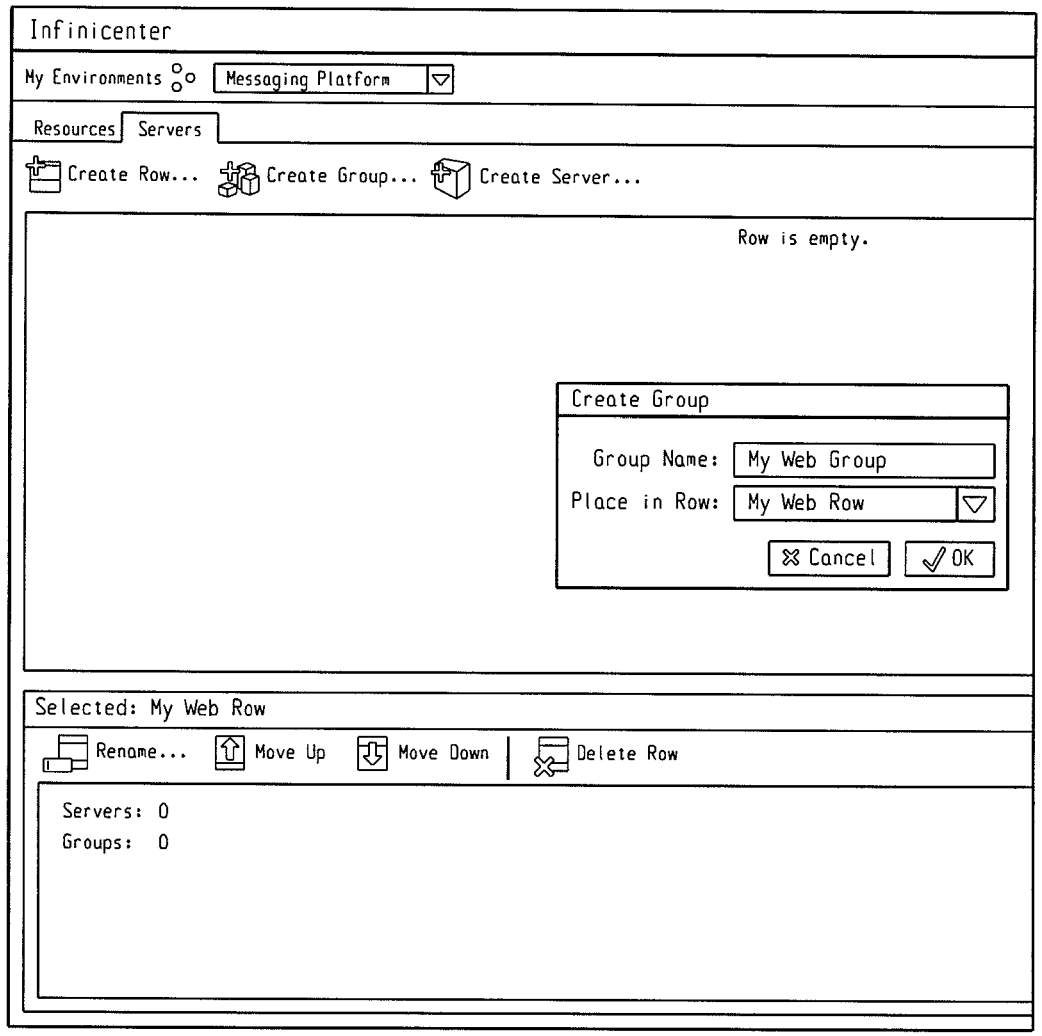
Figure 19E:
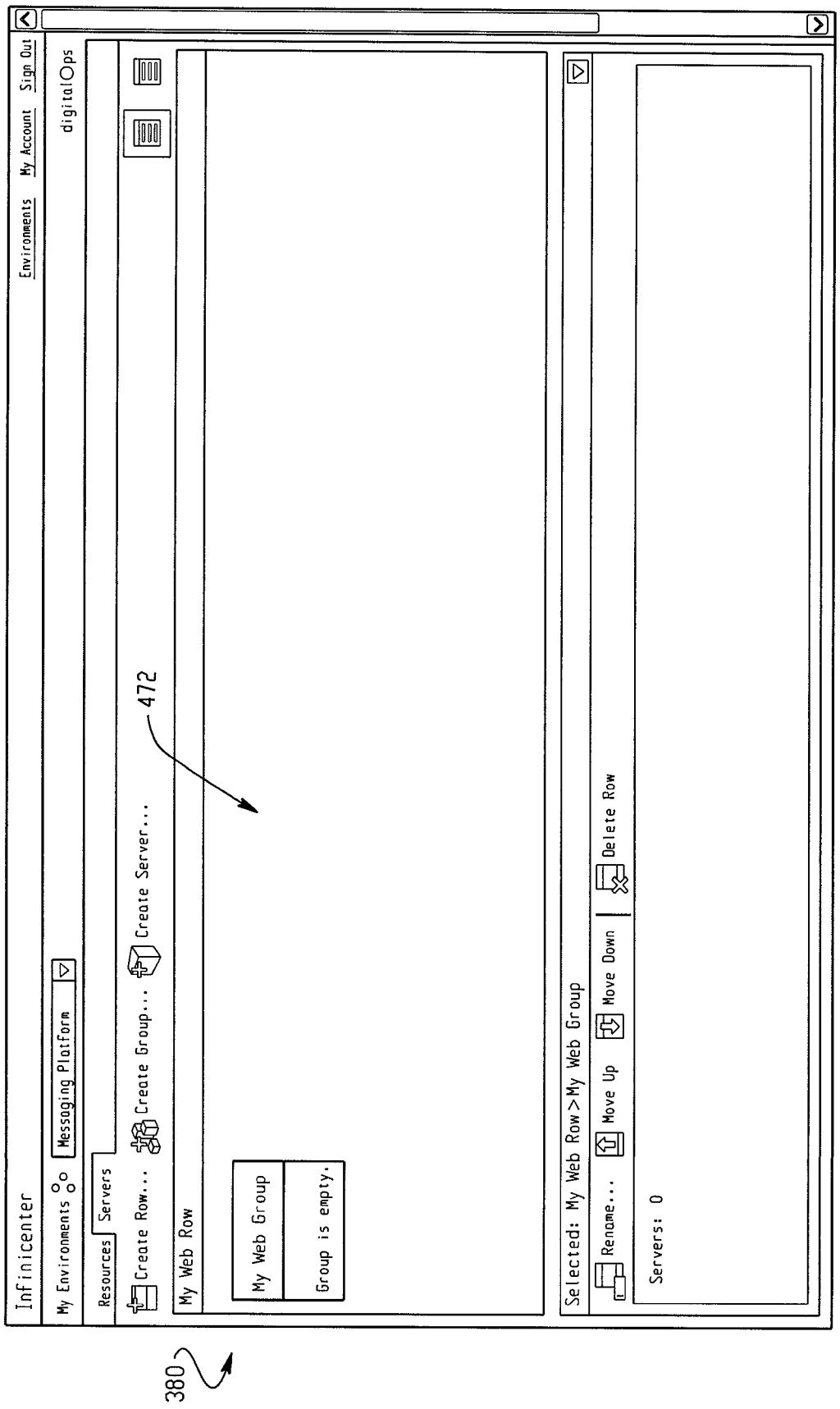

FIGS. 19A-19E depict graphical user interface screens of the exemplary customer provisioning console for creating rows and groups of virtual servers. FIG. 19A shows the Server main interface before a new row is created. In FIG. 19B, the customer has selected the "Create Row" button from the action bar selector 442 shown in FIG. 18A, and the dialog box 460 is displayed to enter the name of the new row. FIG. 19C shows the Server main interface after the new row called "My Web Row" 462 has been created and added to the main interface. The server selection area 464 set forth below the Row/Group interface display 462 is empty because the customer has not yet populated the row with any virtual server assets. In FIG. 19D, the customer has selected the "Create Group" function from the action bar selector 442, which displays the dialog box 470 where the customer can enter a group name and associate the new group with a particular row in the customer environment. In this example there is only one created row and so that is where the new group will be populated. And finally, FIG. 19E shows the main interface with the new group labeled "My Web Group" created within the single row labeled "My Web Row." The customer is now able to engage the "Create Server" function in order to populate the new row/group with virtual server assets, as further described herein in connection with FIGS. 20A-20J.

Figure 20A:
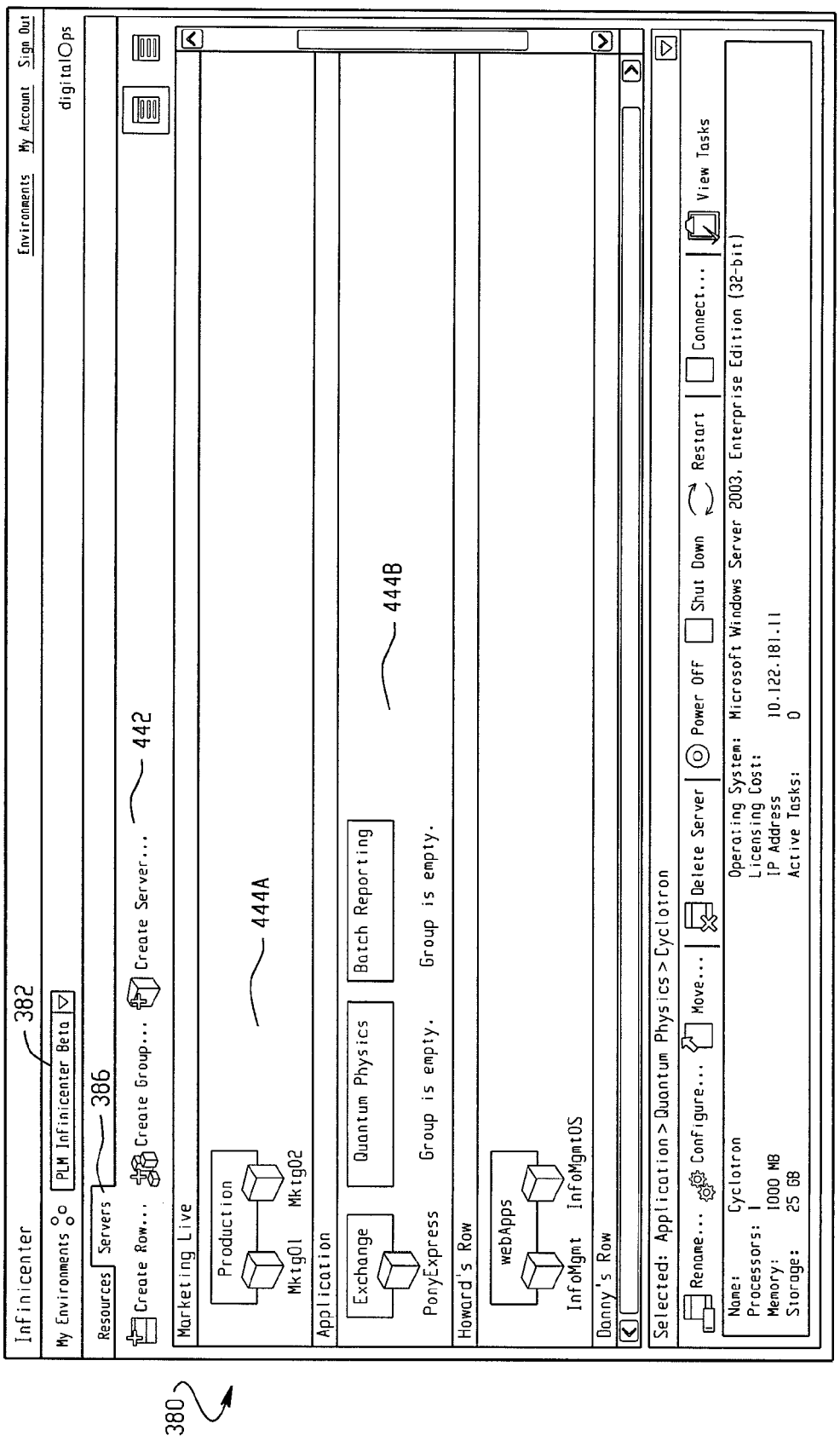
Figure 20B:
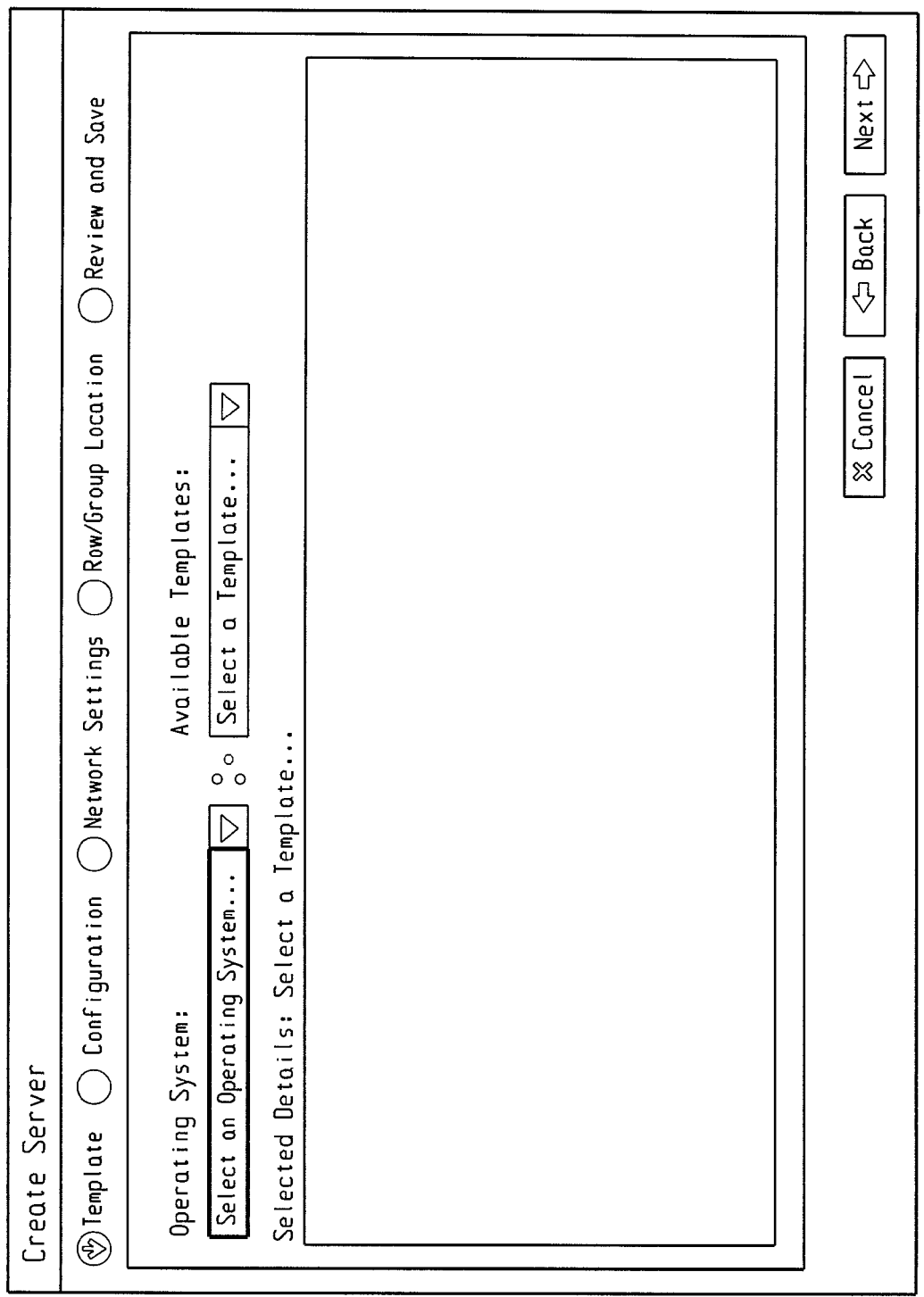

FIGS. 20A-20J depict graphical user interface screens of the exemplary customer provisioning console for creating a new server within a customer environment. FIG. 20A depicts the "Server" main interface screen described above in connection with FIG. 18A. In order to create and place a new virtual server within the selected customer environment shown in FIG. 20A, the customer selects the "Create Server" icon from the action bar selector 442. Having done so, the system then displays a create server dialog box 480, as shown in FIG. 20B, which is used by the customer to create the new virtual server. This dialog box 480 includes five main virtual server creation functions, labeled Template, Configuration, Network Settings, Row/Group Location and Review and Save. These five main virtual server creation functions are executed, in series, in order to complete the process of provisioning a new virtual server asset.

Figure 20C:
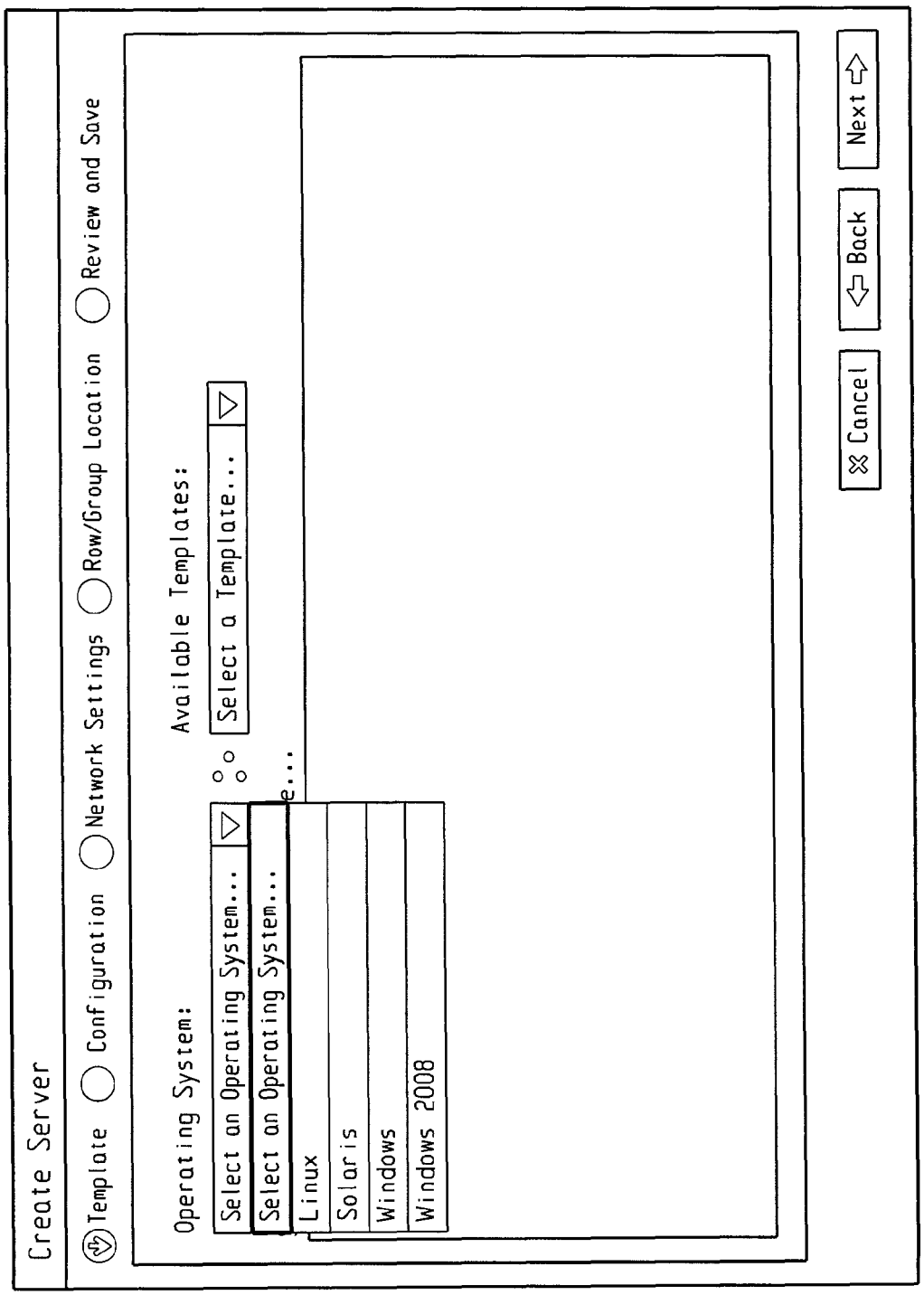
Figure 20D:
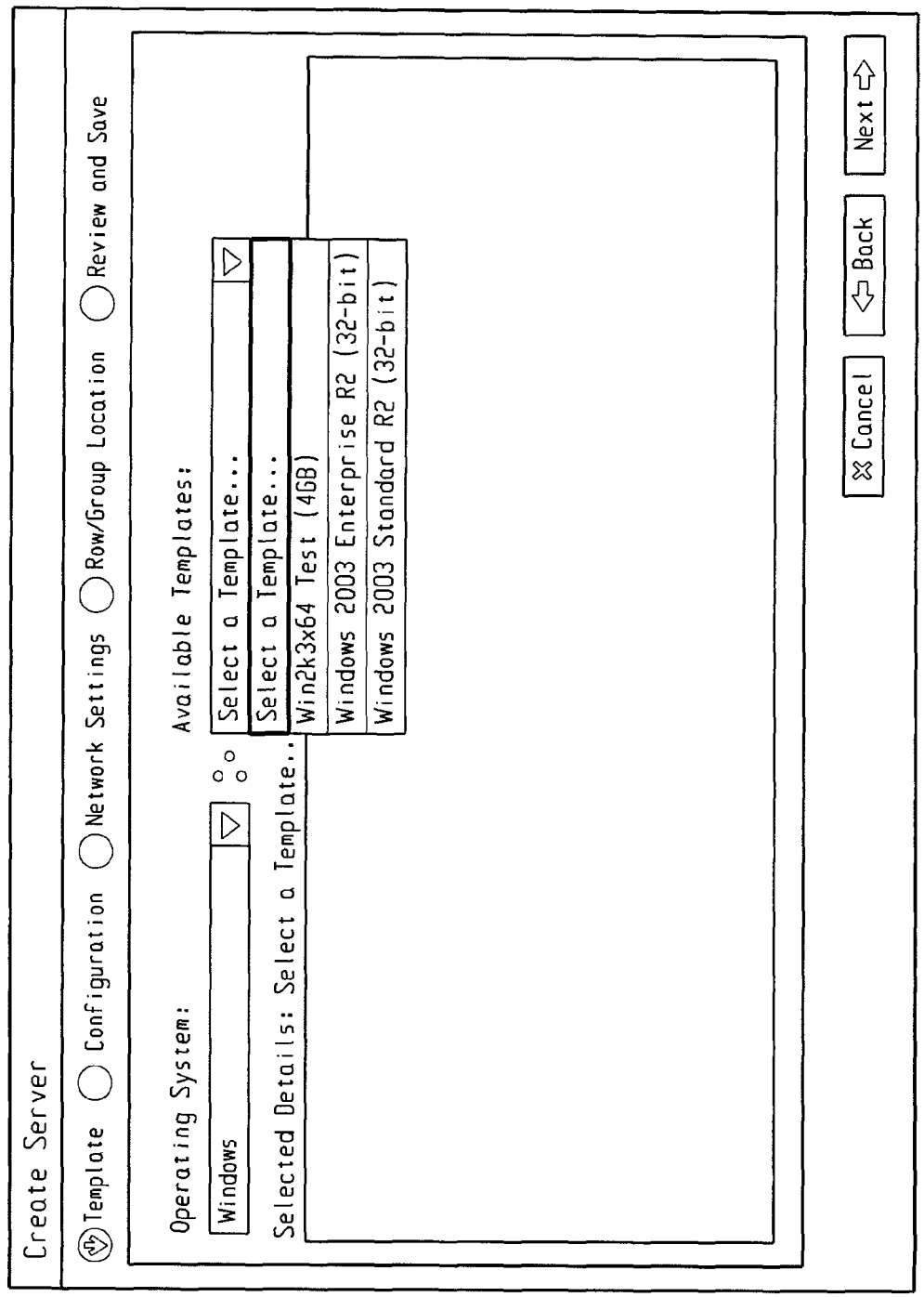
Figure 20E:
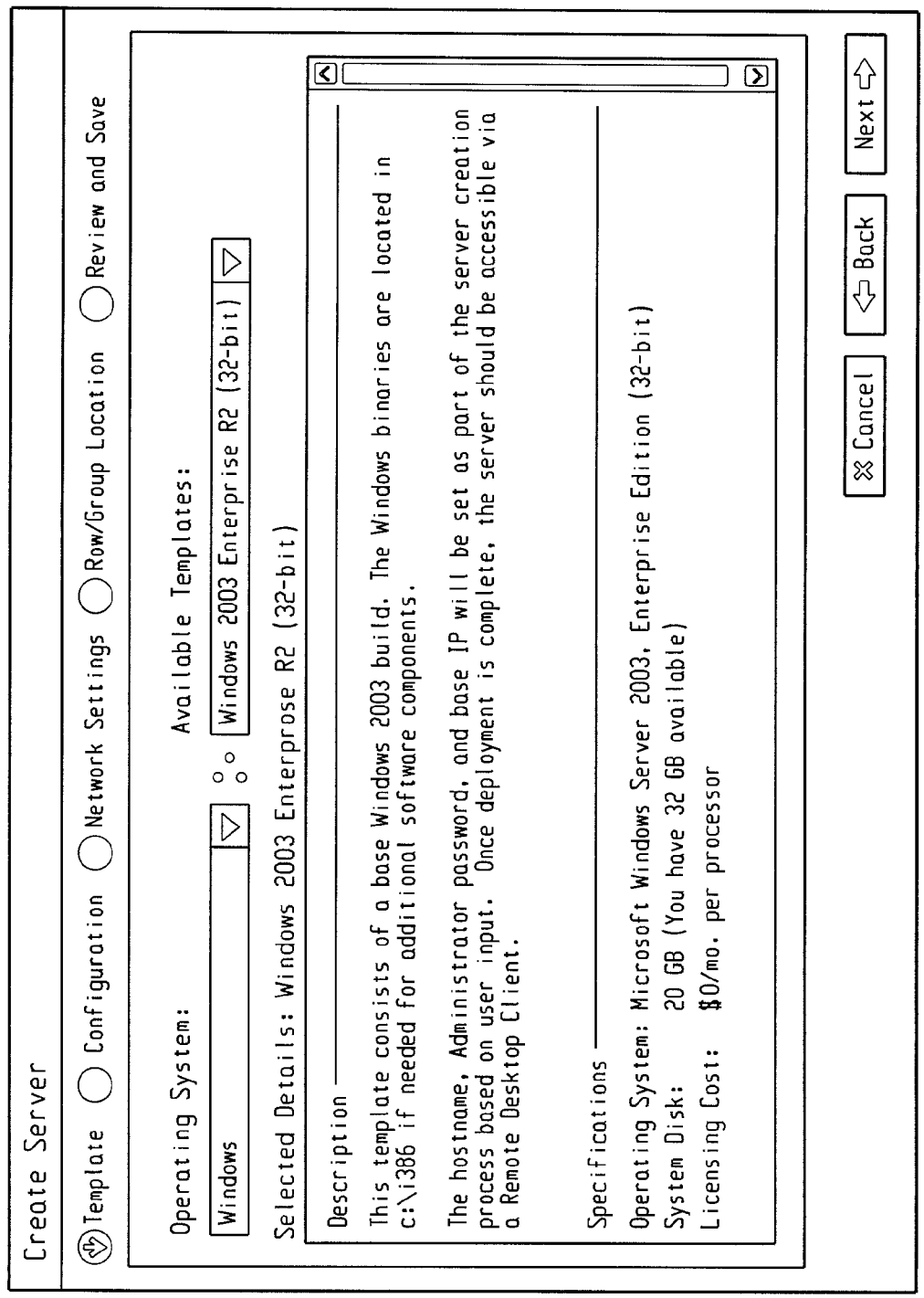

Beginning with FIG. 20B, the customer is prompted to first select an operating system to be associated with the new virtual server. FIG. 20C displays the Operating System dropdown list that provides a selection of available operating systems for the customer to choose from. Having selected a particular operating system, in this case the Windows operating system, the customer is then prompted to select from the available system templates that have been configured by the system administrator for the selected operating system. This is shown in FIG. 20D. After selection of a particular template for the selected operating system, the customer is then presented with the interface screen shown in FIG. 20E, which provides additional details regarding the template, the size of any system disk associated with the selected template, and the licensing cost for the customer to deploy the particular selected template. At this point the customer has completed the Template function.

FIG. 20F depicts the display screen immediately following the customer's completion of the Template function in which the customer is now prompted to perform configuration tasks on the new virtual server. These tasks include providing a server name, providing an administration password for logging into the virtual server, selecting a number of processors to be associated with the virtual server, and selecting an amount of system memory to be associated with the virtual server. Using these controls, the customer is able to custom design each virtual server asset and to precisely control the amount of virtual processing power and memory for each virtual server. At this point the customer has completed the Configuration function.

Figure 20G:
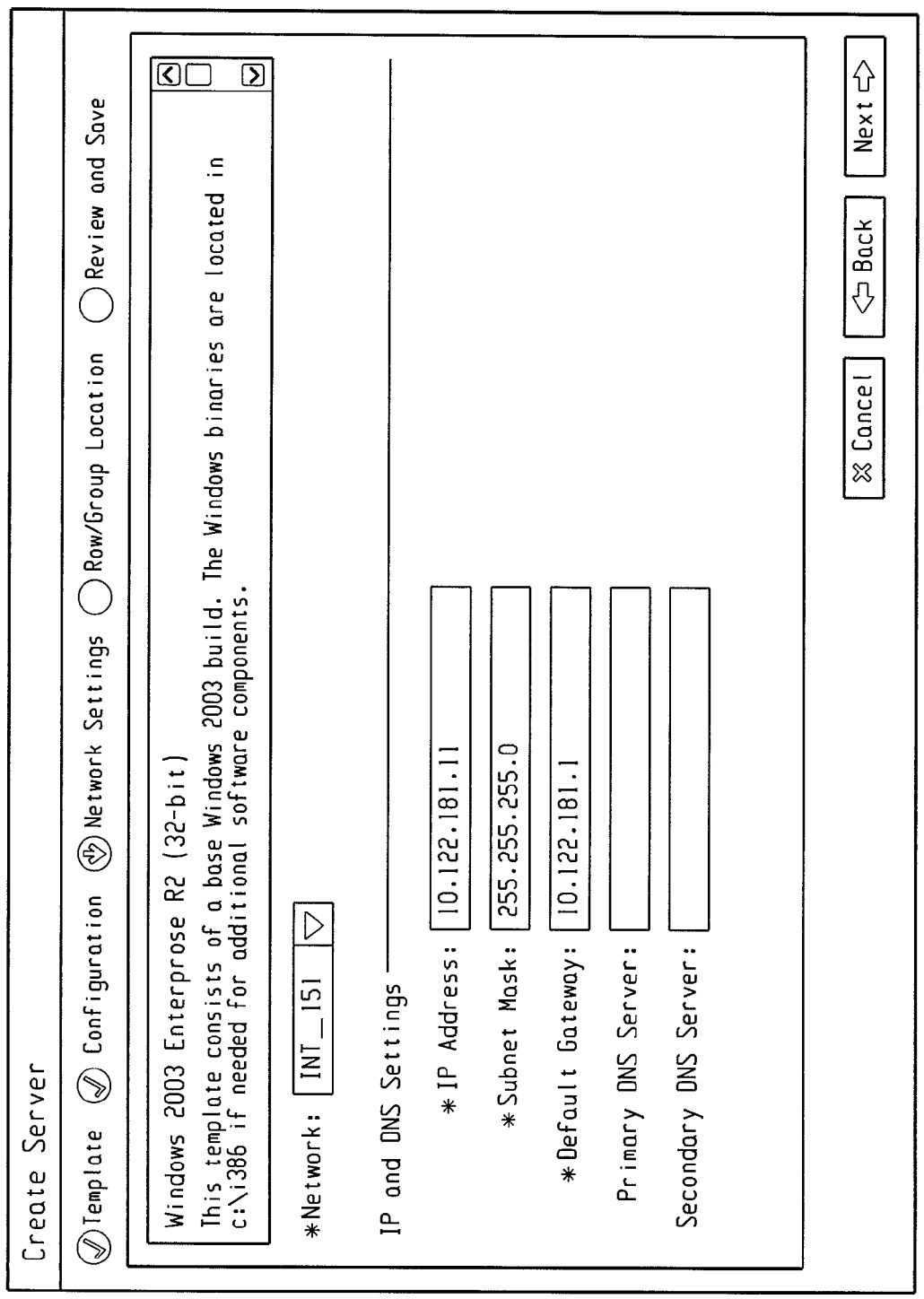
Figure 20H:
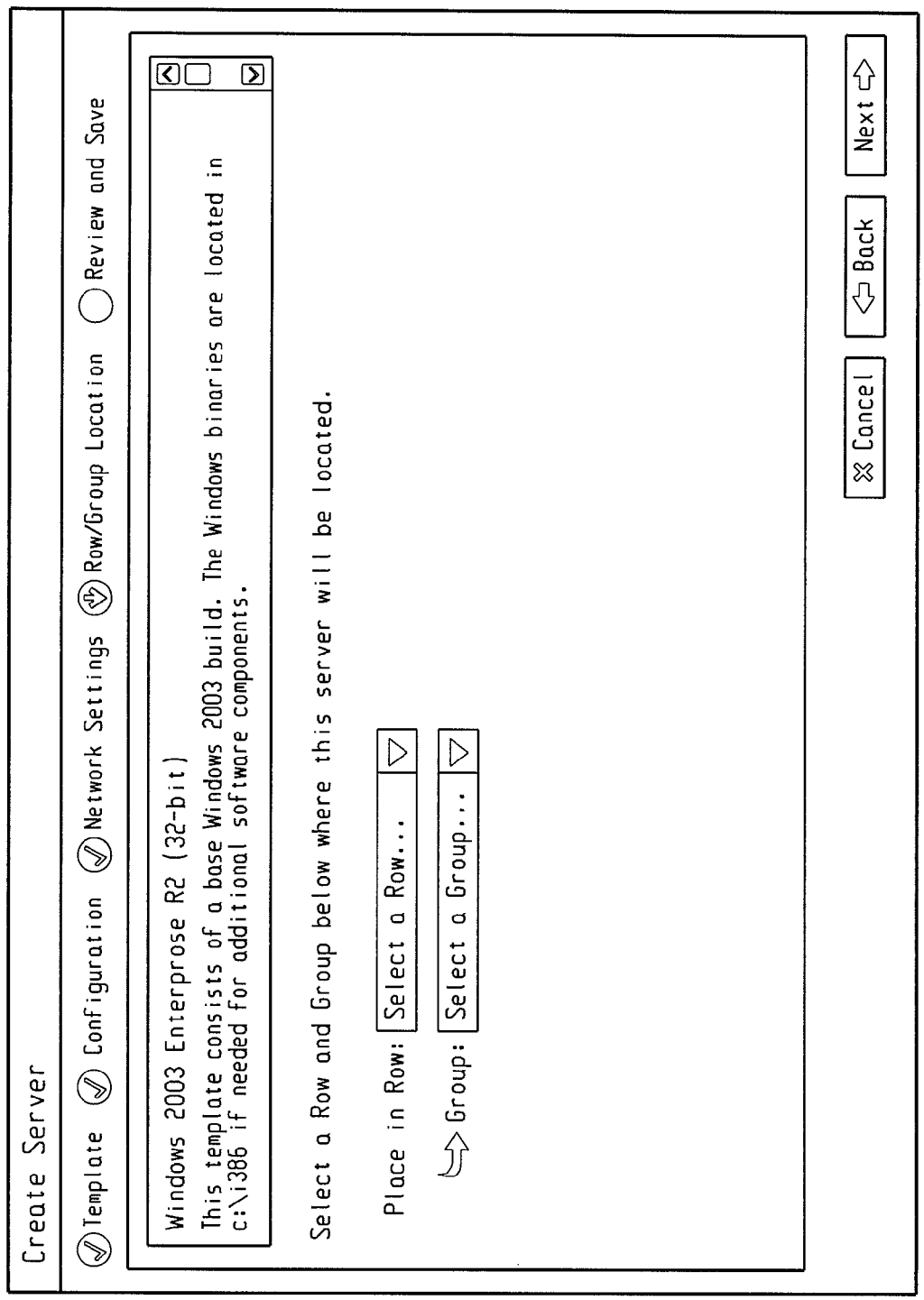

FIG. 20G depicts the display screen immediately following the customer's completion of the Configuration function in which the customer is now prompted to provide information regarding the network settings for the new virtual server. Using this display screen 530, the customer selects a particular network to associate with the virtual server and then provides details of the IP and DNS settings for the virtual server. Having completed this function, the customer in FIG. 20H is prompted to select a row and group associated with the customer's environment in which to place the newly-configured virtual server.

Figure 20J:
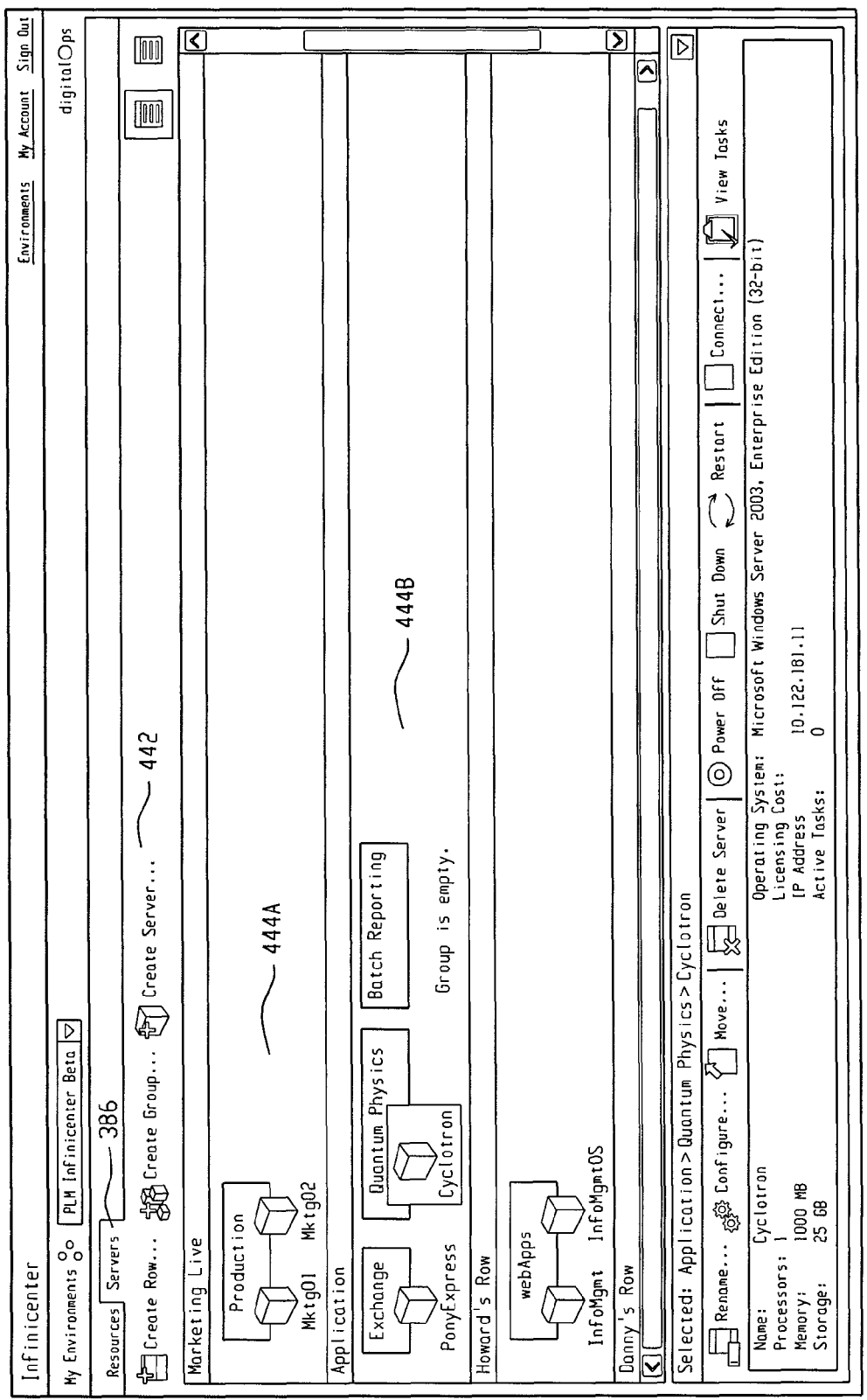

FIG. 20I depicts the display screen for reviewing and saving the new virtual server configuration prior to deployment. This interface screen 560 displays the configuration information for the virtual server as provided to the system through the prior interface screens and prompts the user to power on the server when it is created by the virtualization control system and also requires the customer to agree that they will be bound by any licensing and resource usage fees when the "Deploy" button (shown at the bottom of FIG. 20I but grayed out at the moment) is selected. After the user agrees to be bound by such fees, the Deploy button is activated, and once selected the newly-configured virtual server is then created within the customer's environment by the virtualization control system and appears in the customer's Server main interface for the environment as shown in FIG. 20J.

Figure 21:
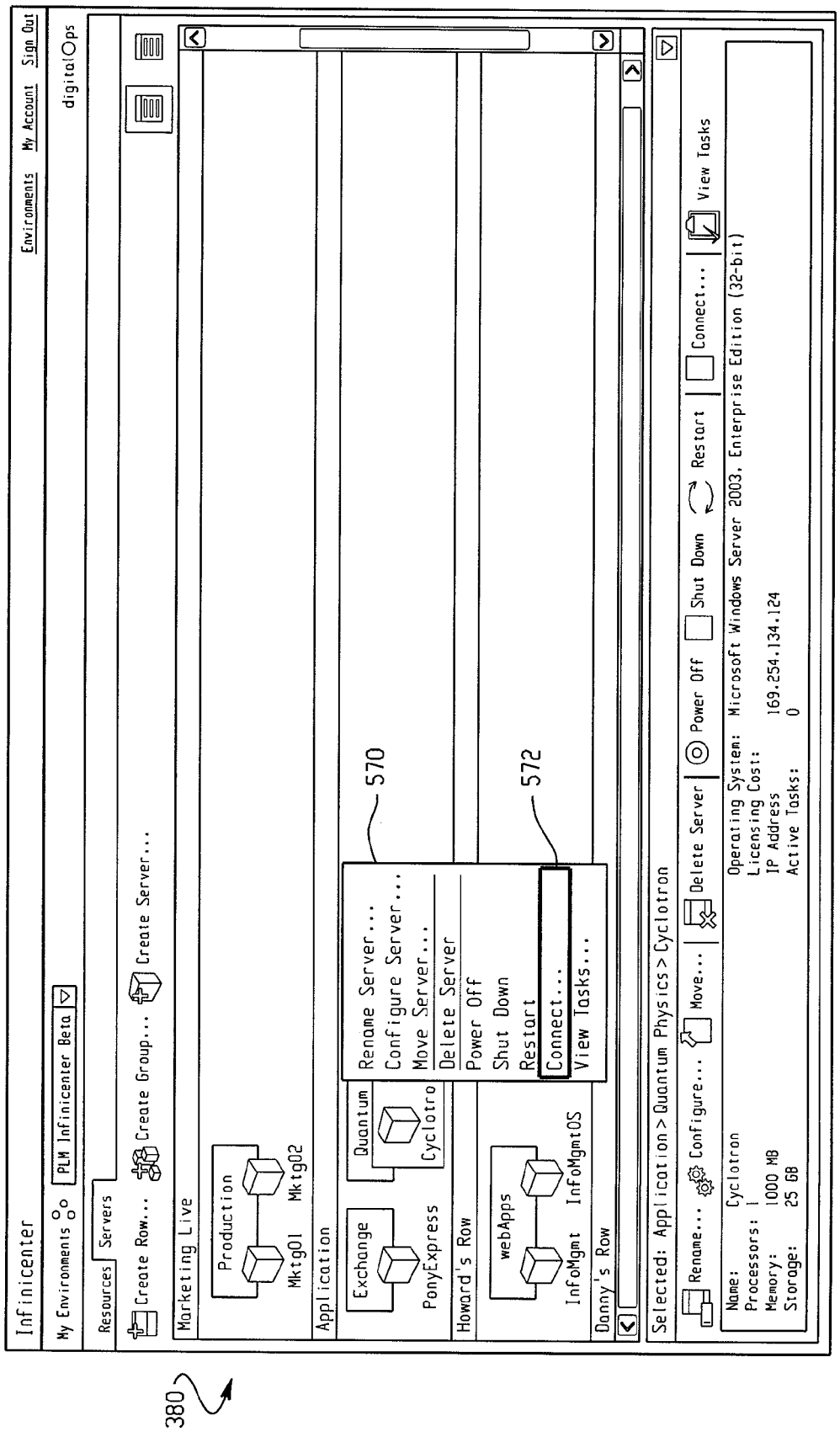
FIG. 21 depicts a graphical user interface screen of the exemplary customer provisioning console for connecting to a virtual server.
Figure 22:
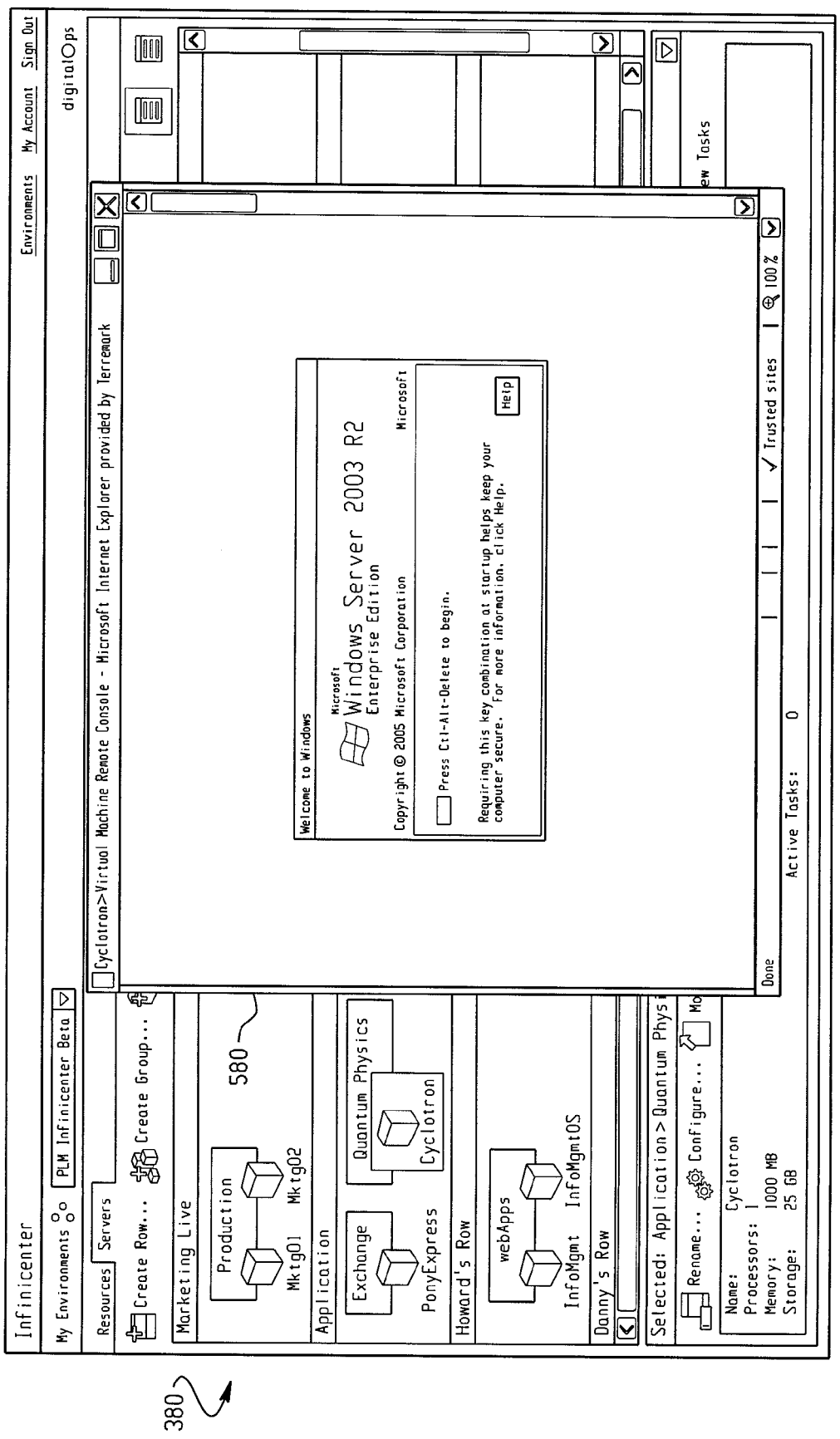
FIG. 22 depicts a graphical user interface screen of the exemplary customer provisioning console showing an open connection to a virtual server.

FIG. 21 depicts a graphical user interface screen of the exemplary customer provisioning console for connecting to a virtual server. In this figure, the customer has performed a "right click" operation with their pointing device, which opens a server function box 570 that enables the customer to perform virtual server functions including connecting 572 to a virtual server. Selecting this function opens a connection to the selected server as shown in FIG. 22. FIG. 22 depicts a graphical user interface screen of the exemplary customer provisioning console showing an open connection to a virtual server.

Figure 23:
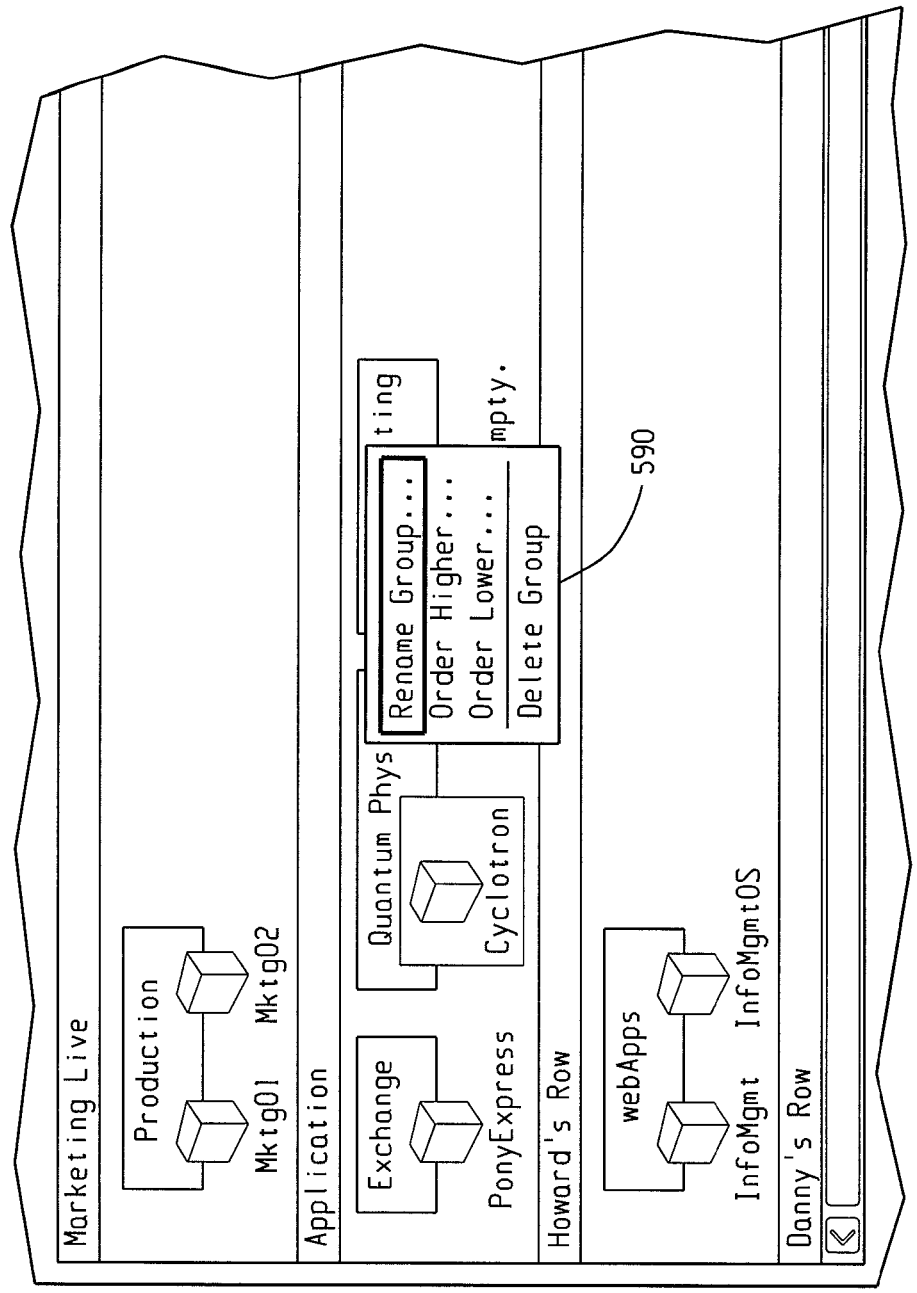
FIG. 23 depicts a graphical user interface screen of the exemplary customer provisioning console for selecting a virtual server group task.

FIG. 23 depicts a graphical user interface screen of the exemplary customer provisioning console for selecting a virtual server group task. This function list is activated using a "right click" selection from the customer's pointing device and enables the customer to perform one or more group tasks, such as renaming the group, ordering the group to a higher position within the row, which typically means moving the group leftward within a sequence of groups in a particular row, ordering the group to a lower position within the row, which typically means moving the group rightward within a sequence of groups in a particular row, and finally deleting the group from the selected row.

Figure 24:
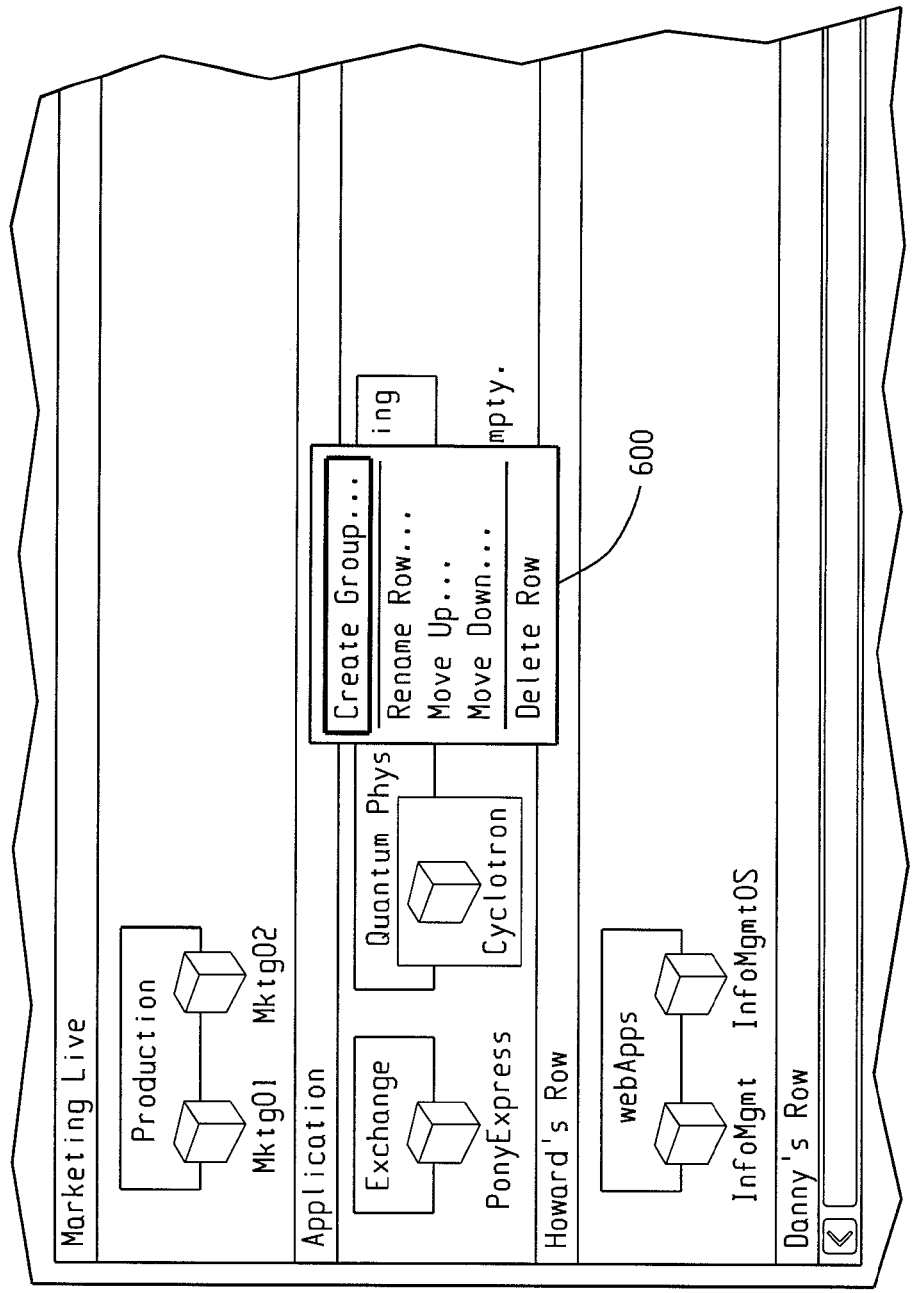
FIG. 24 depicts a graphical user interface screen of the exemplary customer provisioning console for selecting a virtual server row task.

FIG. 24 depicts a graphical user interface screen of the exemplary customer provisioning console for selecting a virtual server row task. This function list 600 is activated using a "right click" selection from the customer's pointing device and enables the customer to perform one or more row tasks, such as creating a group within the row, renaming the row, moving the row upwards towards the top of the display screen in a sequence of displayed rows of assets, moving the row downwards towards the bottom of the display screen, and deleting the row.

Figure 25:
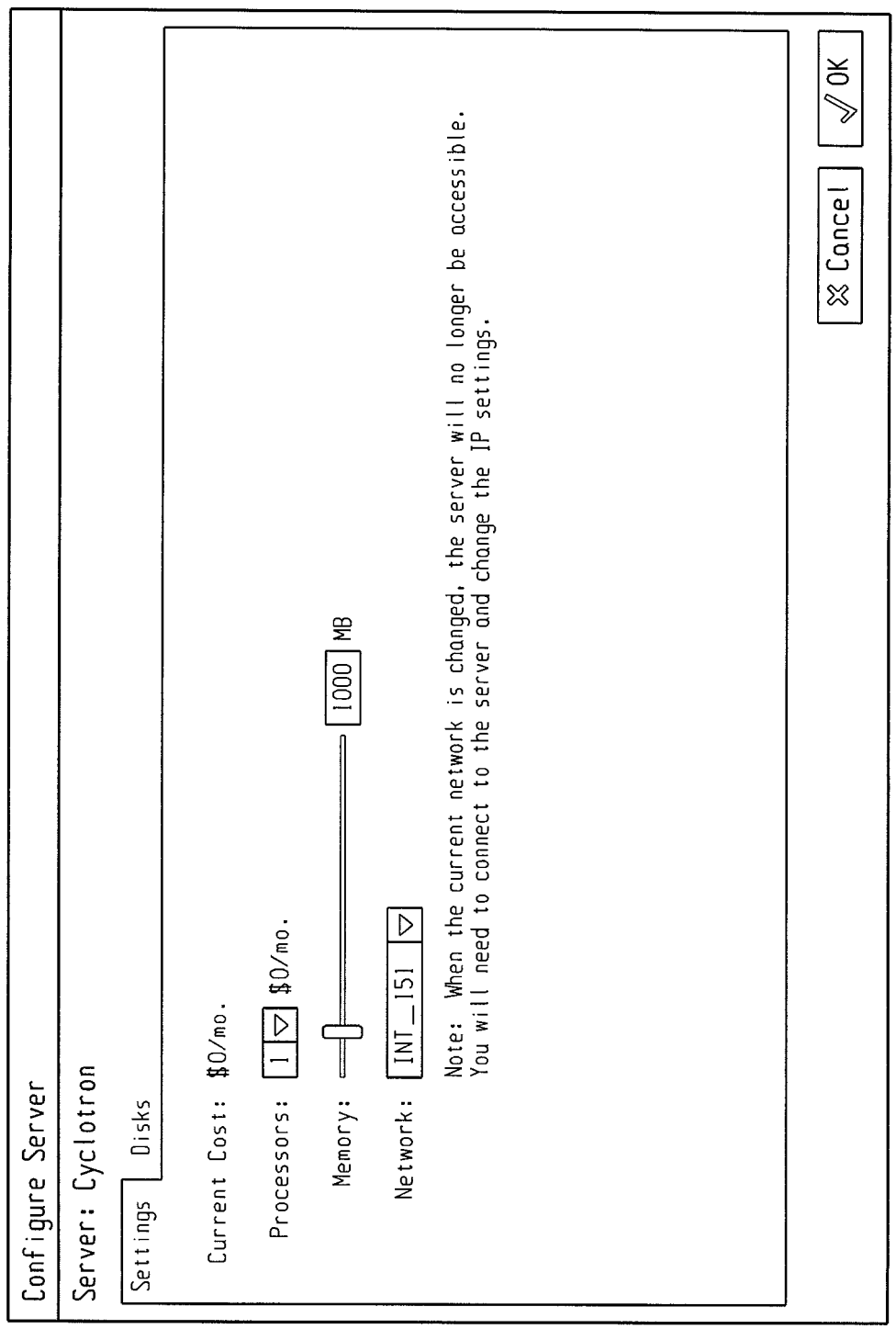
FIG. 25 depicts a graphical user interface screen of the exemplary customer provisioning console for configuring the processor, memory and network connectivity of a virtual server.
Figure 26:
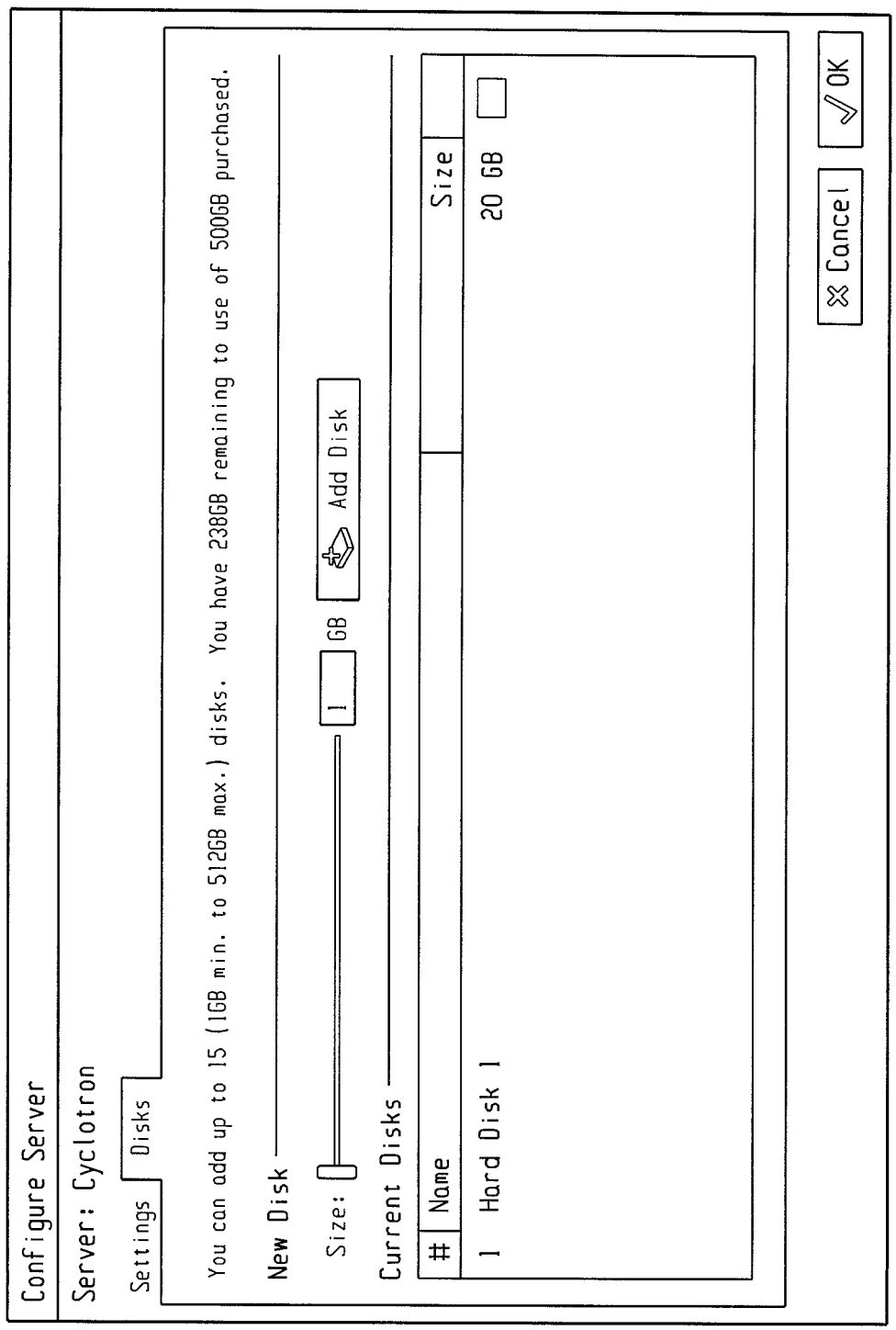
FIG. 26 depicts a graphical user interface screen of the exemplary customer provisioning console for configuring the disk storage resource of a virtual server.

FIG. 25 depicts a graphical user interface screen of the exemplary customer provisioning console for configuring the processor, memory and network connectivity of a virtual server and FIG. 26 depicts a graphical user interface screen of the exemplary customer provisioning console for configuring the disk storage resource of a virtual server. Prior to displaying the interface screens in FIGS. 25 and 26, the customer has engaged the sever function selector associated with a particular virtual server by performing the "right click" operation on the selected server. This brings up the server function selector 570, and enables the customer to select the "Configure Server" function 610. This function may also be selected from the function bar associated with the selected virtual server displayed below the row/group area of the Server main interface. Selecting this function 610 causes the console provisioning application to display the virtual server configuration dialog box 620. This dialog box includes two main configuration tabs—Settings and Disks.

The Settings configuration tab is shown in FIG. 25 and the Disks configuration tab is shown in FIG. 26. Using the Settings configuration tab, the customer can change the number of processors associated with the selected virtual server, the customer can change the memory allocation associated with the virtual server using the sliding bar depicted in FIG. 25, and the customer can change the network settings associated with the virtual server. Using the Disks configuration tab shown in FIG. 26, the customer can add a new disk to the virtual server, and using the sliding bar mechanism, the customer can allocate a precise amount of disk memory to the newly created disk. Alternatively, the customer can select an existing disk from the display shown in the bottom portion of FIG. 26 and then modify the size of the selected disk using the slider bar mechanism. In this manner, the customer is able to precisely control the amount of disk memory and partitioning associated with each virtual server asset.

FIG. 27 depicts a graphical user interface screen of the exemplary customer provisioning console for viewing customer transaction history. This screen is activated when the customer selects the My Account link 640 at the top portion of the main interface screen. Selecting this link 640 causes the system to display an interface as shown in FIG. 27, in which the customer can select from four main functions—Billing, Transaction History, Settings and Users. The Transaction History function is shown in FIG. 27, and provides details regarding each customer transaction that may effect the configuration of the selected environment. For example, creating a server, deleting a server, upgrading and or modifying an existing server, and other transactions are displayed in this interface screen.

Figure 28:
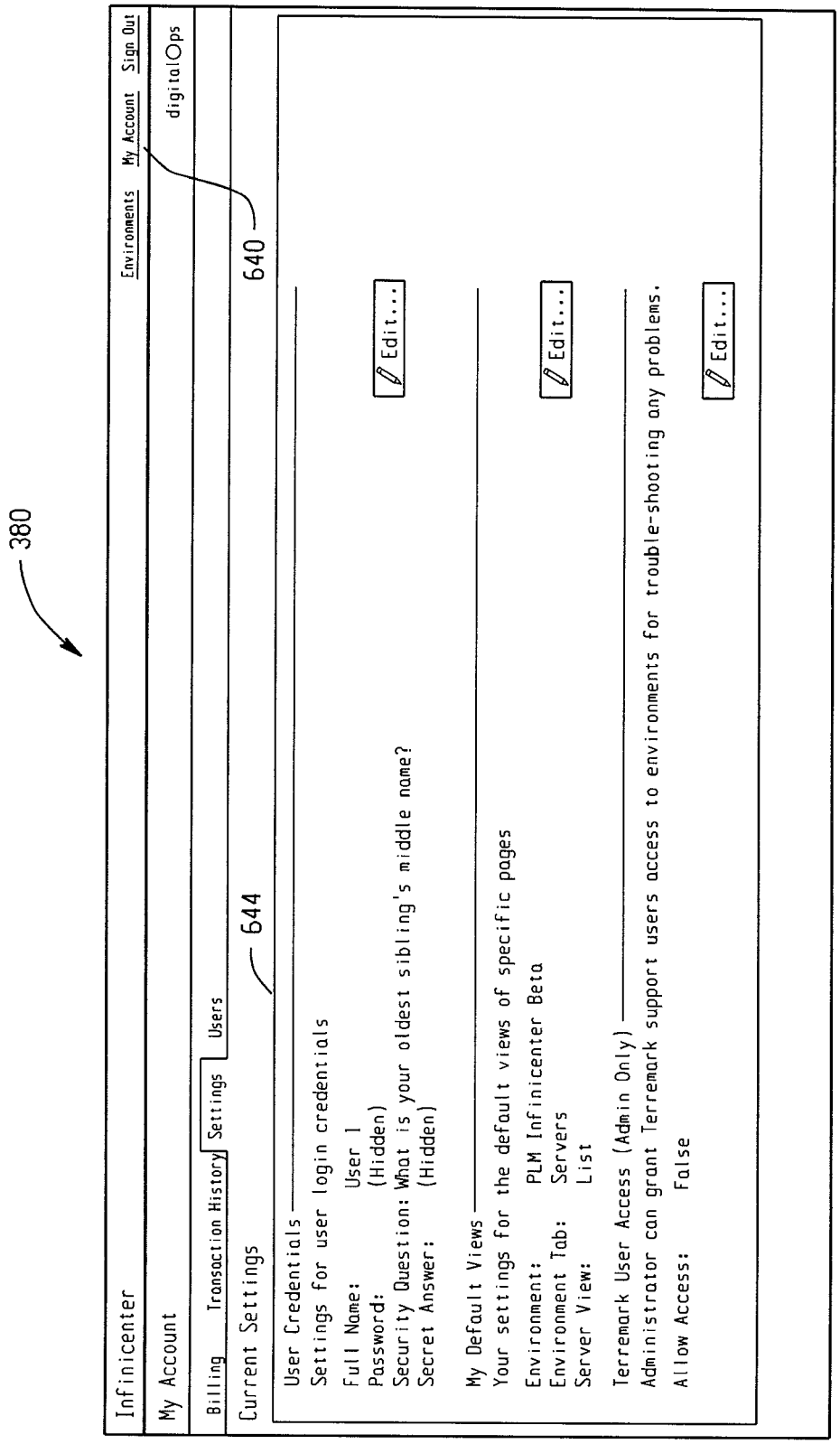
FIG. 28 depicts a graphical user interface screen of the exemplary customer provisioning console for viewing customer settings.

FIG. 28 depicts a graphical user interface screen of the exemplary customer provisioning console for viewing customer settings. Using this interface screen, the customer is able to change user credentials, change the default view settings for a particular user, and change the determination of whether the system administrator is able to access the particular customer environment. (This last function is described above in connection with FIGS. 8A-8B).

FIG. 29 depicts a graphical user interface screen of the exemplary customer provisioning console for viewing authorized customer users of the customer provisioned utility computing platform. This screen provides details of the authorized users, their email addresses, roles, last login time, and whether they have an active status. An "Invite User" selector 646 enables the customer to invite another person to have access to the selected customer environment.

Figure 30A:
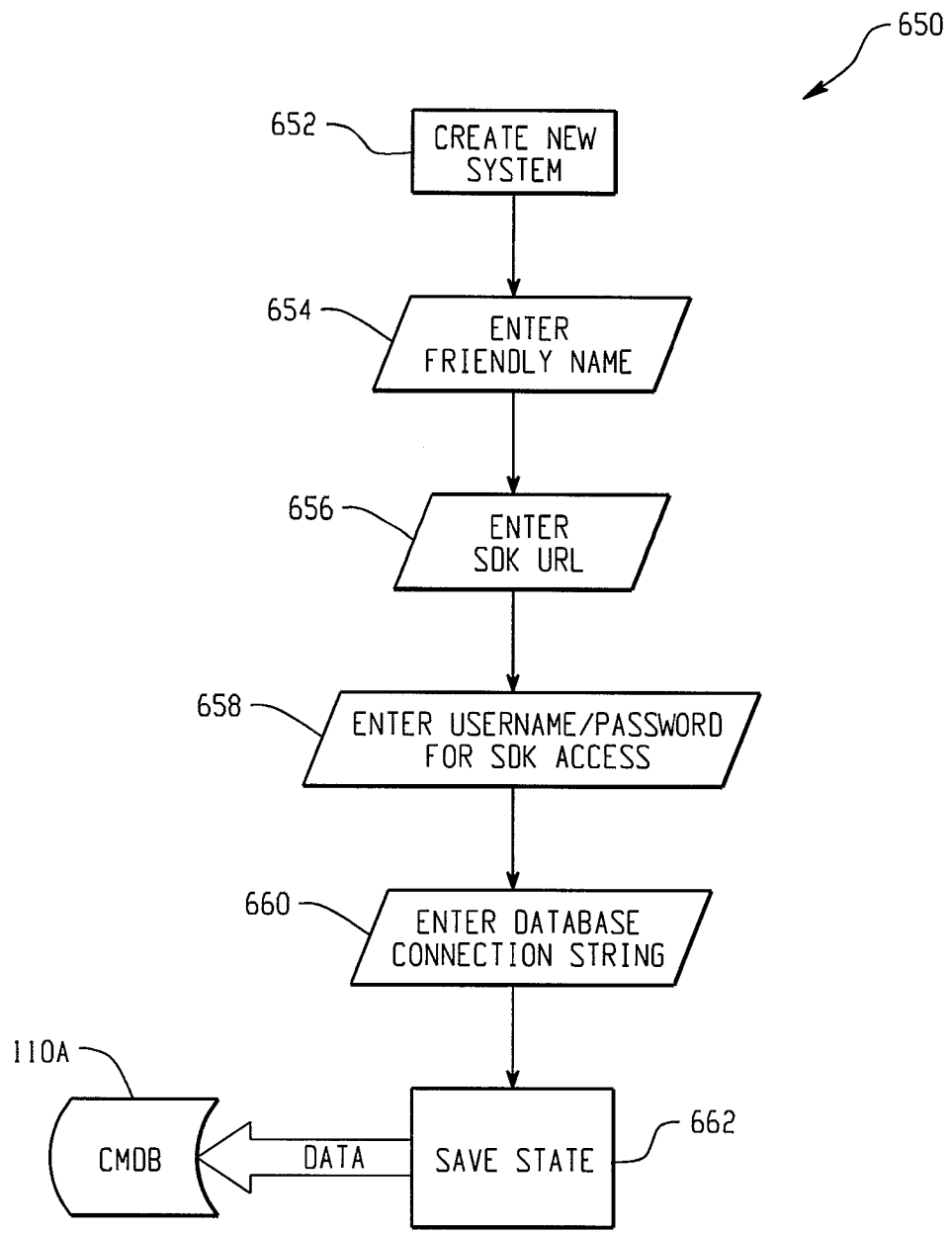
FIG. 30A is an exemplary flow diagram depicting a method for adding a virtualization control system to a customer provisioned utility computing platform.

FIG. 30A is an exemplary flow diagram 650 depicting a method for adding a virtualization control system to a customer provisioned utility computing platform. At step 652 a system administrator determines that a new virtualization control system should be created and added to the system. At step 654 a friendly name is associated with the new virtualization control system. An SDK URL is provided to the system at step 656, which is used by the system to access and communicate with the new virtualization control system. A username/password is then provided at step 658 to control system-level access to the virtualization control system, and at step 660 a database connection string is then entered into the system. This information regarding the new virtualization control system is then saved to the CMDB at step 662 and the method is complete. (FIG. 31 depicts a graphical user interface screen of an exemplary administration console for adding a virtualization control system to the customer provisioned utility computing platform).

Figure 30B:
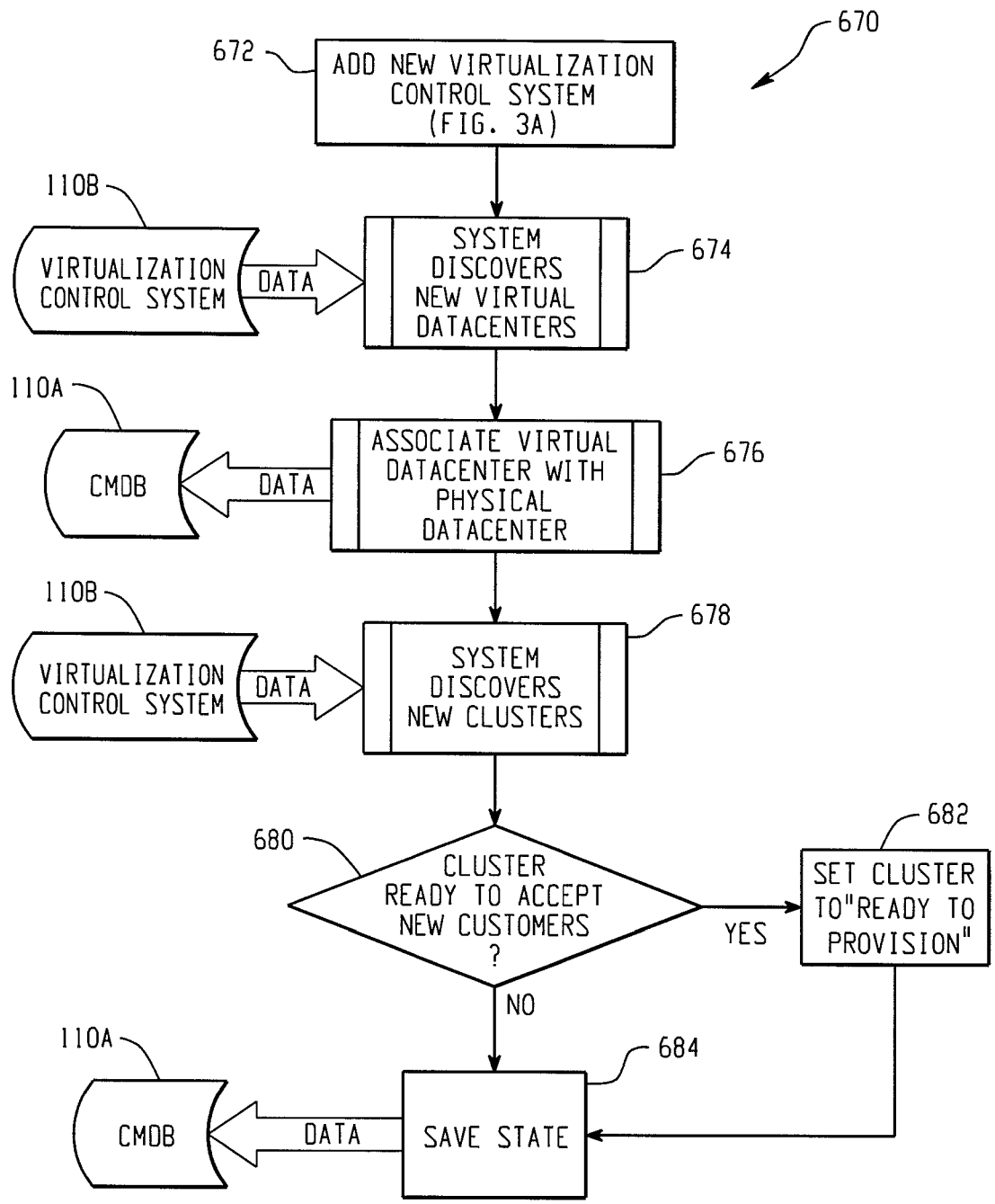
FIG. 30B is an exemplary flow diagram depicting a method for adding computing clusters to a virtualization control system in a customer provisioned utility computing platform.

FIG. 30B is an exemplary flow diagram 670 depicting a method for adding computing clusters to a virtualization control system in a customer provisioned utility computing platform. The method begins at 672, where a new virtualization control system is added to the system (see, FIG. 30A and accompanying description). Periodically the system will discover new virtual control system resources at step 674 and will obtain information regarding these resources. At step 676, the new virtualization control system is then associated with a particular physical data center, and information regarding this association is then stored in the CMDB 110A. At step 678, the system periodically discovers information regarding available physical clusters of computing resources (processor, memory, storage, network) from the virtualization control systems 110B. At step 680, the system determines whether the available cluster of resources is able to accept new or additional customers. If so, then the cluster is set to "ready to provision," 682, meaning that a customer can access and associate the physical resources of the cluster to one or more virtual servers existing within the customers one or more environments. If the cluster is not able to accept new or additional customers, then control passes to step 684, where data regarding the state of the available physical clusters of computing resources is stored in the CMDB 110A. (FIGS. 32A-32B depict graphical user interface screens of an exemplary administration console for provisioning a computing cluster).

Figure 30C:
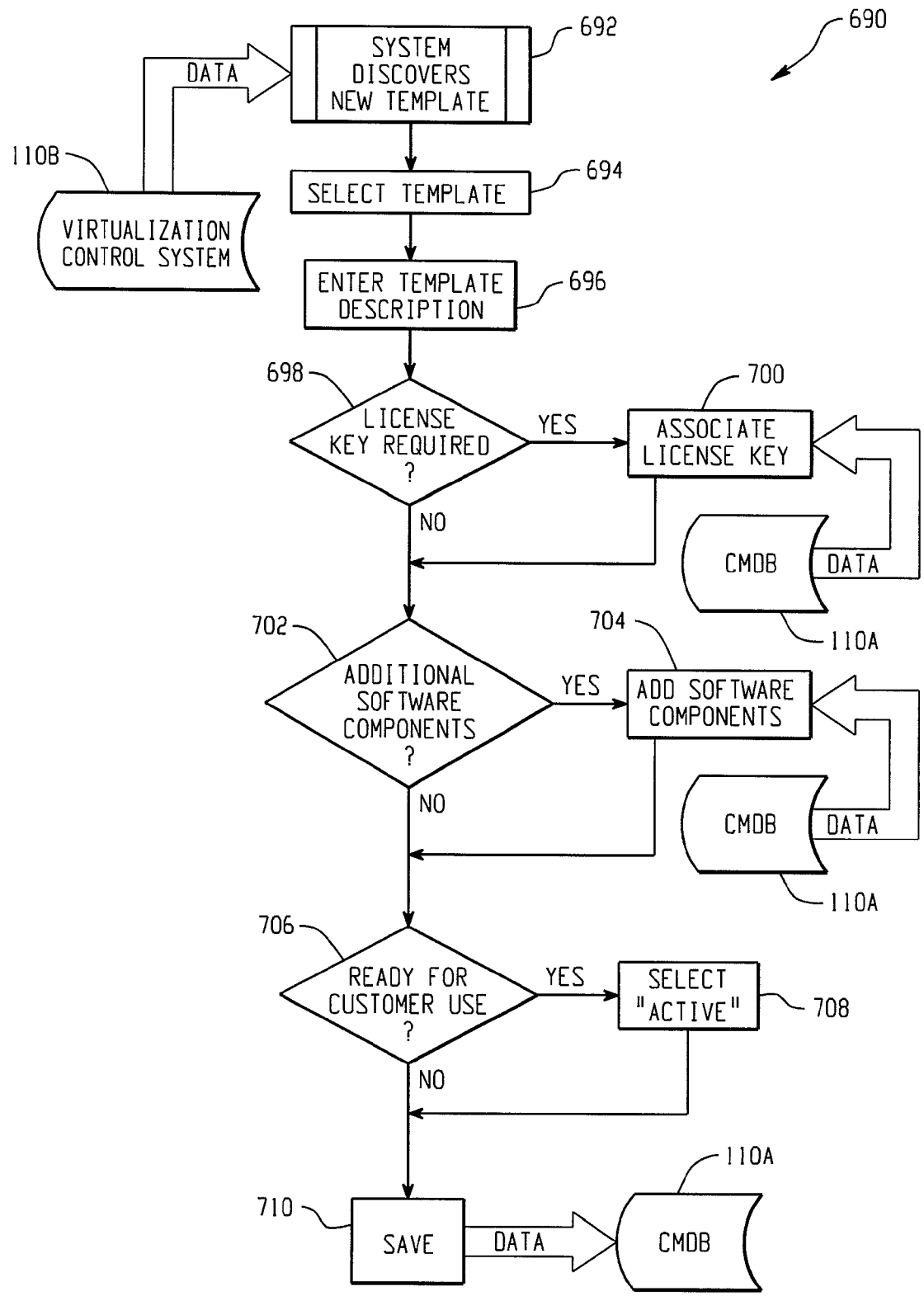
FIG. 30C is an exemplary flow diagram depicting a method for managing resource templates in a customer provisioned utility computing platform.

FIG. 30C is an exemplary flow diagram depicting a method for managing resource templates in a customer provisioned utility computing platform. At step 692 the system discovers new template information from the virtualization control system 110B. A template is then selected at step 694, and a description of the template is provided at step 696. If a license key is required for the one or more components of the template, as determined at step 698, then a license key is associated with the template at step 700, the license key information coming from the CMDB 110A. Otherwise control passes to step 702, where it is determined whether additional software components are to be associated with the template, and if so then at step 704 the additional software components are added to the template, wherein information regarding these additional software components is obtained from the CMDB 110A. Control then passes to step 706, where it is determined whether the configured template is now ready for customer use. If so, then the template is set to active in step 708, and data regarding the configured template is then saved to the CMDB 110A at step 710. (FIG. 33 depicts a graphical user interface screen of an exemplary administration console for managing resource templates).

Figure 31:
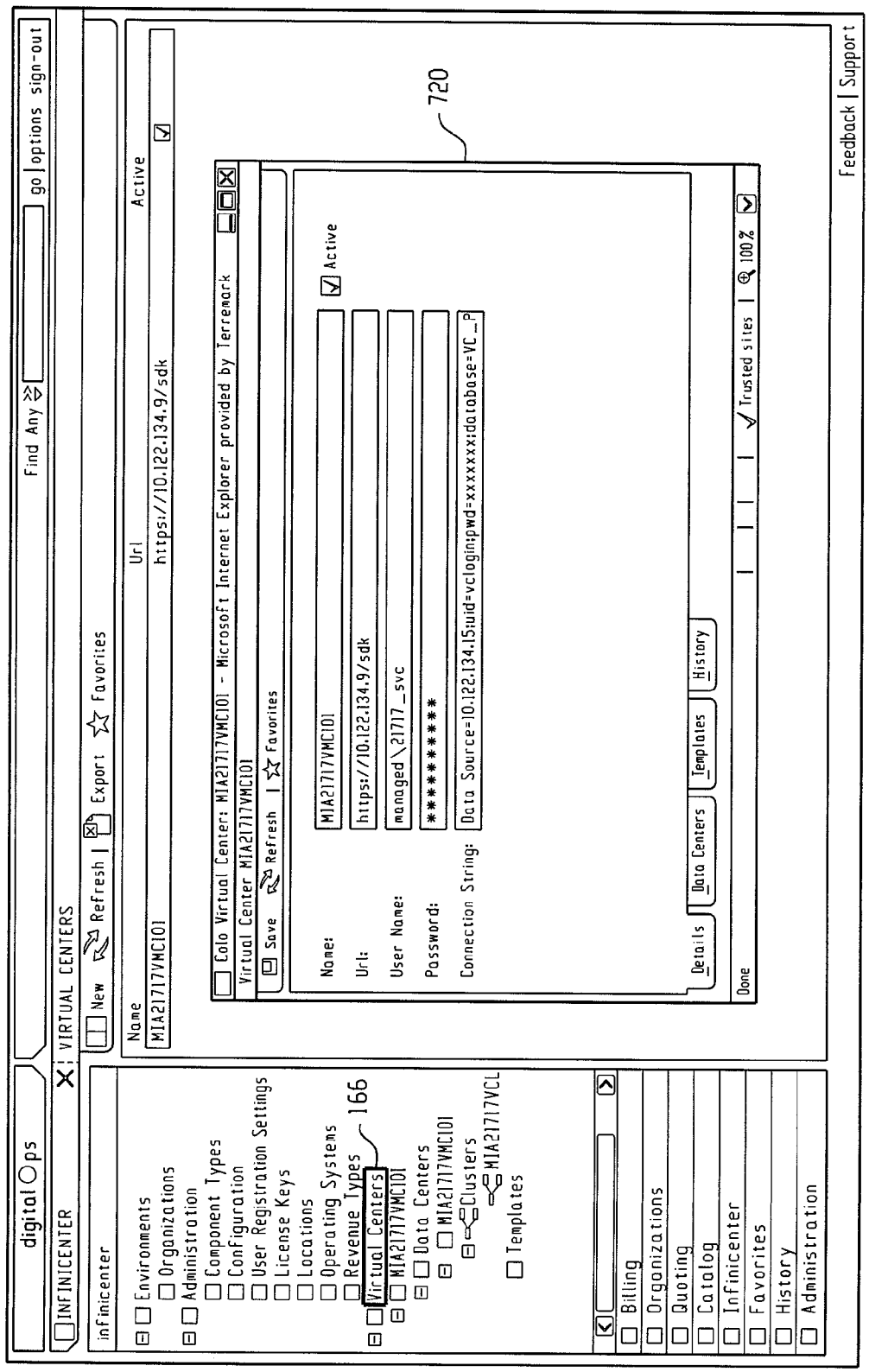
FIG. 31 depicts a graphical user interface screen of an exemplary administration console for adding a virtualization control system to the customer provisioned utility computing platform.

FIG. 31 depicts a graphical user interface screen of an exemplary administration console for adding a virtualization control system to the customer provisioned utility computing platform. In this screen 160, a system administrator has selected the Virtual Centers selector 166 and has added a new virtual center called MIA21717VMC101. In addition to naming the new virtual center via the dialog box 720, the system administrator provides the SDK URL of the new virtual center, provides a username and password, and enters a connection string for communicating with the new virtualization control system associated with this new virtual center.

Figure 32A:
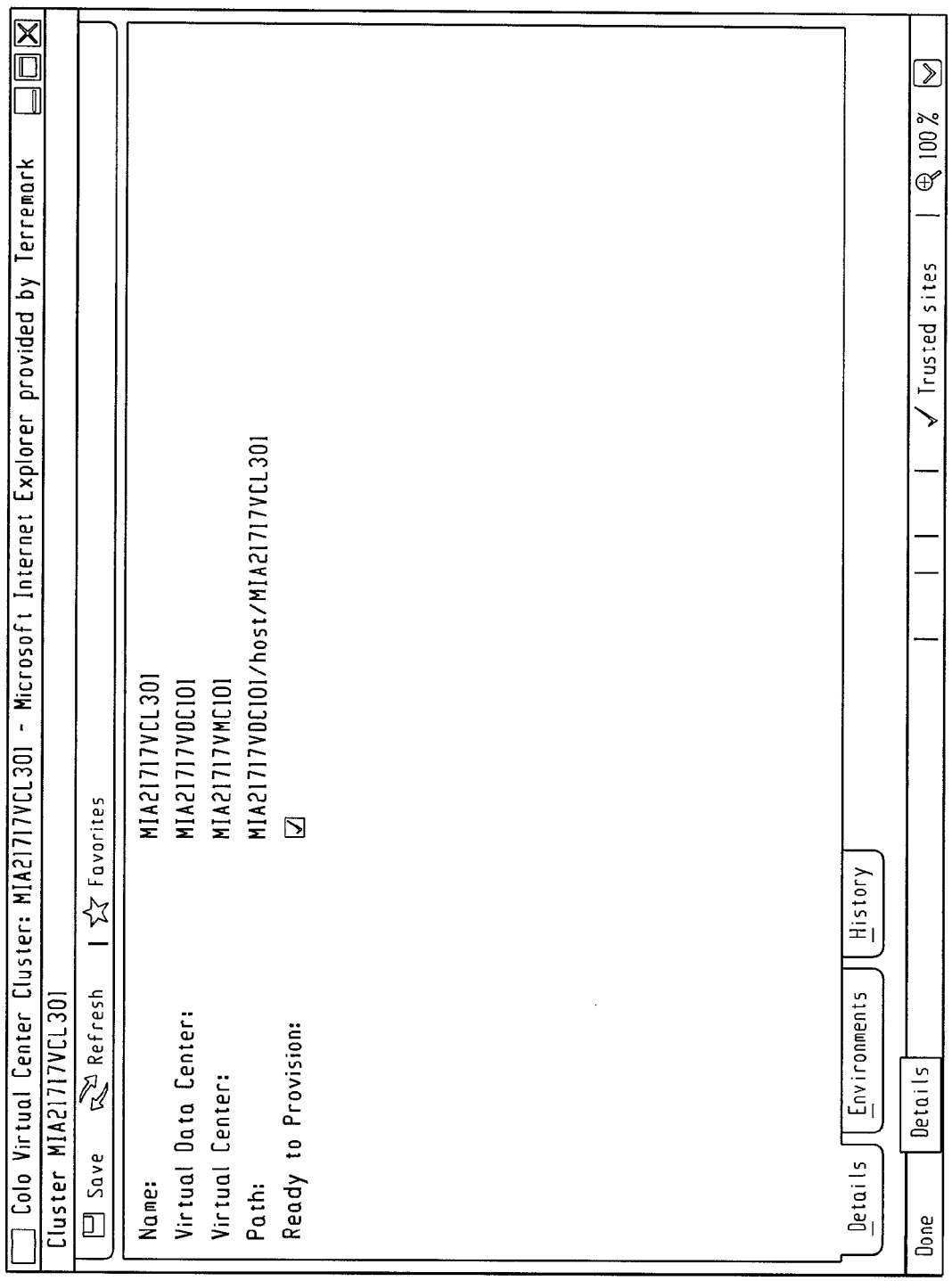

FIGS. 32A-32B depict graphical user interface screens of an exemplary administration console for provisioning a computing cluster. Each virtual center may be composed of one or more virtual data centers, each of which is composed of a plurality of computing clusters. The interface 730 shown in FIG. 32A is used to indicate that a particular cluster associated with a selected virtual data center is ready to provision through the virtualization control system so that it can be used to create customer environments. FIG. 32B depicts an interface screen 730 showing the present configuration of a particular computing cluster. This screen lists the customer environments that have been associated with this particular computing cluster of the virtual data center and also indicates the amount of memory, processor and disk storage virtual resources associated with each of the customer environments.

Figure 33:
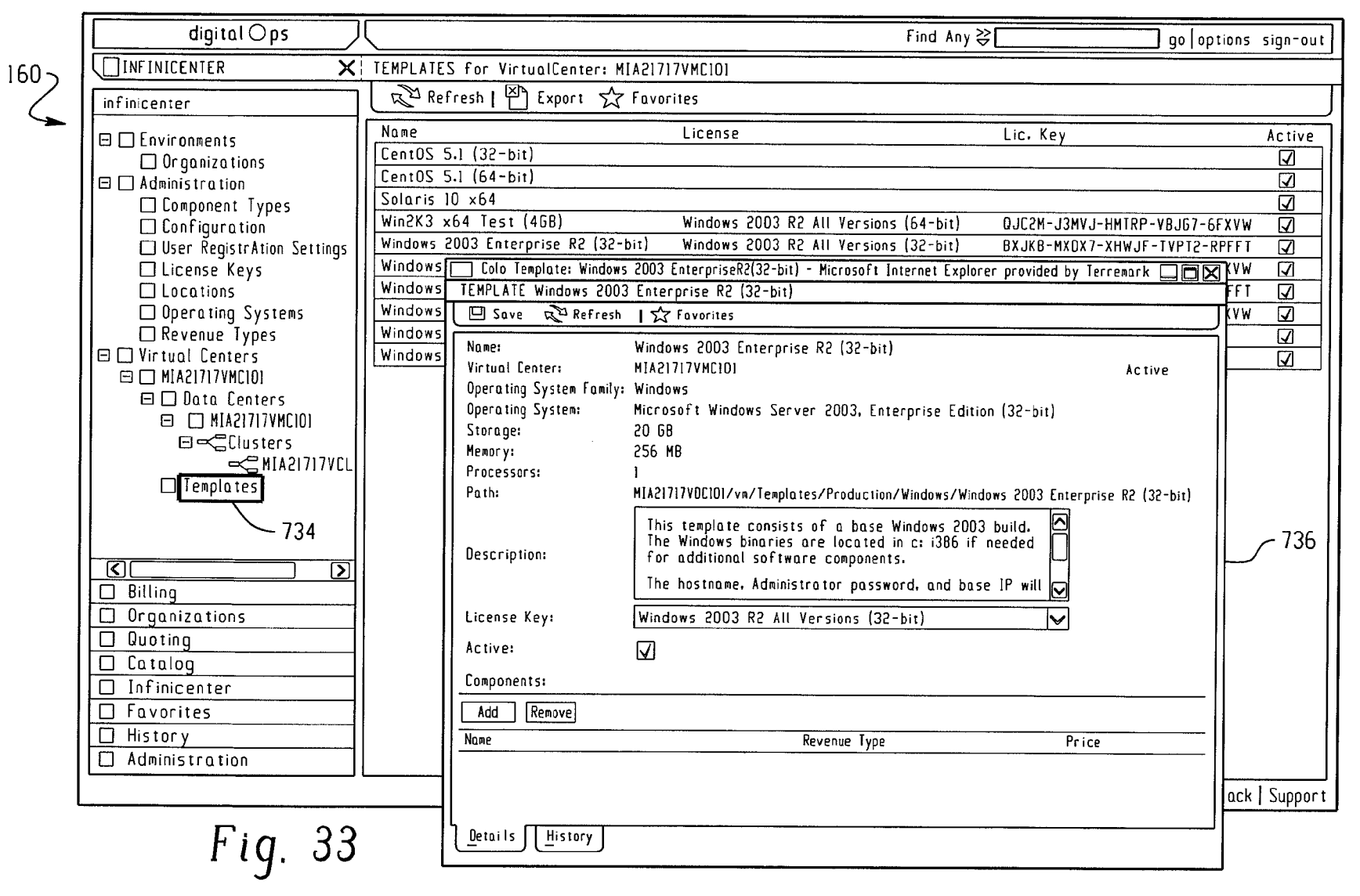

FIG. 33 depicts a graphical user interface screen of an exemplary administration console for managing resource templates. By selecting the Templates selector 734, a listing of the available templates associated with the data center is displayed in the main part of the interface screen. The system administrator can then select a template to obtain additional information through the display screen 736 regarding the selected template.

Figure 34A:
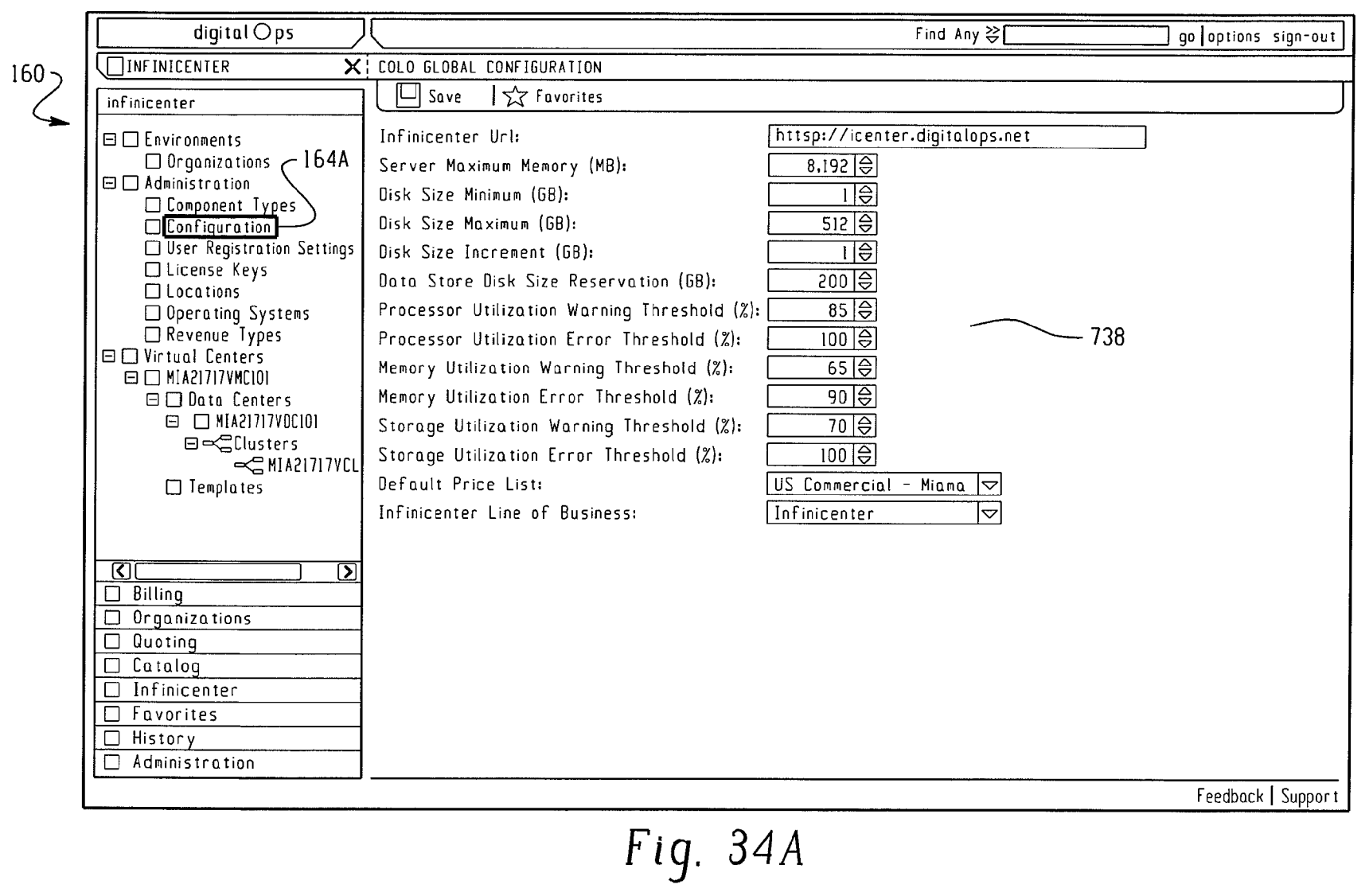
Figure 34B:
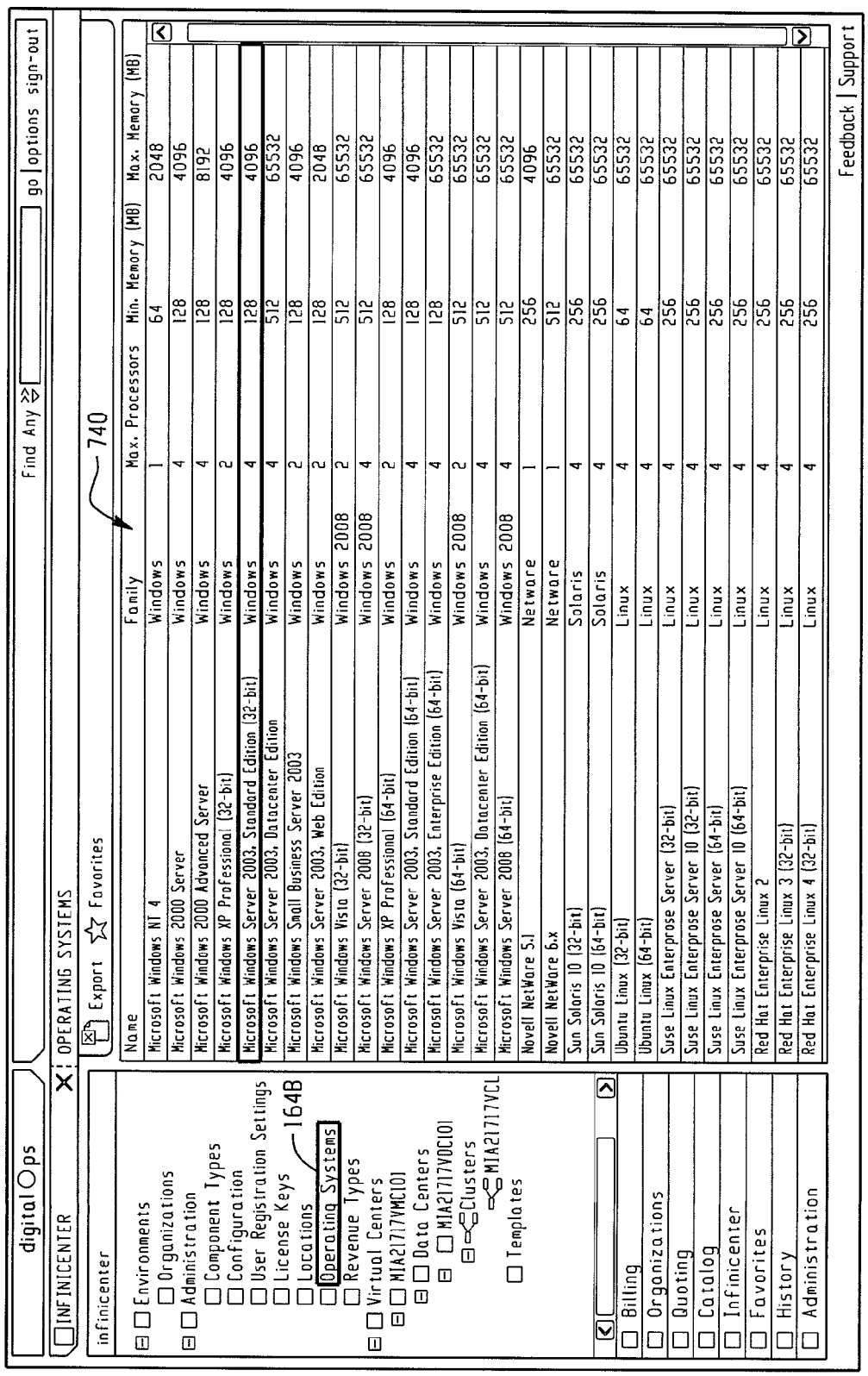
Figure 34C:
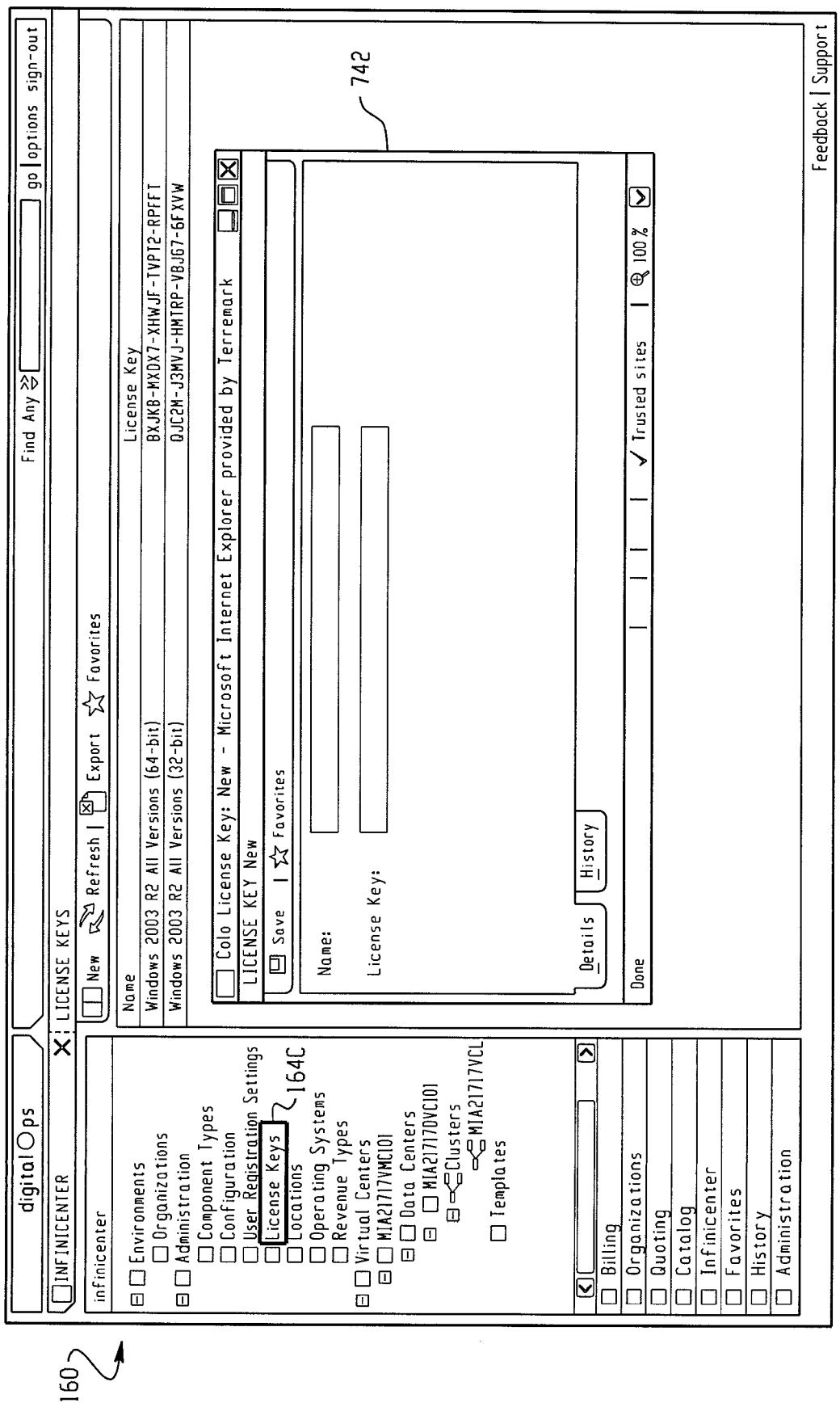
Figure 34D:
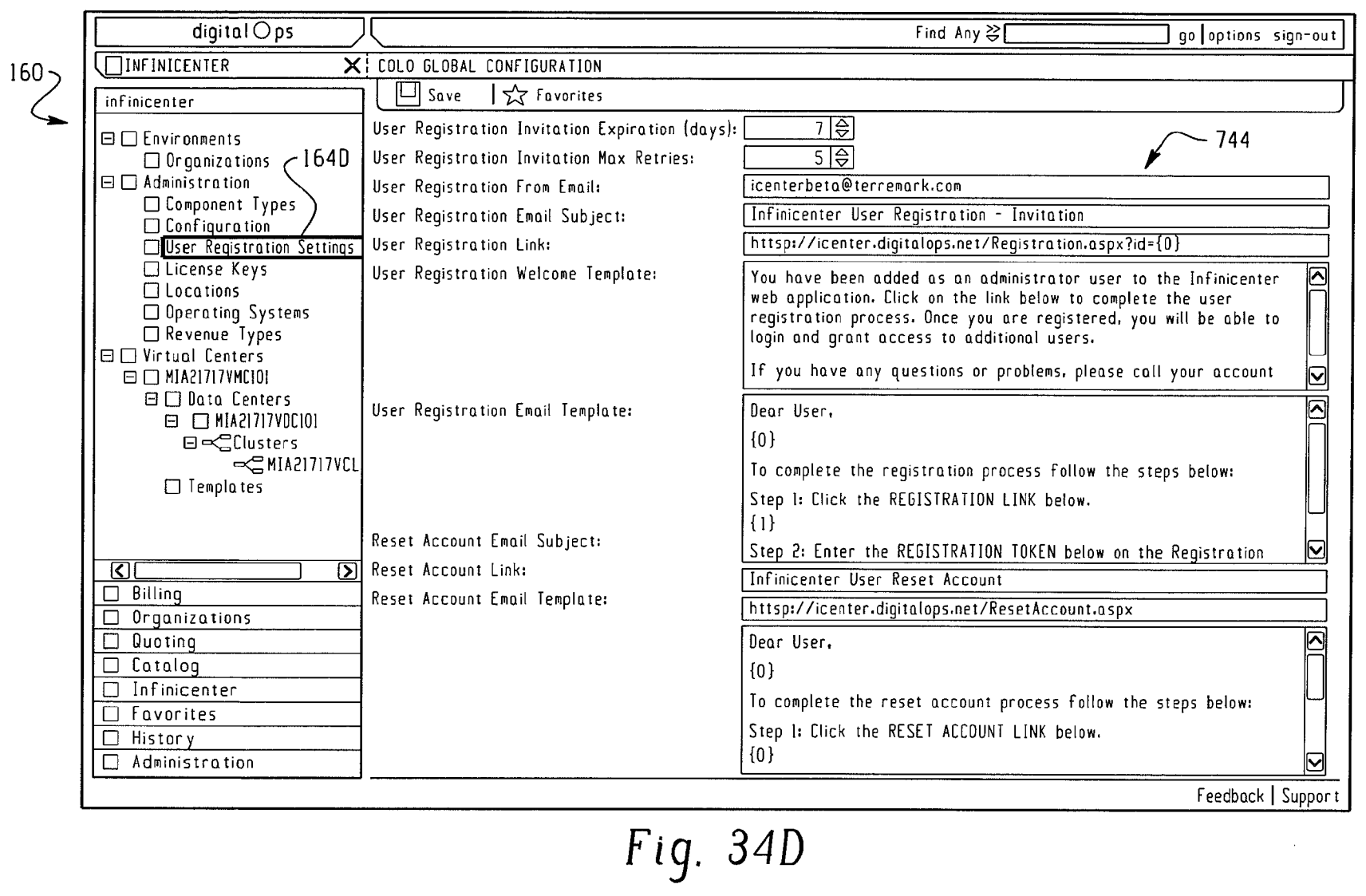

FIGS. 34A-34D depict graphical user interface screens of an exemplary administration console for performing various system administration tasks. FIG. 34A depicts the configuration interface screen 738. FIG. 34B depicts the Operating Systems interface screen 740. FIG. 34C depicts the License Keys interface screen 742. And FIG. 34D depicts the User Registration Settings interface screen 744.

As described herein, a novel utility computing platform is provided that enables customers to perform configuration and provisioning of their own virtual assets, including processing, memory, networking and disk storage assets. Using this system, customers acquire a dedicated resource pool of virtual assets from which they can deploy servers on demand through a web-based customer provisioning console application and can thereafter perform a variety of configuration, management and analysis functions on their virtual resources without necessarily enlisting the assistance of system administrators. Using the software interfaces and functionality described herein, customers are able to precisely control the amount of acquired virtual processing, memory, disk and networking resources from the utility computing platform, and to precisely control the allocation of those resources among one or more virtual servers. Each customer environment is further logically partitioned into a row and group structure that provides an additional level of flexibility for customizing the organization of the customer's virtual resources.

While certain examples have been used to disclose and illustrate one or more embodiments of the invention, including the best mode, and also to enable any person skilled in the art to make and use the invention, the patentable scope of the invention is defined by the claims, and may include other examples that occur to those skilled in the art.

It is further noted that the systems and methods disclosed herein may be implemented on various types of computer architectures, such as for example on a general purpose computer or workstation, or on a network (e.g., local area network, wide area network, or internet), or in a client-server configuration, or in an application service provider configuration. Also, the system's and method's data (such as hierarchical dimensional data) may be stored as one or more data structures in computer memory and/or storage depending upon the application at hand. The systems and methods may be provided on many different types of computer readable media including instructions being executable by a computer to perform the system and method operations described herein. The systems and methods may also have their information transmitted via data signals embodied on carrier signals (e.g., radio frequency carrier signals) or other communication pathways (e.g., fiber optics, infrared, etc.).

The computer components, software modules, functions and data structures described herein may be connected directly or indirectly to each other in order to allow the flow of data needed for their operations. It is also noted that a module includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The computer components may be located on a single computer or distributed across multiple computers depending upon the situation at hand.

It is claimed:

1. A virtualization control system to control partitioning of physical resources of a utility computing platform into virtual resources including virtual processor, memory and storage resources, the virtualization control system comprising:
   a customer console application, accessible via an Internet connection to a customer computing system operating a web browser interface, the customer console application enabling the customer, through the web browser interface, to create and manage one or more virtual servers, within a virtual computing environment and provided by the utility computing platform, by associating an amount of virtual processor, memory, and storage resources with the one or more virtual servers, the customer console application providing a graphical user interface through the web browser interface, the graphical user interface including a virtual resource display that graphically and textually displays an amount of virtual processor, memory, and storage resources associated with a selected virtual computing environment,
   the graphical user interface further including a trend data display for at least one of the virtual processor and virtual memory resources associated with the selected virtual computing environment, the trend data display depicting, in a graphical format, a trend in virtual resource utilization for the selected virtual computing environment over time,
   the graphical user interface further including a virtual server display that depicts deployed virtual servers of the selected virtual computing environment, where the virtual server display is organized to display groups of deployed virtual servers in groupings that are customizable by the customers;
   wherein the graphical user interface includes a virtual server selector that enables the customer to select a virtual server from within the selected virtual computing environment for display through the graphical user interface,
   wherein the virtual server display is organized into a plurality of rows that each display one or more of the groups of the deployed virtual servers, and
   wherein the one or more groups to display in each of the plurality of rows are customizable by the customer.

2. The virtualization control system of claim 1, further comprising:
   a system administration for configuring one or more customer environments comprising a customer-specified amount of virtual processor, memory, and storage resources.

3. The virtualization control system of claim 2, wherein the system administration console provides the graphical user interface for creating a new customer virtual computing environment within the utility computing platform.

4. The virtualization control system of claim 3, wherein the system administration console provides a graphical user interface for upgrading an existing customer environment within the utility computing platform.

5. The virtualization control system of claim 1, wherein the graphical user interface includes a plurality of virtual resource displays that graphically and textually display the amount of virtual processor, memory and storage resources associated with the selected virtual computing environment.

6. The virtualization control system of claim 5, wherein the resource display for each of the virtual processor, memory, and storage resources includes:
   a textual indication of the amount of the virtual resource associated with the selected virtual computing environment, and
   a textual indication of the amount of the virtual resource that has been deployed through one or more virtual servers.

7. The virtualization control system of claim 5, wherein the resource display for each of the virtual processor, memory, and storage resources includes a graphical indication of the amount of the virtual resource associated with the selected virtual computing environment that has been deployed through one or more virtual servers.

8. The virtualization control system of claim 7, wherein the graphical indication includes a percentage utilization graph.

9. The virtualization control system of claim 8, wherein the percentage utilization graph changes color as the amount of a virtual resource deployed through one or more virtual servers approaches the amount associated with the selected virtual computing environment.

10. The virtualization control system of claim 1, wherein the trend data display depicts virtual resource utilization both as a percentage of allocated virtual resource and relative to an absolute amount of allocated virtual resource.

11. The virtualization control system of claim 10, wherein the trend data display includes a percentile display indicator.

12. The virtualization control system of claim 1, wherein the graphical user interface includes a task history display that lists a plurality of configuration or management tasks that have been executed on one or more of the virtual servers of the selected virtual computing environment.

13. The virtualization control system of claim 1, wherein the graphical user interface further comprises an icon/list selector that toggles the virtual server display between an icon mode in which the deployed virtual servers are graphically depicted as icons on the web browser interface and a list mode in which the deployed virtual servers are textually described in a list form on the web browser interface.

14. The virtualization control system of claim 1, wherein the graphical user interface further comprises a create server function selector for deploying a new virtual server within the selected virtual computing environment.

15. The virtualization control system of claim 14, wherein upon selection by the customer, the create server function selector causes the graphical user interface to display one or more create server interface screens for use in deploying a new virtual server within the selected customer environment.

16. The virtualization control system of claim 15, wherein the one or more create server interface screens include a data input field for selecting an operating system of the new virtual server.

17. The virtualization control system of claim 16, wherein the one or more create server interface screens include a data input field for selecting an operating system template associated with the selected operating system.

18. The virtualization control system of claim 17, wherein the one or more create server interface screens include a data input field for entering a server name and administration password associated with the new virtual server.

19. The virtualization control system of claim 18, wherein the one or more create server interface screens include a data input field for configuring a number of processors associated with the new virtual server.

20. The virtualization control system of claim 19, wherein the one or more create server interface screens include a data input field for configuring an amount of memory associated with the new virtual server.

21. The virtualization control system of claim 20, wherein the one or more create server interface screens include a data input field for configuring network settings of the new virtual server.

22. The virtualization control system of claim 21, wherein the virtual server display is organized into one or more rows of deployed virtual servers, each row of deployed virtual servers including one or more of the groups of deployed virtual servers.

23. The virtualization control system of claim 1, wherein the graphical user interface includes a virtual server action bar selector providing a plurality of management functions that can be selected by the customer for a particular virtual server within the selected customer environment.

24. The virtualization control system of claim 23, wherein the virtual server action bar selector includes selectors for at least one of the functions of renaming a virtual server, reconfiguring virtual resources associated with a virtual server, deleting a virtual server from the selected customer virtual computing environment, powering off a virtual server, shutting down a virtual server, restarting a virtual server, connecting to a virtual server, and viewing a list of tasks associated with a virtual server.

25. A method in a utility computing platform having a virtualization control system to control partitioning of physical resources of the utility computing platform into virtual resources including virtual processor, memory and storage resources, the method comprising:
   providing access to a customer console application coupled to the virtualization control system, and accessible via an Internet connection to a customer computing system operating a web browser interface;
   enabling the customer, through the web browser interface, to create and manage
one or more virtual servers within a virtual computing environment and provided by the utility computing platform, by associating an amount of virtual processor, memory and storage resources with the one or more virtual servers, the customer console application providing
   a graphical user interface through the web browser interface, the graphical user interface including a virtual resource display that graphically and textually displays the amount of virtual processor, memory, and storage resources associated with a selected virtual computing environment,
   the graphical user interface further including a trend data display for at least one of the virtual processor and virtual memory resources associated with the selected virtual computing environment, the trend data display depicting, in a graphical format, a trend in virtual resource utilization for the selected virtual computing environment over time,
   the graphical user interface further including a virtual server display that depicts deployed virtual servers of the selected virtual computing environment, where the virtual server display is organized to display groups of deployed virtual servers in groupings that are customizable by the customer;
   selecting a virtual server from within the selected virtual computing environment for display through the graphical user interface; and
   organizing the virtual server display into a plurality of rows that each display one or more of the groups of the deployed virtual servers;
   wherein the one or more groups to display in each of the plurality of rows is customizable by the customer.

26. The method of claim 25, further comprising:
providing access to a system administration console for configuring one or more customer environments comprising a customer-specified amount of virtual processor, memory, and storage resources.

27. The method of claim 26, further comprising:
creating a new customer virtual computing environment within the utility computing platform via the system administration console.

28. The method of claim 27, further comprising:
upgrading an existing customer environment within the utility computing platform via the system administration console.

29. The method of claim 25, further comprising:
graphically and textually displaying the amount of virtual processor, memory and
storage resources associated with the selected virtual computing environment.

30. The method of claim 29, further comprising:
displaying a textual indication of the amount of the virtual resource associated with the selected virtual computing environment and also displaying a textual indication of the amount of the virtual resource that has been deployed by the customer through one or more virtual servers.

31. The method of claim 29, further comprising:
displaying a graphical indication of the amount of the virtual resource associated with the selected virtual computing environment that has been deployed by the customer through one or more virtual servers.

32. The method of claim 31, wherein the graphical indication is a percentage utilization graph.

33. The method of claim 32, further comprising:
altering the color of the percentage utilization graph as the amount of a virtual resource deployed through one or more virtual servers approaches the amount associated with the selected virtual computing environment.

34. The method of claim 25, wherein the trend data display depicts virtual resource utilization both as a percentage of allocated virtual resource and relative toan amount of allocated virtual resource.

35. The method of claim 34, wherein the trend data display includes a percentile display indicator.

36. The method of claim 25, further comprising:
displaying a task history display that lists a plurality of configuration or management tasks that have been executed on the virtual servers of the selected virtual computing environment.

37. The method of claim 25, further comprising:
providing a create virtual server function to deploy a new virtual server within the selected customer environment.

38. The method of claim 25, further comprising:
displaying an icon/list selector that toggles the virtual server display between an icon mode in which the deployed virtual servers are graphically depicted as icons on the web browser interface and a list mode in which the deployed virtual servers are textually described in a list form on the web browser interface.

39. The method of claim 25, further comprising:
displaying a create server function selector for deploying a new virtual server within the selected virtual computing environment.

40. The method of claim 39, further comprising:
responsive to the create server function selector being activated, displaying one or more create server interface screens for use in deploying a new virtual server within the selected customer environment.

41. The method of claim 40, further comprising:
receiving a selection of an operating system of the new virtual server through the one or more create server interface screens.

42. The method of claim 41, further comprising:
receiving a selection of an operating system template associated with the selected operating system through the one or more create server interface screens.

43. The method of claim 41, further comprising:
receiving data regarding a server name and an administration password associated with the new virtual server through the one or more create server interface screens.

44. The method of claim 43, further comprising:
receiving data for configuring a number of processors associated with the new virtual server through the one or more create server interface screens.

45. The method of claim 44, further comprising:
receiving data for configuring the amount of memory associated with the new virtual server through the one or more create server interface screens.

46. The method of claim 45, further comprising:
receiving data for configuring the network settings of the new virtual server through the one or more create server interface screens.

47. The method of claim 46, further comprising:
organizing the virtual server display into one or more rows of deployed virtual servers, each row of deployed virtual servers including one or more groups of deployed virtual servers.

48. The method of claim 25, further comprising:
displaying an action bar selector providing a plurality of management functions that can be selected by the customer for a particular virtual server within the selected customer environment.

49. The method of claim 48, wherein the virtual server action bar selector includes selectors for at least one of the functions of renaming a virtual server, reconfiguring virtual resources associated with a virtual server, deleting a virtual server from the selected customer virtual computing environment, powering off a virtual server, shutting down a virtual server, restarting a virtual server, connecting to a virtual server, and viewing a list of tasks associated with a virtual server.

* * * * *